United States Patent [19]
Knowles

[11] Patent Number: 6,118,902
[45] Date of Patent: Sep. 12, 2000

[54] DEVICE AND METHOD FOR DATA COMPRESSION/DECOMPRESSION USING A DISCRETE WAVELET TRANSFORM

[76] Inventor: Gregory P. Knowles, Calle Menorca 18-2-B, 07011 Palma, Spain

[21] Appl. No.: 08/684,352

[22] Filed: Jul. 19, 1996

Related U.S. Application Data

[63] Continuation of application No. 08/130,571, Oct. 1, 1993, abandoned, which is a continuation-in-part of application No. 08/100,747, Jul. 30, 1993, Pat. No. 5,661,822, which is a continuation-in-part of application No. 08/040,301, Mar. 30, 1993, Pat. No. 5,546,477.

[51] Int. Cl.[7] .................................................. G06T 9/40
[52] U.S. Cl. .......................................... 382/240; 382/279
[58] Field of Search ................................... 382/232, 240, 382/248, 278, 279; 348/398

[56] References Cited

U.S. PATENT DOCUMENTS

| | | |
|---|---|---|
| 3,580,655 | 5/1971 | Leith . |
| 3,950,103 | 4/1976 | Schmidt-Weinmar . |
| 4,136,954 | 1/1979 | Jamieson . |
| 4,223,354 | 9/1980 | Noble et al. . |
| 4,599,567 | 7/1986 | Goupillaud et al. . |
| 4,663,660 | 5/1987 | Fedele et al. . |
| 4,701,006 | 10/1987 | Perlmutter . |
| 4,760,563 | 7/1988 | Beylkin . |
| 4,785,349 | 11/1988 | Keith et al. . |
| 4,805,129 | 2/1989 | David . |
| 4,817,182 | 3/1989 | Adelson et al. . |
| 4,821,223 | 4/1989 | David . |
| 4,827,336 | 5/1989 | Acampora et al. . |
| 4,829,378 | 5/1989 | Legall ..................................... 358/160 |
| 4,837,517 | 6/1989 | Barber . |
| 4,864,398 | 9/1989 | Avis et al. . |
| 4,897,717 | 1/1990 | Hamilton et al. . |
| 4,904,073 | 2/1990 | Lawton et al. . |
| 4,936,665 | 6/1990 | Whitney . |
| 4,974,187 | 11/1990 | Lawton . |
| 4,979,223 | 12/1990 | Manns et al. . |
| 4,982,283 | 1/1991 | Acampora . |
| 4,985,927 | 1/1991 | Norwood et al. . |
| 4,987,480 | 1/1991 | Lippman et al. . |
| 5,000,183 | 3/1991 | Bonnefous . |
| 5,001,764 | 3/1991 | Wood et al. . |
| 5,014,134 | 5/1991 | Lawton et al. . |
| 5,018,210 | 5/1991 | Merryman et al. . |
| 5,068,911 | 11/1991 | Resnikoff et al. . |
| 5,073,964 | 12/1991 | Resnikoff . |

(List continued on next page.)

OTHER PUBLICATIONS

Criminal Justice Information Services—Federal Bureau of Investigation, "WSQ Gray–scale Fingerprint Image Compression Specification", LAFS–IC, Feb. 16, 1993, 53 pgs.

(List continued on next page.)

*Primary Examiner*—Amelia Au
*Assistant Examiner*—Larry J Prikockis

[57] ABSTRACT

An apparatus produces an encoded and compressed digital data stream from an original input digital data stream using a forward discrete wavelet transform and a tree encoding method. The input digital data stream may be a stream of video image data values in digital form. The apparatus is also capable of producing a decoded and decompressed digital data stream closely resembling the originally input digital data stream from an encoded and compressed digital data stream using a corresponding tree decoding method and a corresponding inverse discrete wavelet transform. A dual convolver is disclosed which performs both boundary and nonboundary filtering for forward transform discrete wavelet processing and which also performs filtering of corresponding inverse transform discrete wavelet processes. A portion of the dual convolver is also usable to filter an incoming stream of digital video image data values before forward discrete wavelet processing. Methods and structures for generating the addresses to read/write data values from/to memory as well as for reducing the total amount of memory necessary to store data values are also disclosed.

27 Claims, 77 Drawing Sheets

Microfiche Appendix Included
(3 Microfiche, 183 Pages)

U.S. PATENT DOCUMENTS

| | | |
|---|---|---|
| 5,081,645 | 1/1992 | Resnikoff et al. . |
| 5,095,447 | 3/1992 | Manns et al. . |
| 5,101,446 | 3/1992 | Resnikoff et al. . |
| 5,103,306 | 4/1992 | Weiman et al. . |
| 5,121,191 | 6/1992 | Cassereau et al. . |
| 5,124,930 | 6/1992 | Nicolas et al. . |
| 5,128,757 | 7/1992 | Citta et al. . |
| 5,148,498 | 9/1992 | Resnikoff et al. . |
| 5,151,953 | 9/1992 | Landeta ..................................... 382/42 |
| 5,156,943 | 10/1992 | Whitney . |
| 5,173,880 | 12/1992 | Duren et al. . |
| 5,325,215 | 6/1994 | Shibata et al. ............................ 382/56 |

OTHER PUBLICATIONS

M. Antonini et al., "Image Coding Using Wavelet Transform", IEEE Transactions on Image Processing, vol. 1, No. 2, Apr. 1992, pp. 205–220.

J. Bradley et al., "1992 Progress Report: Compression Of Fingerprint Data Using The Wavelet Vector Quantization Image Compression Algorithm", Los Alamos National Laboratory, Apr. 11, 1992, 34 pgs.

C. M. Brislawn et al., "Classification Of Symmetric Wavelet Transforms", Los Alamos National Laboratory, Aug. 10, 1992 (revised Mar. 22, 1993), 45 pgs.

T. Hopper et al., "Compression Of Grey–scale Fingerprint Images", Dec. 1992 Data Compression Conference, IEEE Computer Society Press, Los Alamitos, CA, 1992, pp. 309–318.

American National Standards Institute, "fingerprint identification—data format for information interchange", ANSI/NBS–ICST 1–1986, 61 pgs.

R.R. Coifman et al., "Wavelet Analysis and Signal Processing", Yale University, New Haven, CT., pp. 1–30.

S.G. Mallet, "Multiresolution Approximation And Wavelets", U. Penn. Report No. MS–CIS–87–87, Grasp Lab 80, Sep. (1987), 19 pgs.

S.G. Mallet, "A Theory For Multiresolution Signal Decompression: The Wavelet Representation", U. Penn. Report No. MS–CIS–87–22, Grasp Lab 103, May (1987), 28 pgs.

"Information technology—Digital compression and coding of continuous–tone still images", *Draft International Standard*, ISO/IEC DIS 10918–1, Int'l. Org. for Standardization, 1991, pp. i through M3.

M.A. Hunt, "Wavelets Accelerate Fingerprinting Methods", Electronic Engineering Times, Sep. 27, 1993, pp. 74 and 98.

IEEE Transactions On Information Theory, "Special Issue On Wavelet Transforms And Multiresolution Signal Analysis", vol. 38, No. 2, (Part II of two parts), Mar. 1992, (pp. 529–930).

A.S. Lewis and G. Knowles, "Video Compression Using 3D Wavelet Transforms", Electronic Letters, Mar. 15, 1990, vol. 26, No. 6, pp. 396–397.

A.S. Lewis and G. Knowles, "VLSI Architecture For 2–D Daubechies Wavelet Transform Without Multipliers", Electronic Letters, Jan. 17, 1991, vol. 27, No. 2, pp. 171–172.

A.S. Lewis and G. Knowles, "A 64 Kb/s Video Codec Using The 2–D Wavelet Transform", IEEE Jan., 1991, pp. 196–201.

G. Knowles, "VLSI Architecture For The Discrete Wavelet Transform," Electronic Letters, Jul. 19, 1990, vol. 26 No. 15, pp. 1184–1185.

A.S. Lewis and G. Knowles, "Image Compression Using the 2–D Wavelet Transform," IEEE, vol. 1 No. 2, Apr. 1992, pp. 244–250.

Crochiere et al., "Multiple Digital Signal Processing", pp. 378–392, (1983).

Daubechies, "Painless Nonorthogonal Expansions", J. Math. Phys. vol. 27, pp. 1271–1283 (1986).

Daubechies, "Orthonormal Bases of Compactly Supported Wavelets", Technical Report AT&T Bell Laboratories (1987).

Goupillaud, et al., "Cycle–Octave and Related Transforms in Seismic Signal Anlaysis", Geoexploration, vol. 23, pp. 85–102, (1984).

Grossman, A. et al., "Transforms Associated to Square–Integrable Group Representations, I: General Results", J. Math. Phys. vol. 26, pp. 2473–2479, (1985).

Grossman, et al., "Transforms Associated to Square–Integrable Group Representations, II: Examples", Ann. Inst. H. Poincare, vol. 45, pp. 293–309 (1986).

Grossman, A. et al., "Decomposition of Hardy into Square–Integrable Functions of Constant Shape", SIAM J. Math. Anal. vol. 15, pp. 723–736, (1984).

Grossman, et al., "Decomposition of Functions into Wavelets of Constant Shape and Related Transforms", University of Bielefeld Report No. 11 (1984), published in Striet, L., ed., Mathematics and Physics I, World Scientific Publishing Co., Singapore, pp. 135–165 (1987).

Kronland–Martinet, R., et al., "Analysis of Sounds through Wavelet Transforms", Int'l. J. Pattern Analysis and Artificial Intelligence, vol. 1, pp. 1–8, (1987).

Marr, "Vision", H. Freeman & Co., pp. 61–67, (1982).

Meyer, Y. et al., "L'Analyse par Ondelettes", Pour la Science, pp. 28–37, (1987).

Pratt, "Digital Image Processing", J. Wiley & Sons, pp. 254–257, (1987).

Tuteur, "Wavelet Transformations in Signal Detection", Proc. 1988 Int'l. Conf. on Accoustics, Speech and Signal Processing, pp. 1435–1438, (1988).

Paul Farrelle et al., "Recursive Block Coding–A New Approach to Transform Coding", IEEE, vol. Com–34, No. 2, Feb., 1986, pp. 161–179.

Candy, Franke, Haskell and Mounts, "Transmitting Television as Clusters of Frame–to–Frame Differences", The Bell System Technical Journal, vol. 50, No. 6, pp. 1889–1917, Jul.–Aug., 1971.

Tasto and Wintz, "Image Coding by Adaptive Block Quantization", IEEE Trans. Com. Tech. vol. COM–19, No. 6, pp. 957–971, Dec., 1971.

Limb, Pease, and Walsh, "Combining Intraframe and Frame–to–Frame Coding for Television", The Bell System Technical Journal, vol. 53, No. 6, pp. 1137–73, Jul.–Aug., 1974.

Reader, "Intraframe and Interframe Adaptive Tranform Coding", SPIE vol. 66, Efficient Transmission of Pictorial Information, pp. 108–117, 1975.

Haskell, "Interframe Coding of Monochrome Television–A Review", SPIE vol. 87, Advances in Image Transmission Techniques, pp. 212–221, 1976.

Tescher and Cox, "An Adaptive Transform coding Algorithm", marked IEEE International Conference on Communications, pp. 47–20–47–25, 1976.

Cox and Tescher, "Channel Rate Equalization Techniques for Adaptive Transform Coders", SPIE vol. 87, Advances in Image Transmission Techniques, pp. 239–246, 1976.

Tescher and Cox, "Image Coding: Variable Rate Differential Pulse Coding Modulation (DPCM) Through Fixed Rate Channel", SPIE vol. 119, Applications of Digital Image Processing (IOCC1977), pp. 147–154, 1977.

Haskell, Cordon, Schmidt, and Scattaglia, "Interframe Coding of 525–Line Monochrome Television at 1.5 Mbits/s", IEEE Trans. Com., vol. COM–25, No. 11, pp. 1339–1348, No., 1977.

Tescher, "Transform Image Coding", from Image Transmission Techniques, Advances in Electronics and Electron Physics, Suppl. 12, Academic Press, 1979.

Tescher, "A Dual Transform Coding Algorithm", National Telecommunicaitons Conference, IEEE Publication No. CH1514–9/79/0000–0032, pp. 53.4.1–53.4.4., Nov., 1979.

Tescher, "Adaptive Transform Coding of Color Images at Low Rates", National Telecommunications Conference, IEEE Publication No. CH1539–6/80/0000–0180, pp. 36.3.1–36.3.4, Nov., 1980.

Kaneko and Ishiguro, "Digital Television Transmission Using Bandwidth Compression Techniques", IEEE Communications Magazine, IEEE No. 0163–6804/80/070000–0014, pp. 14–22, 1980.

Tescher, "Transform Coding Strategies at Low Rates", National Telecommunications Conference, IEEE No. CH1679–0/81/0000–0140, pp. C9.2.1–C9.2.3, Nov., 1981.

I. Daubechies, *Ten Lectures on Wavelets*, Chapter 3 "Discrete Wavelet Transforms: Frames," Rutgers University and AT&T Bell Lab., Phil. Penn., 1992.

I. Daubechies, S. Mallat, and A. Willsky, editors, "Wavelet Transforms and Multiresolution Signal Analyis", IEEE Trans. Info. Theory, vol. 38, No. 2, Mar. 1992.

R. Glowinski, W. Lawton, M. Ravachol, and E. Tennebaum, "Wavelet Solution of Linear And Nonlinear Elliptic, Parabolic, and Hyperbolic Problems in One Space Dimension", pp. 55–120 in Proc. of Ninth Conference on Computing Methods in Applied Science and Engineering (SIAM, Philadelphia, 1990).

W.M. Lawton, "Tight Frames of Compactly Supported Affine Wavelets", J. Math. Phys. 31, 1898–1901.

W.M. Lawton, "Necessary and Sufficient conditions for Constructing Orthonormal Wavelet Bases", J. Math. Phys. 32, 57–61 (1991).

W.M. Lawton, "Multi–resolution Properties of the Wavelet Galerkin Operator", J. Math. Phys. 32, 1440–1443 (1991).

Design Automation Standards Subcommittee of the Design Automation Technical Committee of the IEEE Computer Society, et al., "IEEE Standard VHDL Language Reference Manual", Copyright 1988 by the Institute of Electrical and Electronics Engineers, Inc.

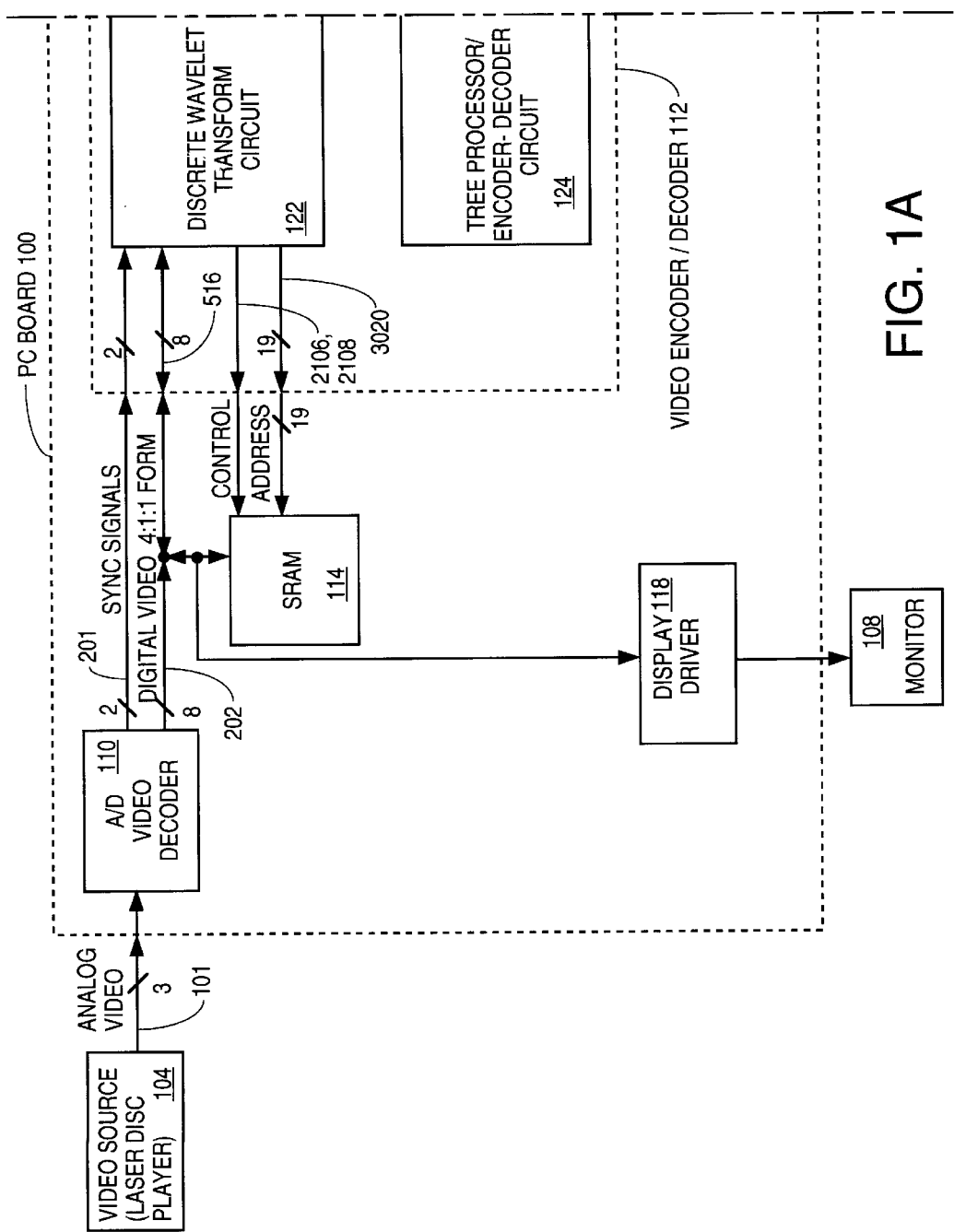

CONV_ROW
BLOCK DIAGRAM

CONV_COL
BLOCK DIAGRAM

WAVELET TRANSFORM MULTIPLIER CIRCUIT

ROW WAVELET TRANSFORM CIRCUIT

| time t | 0 | 1 | 2 | 3 | 4 | 5 |
|---|---|---|---|---|---|---|
| Input Data Value x | $D_{00}$ | $D_{01}$ | $D_{02}$ | $D_{03}$ | $D_{04}$ | $D_{05}$ |
| muxsel(1) | 1 | 1 | 1 | 1 | 1 | 1 |
| muxsel(2) | 2 | 1 | 1 | 1 | 1 | 1 |
| muxsel(3) | 3 | 2 | 2 | 2 | 2 | 2 |
| andsel(1),(4) | pass | zero | pass | pass | pass | pass |
| andsel(2),(3) | zero | pass | pass | pass | pass | pass |
| addsel(1) | add | add | add | add | add | add |
| addsel(2) | add | sub | add | sub | add | sub |
| addsel(3) | add | add | add | add | add | add |
| addsel(4) | sub | add | sub | add | sub | add |
| centermuxsel (1) | l | r | l | r | l | r |
| centermuxsel (2) | r | l | r | l | r | l |
| muxandsel (1) | zero | pass | pass | pass | pass | pass |
| muxandsel (2) | pass | pass | pass | pass | pass | pass |
| muxandsel (3) | zero | pass | pass | pass | pass | pass |
| OUT 2 | | | | $32H_{00}$ | | $32H_{01}$ |
| OUT 1 | | | | $32G_{00}$ | | $32G_{01}$ |
| OUTPUT LEADS 520 | | | | $H_{00}$ | $G_{00}$ | $H_{01}$ |

FIG. 10A

CONV_ROW CONTROL SIGNALS AND
OUTPUTS DURING FORWARD OCTAVE 0 TRANSFORM

| 6 | 7 | 8 | 9 | 10 | 11 |
|---|---|---|---|---|---|
| $D_{06}$ | $D_{07}$ | $D_{10}$ | $D_{11}$ | $D_{12}$ | $D_{13}$ |
| 1 | 1 | 1 | 1 | 1 | 1 |
| 1 | 3 | 2 | 1 | 1 | 1 |
| 2 | 4 | 3 | 2 | 2 | 2 |
| pass | zero | pass | zero | pass | pass |
| pass | pass | zero | pass | pass | pass |
| add | add | add | add | add | add |
| add | sub | add | sub | add | sub |
| add | add | add | add | add | add |
| sub | add | sub | add | sub | add |
| l | r | l | r | l | r |
| r | l | r | l | r | l |
| pass | pass | zero | pass | pass | pass |
| pass | pass | pass | pass | pass | pass |
| pass | pass | zero | pass | pass | pass |
|  | $32H_{02}$ |  | $32H_{03}$ |  | $32H_{10}$ |
|  | $32G_{02}$ |  | $32G_{03}$ |  | $32G_{10}$ |
| $G_{01}$ | $H_{02}$ | $G_{02}$ | $H_{03}$ | $G_{03}$ | $H_{10}$ | $G_{10}$ |

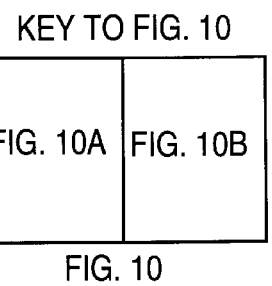

KEY TO FIG. 10

| FIG. 10A | FIG. 10B |

CONV_ROW CONTROL SIGNALS AND
OUTPUTS DURING FORWARD OCTAVE0 TRANSFORM

| Time | Input Data Value | Output of block 926 | Output of block 928 |
|---|---|---|---|
| 0 | $D_{00}$ | 0 | $32(a+b)D_{00}$ |
| 1 | $D_{01}$ | $32aD_{01}$ | $32\{(c+d)D_{00} - bD_{01}\}$ |
| 2 | $D_{02}$ | $32G_{00} = 32\{(c+d)D_{00} - bD_{01} + aD_{02}\}$ | $32\{aD_{01} + bD_{02}\}$ |
| 3 | $D_{03}$ | $32aD_{03}$ | $32\{dD_{01} + cD_{02} - bD_{03}\}$ |
| 4 | $D_{04}$ | $32G_{01} = 32\{dD_{01} + cD_{02} - bD_{03} + aD_{04}\}$ | $32\{aD_{03} + bD_{04}\}$ |
| 5 | $D_{05}$ | $32aD_{05}$ | $32\{dD_{03} + cD_{04} - bD_{05}\}$ |
| 6 | $D_{06}$ | $32G_{02} = 32\{dD_{03} + cD_{04} - bD_{05} + aD_{06}\}$ | $32\{aD_{05} + bD_{06}\}$ |
| 7 | $D_{07}$ | 0 | $32\{dD_{05} + cD_{06} - (b-a)D_{07}\}$ |
| 8 | $D_{10}$ | $32G_{03} = 32\{dD_{05} + cD_{06} - (b-a)D_{07}\}$ | $32\{(a+b)D_{10}\}$ |
| 9 | $D_{11}$ | $32aD_{11}$ | $32\{(c+d)D_{10} - bD_{11}\}$ |
| 10 | $D_{12}$ | $32G_{10} = 32\{(c+d)D_{10} - bD_{11} + aD_{12}\}$ | $32\{aD_{11} + bD_{12}\}$ |

FIG. 11A CONV_ROW DATA FLOW DURING THE FORWARD OCTAVE 0 TRANSFORM

| Output of block 930 | Output of block 932 |
|---|---|
| $32\{(c+d)D_{00}\}$ | 0 |
| $32\{(a+b)D_{00} + cD_{01}\}$ | $32dD_{01}$ |
| $32\{dD_{01} + cD_{02}\}$ | $32\{(a+b)D_{00} + cD_{01} - dD_{02}\} = 32H_{00}$ |
| $32\{aD_{01} + bD_{02} + cD_{03}\}$ | $32dD_{03}$ |
| $32\{dD_{03} + cD_{04}\}$ | $32\{aD_{01} + bD_{02} + cD_{03} - dD_{04}\} = 32H_{01}$ |
| $32\{aD_{03} + bD_{04} + cD_{05}\}$ | $32dD_{05}$ |
| $32\{dD_{05} + cD_{06}\}$ | $32\{aD_{03} + bD_{04} + cD_{05} - dD_{06}\} = 32H_{02}$ |
| $32\{aD_{05} + bD_{06} + (c-d)D_{07}\}$ | 0 |
| $32\{(c+d)D_{10}\}$ | $32\{aD_{05} + bD_{06} + (c-d)D_{07}\} = 32H_{03}$ |
| $32\{(a+b)D_{10} + cD_{11}\}$ | $32dD_{11}$ |
| $32\{dD_{11} + cD_{12}\}$ | $32\{(a+b)D_{10} + cD_{11} - dD_{12}\} = 32H_{10}$ |

FIG. 11B    CONV_ROW DATA FLOW DURING THE FORWARD OCTAVE 0 TRANSFORM

KEY TO FIG. 11

| FIG. 11A | FIG. 11B |

FIG. 11

| | | | | | | | |
|---|---|---|---|---|---|---|---|
| $H_{00}$ | $G_{00}$ | $H_{01}$ | $G_{01}$ | $H_{02}$ | $G_{02}$ | $H_{03}$ | $G_{03}$ |
| $H_{10}$ | $G_{10}$ | $H_{11}$ | $G_{11}$ | $H_{12}$ | $G_{12}$ | $H_{13}$ | $G_{13}$ |
| $H_{20}$ | $G_{20}$ | $H_{21}$ | $G_{21}$ | $H_{22}$ | $G_{22}$ | $H_{23}$ | $G_{23}$ |
| $H_{30}$ | $G_{30}$ | $H_{31}$ | $G_{31}$ | $H_{32}$ | $G_{32}$ | $H_{33}$ | $G_{33}$ |
| $H_{40}$ | $G_{40}$ | $H_{41}$ | $G_{41}$ | $H_{42}$ | $G_{42}$ | $H_{43}$ | $G_{43}$ |
| $H_{50}$ | $G_{50}$ | $H_{51}$ | $G_{51}$ | $H_{52}$ | $G_{52}$ | $H_{53}$ | $G_{53}$ |
| $H_{60}$ | $G_{60}$ | $H_{61}$ | $G_{61}$ | $H_{62}$ | $G_{62}$ | $H_{63}$ | $G_{63}$ |
| $H_{70}$ | $G_{70}$ | $H_{71}$ | $G_{71}$ | $H_{72}$ | $G_{72}$ | $H_{73}$ | $G_{73}$ |

FIG. 12

OUTPUT OF CONV_ROW AFTER FIRST
FORWARD TRANSFORM PASS

COLUMN WAVELET TRANSFORM CIRCUIT 704

| Time t | 0 ···· 7 | 8 ···· 15 | 16 ···· 23 |
|---|---|---|---|
| Input Data Value | $H_{00}$ ···· $G_{03}$ | $H_{10}$ ···· $G_{13}$ | $H_{20}$ ···· $G_{23}$ |
| muxsel(1) | 1 ···· 1 | 1 ···· 1 | 1 ···· 1 |
| muxsel(2) | 2 ···· 2 | 1 ···· 1 | 1 ···· 1 |
| Muxsel(3) | 3 ···· 3 | 2 ···· 2 | 2 ···· 2 |
| andsel(1),(4) | pass ···· pass | zero ···· zero | pass ···· pass |
| andsel(2),(3) | zero ···· zero | pass ···· pass | pass ···· pass |
| addsel(1) | add ···· add | add ···· add | add ···· add |
| addsel(2) | add ···· add | sub ···· sub | add ···· add |
| addsel(3) | add ···· add | add ···· add | add ···· add |
| addsel(4) | sub ···· sub | add ···· add | sub ···· sub |
| centermuxel(1) | l ···· l | r ···· r | l ···· l |
| centermuxel(2) | r ···· r | l ···· l | r ···· r |
| muxandsel(1) | zero ···· zero | pass ···· pass | pass ···· pass |
| muxandsel(2) | pass ···· pass | pass ···· pass | pass ···· pass |
| muxandsel(3) | zero ···· zero | pass ···· pass | pass ···· pass |
| OUT2 | | | $32HH_{00}$ ·· $32GH_{03}$ |
| OUT1 | | | |
| OUTPUT LEADS 524 | | | $HH_{00}$ ·· $GH_{03}$ |

FIG. 14A CONV_COL CONTROL SIGNALS AND OUTPUTS DURING FORWARD OCTAVE O TRANSFORM

| 24 .... 31 | 32 .... 39 | .... | 56 .... 63 |
|---|---|---|---|
| $H_{30}$ .... $G_{33}$ | $H_{40}$ .... $G_{43}$ | .... | $H_{70}$ .... $G_{73}$ |
| 1 .... 1 | 1 .... 1 | .... | 1 .... 1 |
| 1 .... 1 | 1 .... 1 | .... | 3 .... 3 |
| 2 .... 2 | 2 .... 2 | .... | 4 .... 4 |
| pass .... pass | pass .... pass | .... | zero .... zero |
| pass .... pass | pass .... pass | .... | pass .... pass |
| add .... add | add .... add | .... | add .... add |
| sub .... sub | add .... add | .... | sub .... sub |
| add .... add | add .... add | .... | add .... add |
| add .... add | sub .... sub | .... | add .... add |
| r .... r | l .... l | .... | r .... r |
| l .... l | r .... r | .... | l .... l |
| pass .... pass | pass .... pass | .... | pass .... pass |
| pass .... pass | pass .... pass | .... | pass .... pass |
| pass .... pass | pass .... pass | .... | pass .... pass |
| $32HG_{00}$ .. $32GG_{03}$ | $32HH_{10}$ .. $32GH_{13}$ | | $32HG_{20}$ .. $32GG_{23}$ |
| $HG_{00}$ .... $GG_{03}$ | $HH_{10}$ .... $GH_{13}$ | | $HG_{20}$ .... $GG_{23}$ |

FIG. 14B CONV_COL CONTROL SIGNALS AND OUTPUTS DURING FORWARD OCTAVE O TRANSFORM

| 64 .... 71 | 72 .... 79 |
|---|---|
|  |  |
| 1 .... 1 | 1 .... 1 |
| 2 .... 2 | 1 .... 1 |
| 3 .... 3 | 2 .... 2 |
| pass .... pass | zero .... zero |
| zero .... zero | pass .... pass |
| add .... add | add .... add |
| add .... add | sub .... sub |
| add .... add | add .... add |
| sub .... sub | add .... add |
| l .... l | r .... r |
| r .... r | l .... l |
| zero .... zero | pass .... pass |
| pass .... pass | pass .... pass |
| zero .... zero | pass .... pass |
| $32HH_{30}$ .. $32GH_{33}$ |  |
|  | $32HG_{30}$ .. $32GG_{33}$ |
| $HH_{30}$ .... $GH_{33}$ | $HG_{30}$ .... $GG_{33}$ |

KEY TO FIG 14

| FIG. 14A | FIG. 14B | FIG. 14C |
|---|---|---|

FIG 14

FIG. 14C CONV_COL CONTROL SIGNALS AND OUTPUTS DURING FORWARD OCTAVE 0 TRANSFORM

| Time | Input Data Value | Output of block 1326 | Output of block 1328 |
|---|---|---|---|
| 0 | $H_{00}$ | . | $32(a+b)H_{00}$ |
| 1 | $G_{00}$ | . | $32(a+b)G_{00}$ |
| . | . | . | . |
| 7 | $G_{03}$ | . | $32(a+b)G_{03}$ |
| 8 | $H_{10}$ | $32aH_{10}$ | $32\{(c+d)H_{00} - bH_{10}\}$ |
| . | . | . | . |
| 15 | $G_{13}$ | $32aG_{13}$ | $32\{(c+d)G_{03} - bG_{13}\}$ |
| 16 | $H_{20}$ | $32HG_{00} = 32\{(c+d)H_{00} - bH_{10} + aH_{20}\}$ | $32\{aH_{10} + bH_{20}\}$ |
| . | . | . | . |
| 23 | $G_{23}$ | $32GG_{03} = 32\{(c+d)G_{03} - bG_{13} + aG_{23}\}$ | $32\{aG_{13} + bG_{23}\}$ |
| 24 | $H_{30}$ | $32aH_{30}$ | $32\{dH_{10} + cH_{20} - bH_{30}\}$ |
| . | . | . | . |
| 31 | $G_{33}$ | $32aG_{33}$ | $32\{dG_{13} + cG_{23} - bG_{33}\}$ |
| 32 | $H_{40}$ | $32HG_{10} = 32\{dH_{10} + cH_{20} - bH_{30} + aH_{40}\}$ | $32\{aH_{30} + bH_{40}\}$ |
| . | . | | |

FIG. 15A

CONV_COL DATA FLOW DURING FORWARD OCTAVE 0 TRANSFORM

CONV_COL DATA FLOW DURING FORWARD OCTAVE 0 TRANSFORM

FIG. 15C
CONV_COL DATA FLOW DURING FORWARD OCTAVE 0 TRANSFORM

| | | | | | |
|---|---|---|---|---|---|
| 39 | $G_{43}$ | | $32GG_{13} = 32\{dG_{13} + cG_{23} - bG_{33} + aG_{43}\}$ | $32\{aG_{33} + bG_{43}\}$ | |
| 56 | $H_{70}$ | | | $32\{dH_{50} + cH_{60} - (b-a)H_{70}\}$ | |
| 63 | $G_{73}$ | | | $32\{dG_{53} + cG_{63} - (b-a)G_{73}\}$ | |
| 64 | | | $32HG_{30} = 32\{dH_{50} + cH_{60} - (b-a)H_{70}\}$ | | |
| 71 | | | $32GG_{33} = 32\{dG_{53} + cG_{63} - (b-a)G_{73}\}$ | | |

FIG. 15D $32\{dG_{33} + cG_{43}\}$ $32\{aG_{13} + bG_{23} + cG_{33} - dG_{43}\} = 32GH_{13}$ $32\{aH_{50} + bH_{60} + (c-d)H_{70}\}$ $32\{aG_{53} + bG_{63} + (c-d)G_{73}\}$ $32\{aH_{50} + bH_{60} + (c-d)H_{70}\} = 32HH_{30}$ $32\{aG_{53} + bG_{63} + (c-d)G_{73}\} = 32GH_{33}$

CONV_COL DATA FLOW DURING FORWARD OCTAVE 0 TRANSFORM

| KEY TO FIG 15 | |
|---|---|
| FIG. 15A | FIG. 15B |
| FIG. 15C | FIG. 15D |

FIG 15

| | | | | | | | |
|---|---|---|---|---|---|---|---|
| $HH_{00}$ | $GH_{00}$ | $HH_{01}$ | $GH_{01}$ | $HH_{02}$ | $GH_{02}$ | $HH_{03}$ | $GH_{03}$ |
| $HG_{00}$ | $GG_{00}$ | $HG_{01}$ | $GG_{01}$ | $HG_{02}$ | $GG_{02}$ | $HG_{03}$ | $GG_{03}$ |
| $HH_{10}$ | $GH_{10}$ | $HH_{11}$ | $GH_{11}$ | $HH_{12}$ | $GH_{12}$ | $HH_{13}$ | $GH_{13}$ |
| $HG_{10}$ | $GG_{10}$ | $HG_{11}$ | $GG_{11}$ | $HG_{12}$ | $GG_{12}$ | $HG_{13}$ | $GG_{13}$ |
| $HH_{20}$ | $GH_{20}$ | $HH_{21}$ | $GH_{21}$ | $HH_{22}$ | $GH_{22}$ | $HH_{23}$ | $GH_{23}$ |
| $HG_{20}$ | $GG_{20}$ | $HG_{21}$ | $GG_{21}$ | $HG_{22}$ | $GG_{22}$ | $HG_{23}$ | $GG_{23}$ |
| $HH_{30}$ | $GH_{30}$ | $HH_{31}$ | $GH_{31}$ | $HH_{32}$ | $GH_{32}$ | $HH_{33}$ | $GH_{33}$ |
| $HG_{30}$ | $GG_{30}$ | $HG_{31}$ | $GG_{31}$ | $HG_{22}$ | $GG_{32}$ | $HG_{33}$ | $GG_{33}$ |

FIG. 16

OCTAVE O DECOMPOSITION
AFTER FIRST CONV_ROW AND
CONV_COL PASS

| Time t | 0 | 1 | 2 | 3 | 4 | 5 |
|---|---|---|---|---|---|---|
| Input Data Value | $HH_{00}$ | $HH_{01}$ | $HH_{02}$ | $HH_{03}$ | $HH_{10}$ | $HH_{11}$ |
| muxsel(1) | 1 | 1 | 1 | 1 | 1 | 1 |
| muxsel(2) | 2 | 1 | 1 | 3 | 2 | 1 |
| muxsel(3) | 3 | 2 | 2 | 4 | 3 | 2 |
| andsel(1),(4) | pass | zero | pass | zero | pass | zero |
| andsel(2),(3) | zero | pass | pass | pass | zero | pass |
| addsel(1) | add | add | add | add | add | add |
| addsel(2) | add | sub | add | sub | add | sub |
| addsel(3) | add | add | add | add | add | add |
| addsel(4) | sub | add | sub | add | sub | add |
| center muxsel (1) | l | r | l | r | l | r |
| center muxsel (2) | r | l | r | l | r | l |
| muxandsel (1) | zero | pass | pass | pass | zero | pass |
| muxandsel (2) | pass | pass | pass | pass | pass | pass |
| muxandsel (3) | zero | pass | pass | pass | zero | pass |
| OUT 2 | | | | $32HHH_{00}$ | | $32HHH_{01}$ |
| OUT 1 | | | | $32HHG_{00}$ | | $32HHG_{01}$ |
| OUTPUT LEADS 520 | | | | $HHH_{00}$ | $HHG_{00}$ | $HHH_{01}$ |

FIG. 17A

CONV_ROW CONTROL SIGNALS AND OUTPUTS
DURING THE FORWARD OCTAVE 1 TRANSFORM

| 6 | 7 | 8 | 9 | 10 | 11 |
|---|---|---|---|---|---|
| $HH_{12}$ | $HH_{13}$ | $HH_{20}$ | $HH_{21}$ | $HH_{22}$ | $HH_{23}$ |
| 1 | 1 | 1 | 1 | 1 | 1 |
| 1 | 3 | 2 | 1 | 1 | 1 |
| 2 | 4 | 3 | 2 | 2 | 2 |
| pass | zero | pass | zero | pass | zero |
| pass | pass | zero | pass | pass | pass |
| add | add | add | add | add | add |
| add | sub | add | sub | add | sub |
| add | add | add | add | add | add |
| sub | add | sub | add | sub | add |
| l | r | l | r | l | r |
| r | l | r | l | r | l |
| pass | pass | zero | pass | pass | pass |
| pass | pass | pass | pass | pass | pass |
| pass | pass | zero | pass | pass | pass |
|  | $32HHH_{10}$ |  | $32HHH_{11}$ |  | $32HHH_{20}$ |
|  | $32HHG_{10}$ |  | $32HHG_{11}$ |  | $32HHG_{20}$ |
| $HHG_{01}$ | $HHH_{10}$ | $HHG_{10}$ | $HHH_{11}$ | $HHG_{11}$ | $HHH_{20}$ | $HHG_{20}$ |

KEY TO FIG. 17

| FIG. 17A | FIG. 17B |
|---|---|

CONV_ROW CONTROL SIGNALS AND OUTPUTS
DURING THE FORWARD OCTAVE 1 TRANSFORM

| Time | Input Data Value | Output of Block 926 | Output of Block 928 |
|---|---|---|---|
| 0 | $HH_{00}$ | 0 | $32\{(a+b)\,HH_{00}\}$ |
| 1 | $HH_{01}$ | $32aHH_{01}$ | $32\{(c+d)HH_{00} - bHH_{01}\}$ |
| 2 | $HH_{02}$ | $32HHG_{00} = 32\{(c+d)HH_{00} - bHH_{01} + aHH_{02}\}$ | $32\{aHH_{01} + bHH_{02}\}$ |
| 3 | $HH_{03}$ | 0 | $32\{dHH_{01} + cHH_{02} - (b-a)HH_{03}\}$ |
| 4 | $HH_{10}$ | $32HHG_{01} = 32\{dHH_{01} + cHH_{02} - (b-a)HH_{03}\}$ | $32\{(a+b)HH_{10}\}$ |
| 5 | $HH_{11}$ | $32aHH_{11}$ | $32\{(c+d)HH_{10} - bHH_{11}\}$ |
| 6 | $HH_{12}$ | $32HHG_{10} = 32\{(c+d)HH_{10} - bHH_{11} + aHH_{12}\}$ | $32\{aHH_{11} + bHH_{12}\}$ |

FIG. 18A
CONV_ROW DATA FLOW DURING THE FORWARD OCTAVE 1 TRANSFORM

CONV_ROW DATA FLOW DURING THE FORWARD OCTAVE 1 TRANSFORM

| Time t | 0 .... 3 | 4 .... 7 | 8 .... 11 |
|---|---|---|---|
| Input Data Values | $HHH_{00}$ ... $HHG_{01}$ | $HHH_{10}$ ... $HHG_{11}$ | $HHH_{20}$ ... $HHG_{21}$ |
| muxsel(1) | 1 .... 1 | 1 .... 1 | 1 .... 1 |
| muxsel(2) | 2 .... 2 | 1 .... 1 | 1 .... 1 |
| muxsel(3) | 3 .... 3 | 2 .... 2 | 2 .... 2 |
| andsel(1),(4) | pass .... pass | zero .... zero | pass .... pass |
| andsel(2),(3) | zero .... zero | pass .... pass | pass .... pass |
| addsel(1) | add .... add | add .... add | add .... add |
| addsel(2) | add .... add | sub .... sub | add .... add |
| addsel(3) | add .... add | add .... add | add .... add |
| addsel(4) | sub .... sub | add .... add | sub .... sub |
| centermuxel(1) | l .... l | r .... r | l .... l |
| centermuxel(2) | r .... r | l .... l | r .... r |
| muxandsel(1) | zero .... zero | pass .... pass | pass .... pass |
| muxandsel(2) | pass .... pass | pass .... pass | pass .... pass |
| muxandsel(3) | zero .... zero | pass .... pass | pass .... pass |
| OUT2 | | | $32HHHH_{00}$ .. $32HHGH_{01}$ |
| OUT1 | | | |
| OUTPUT LEADS 524 | | | $HHHH_{00}$ .. $HHGH_{01}$ |

FIG. 19A

CONV_COL CONTROL SIGNALS AND OUTPUTS
DURING THE FORWARD OCTAVE 1 TRANSFORM

| 12 ···· 15 | 16 ···· 19 | 20 ···· 23 |
|---|---|---|
| $HHH_{30}$ ·· $HHG_{31}$ | | |
| 1 ···· 1 | 1 ···· 1 | 1 ···· 1 |
| 3 ···· 3 | 2 ···· 2 | 1 ···· 1 |
| 4 ···· 4 | 3 ···· 3 | 2 ···· 2 |
| zero ···· zero | pass ···· pass | zero ···· zero |
| pass ···· pass | zero ···· zero | pass ···· pass |
| add ···· add | add ···· add | add ···· add |
| sub ···· sub | add ···· add | sub ···· sub |
| add ···· add | add ···· add | add ···· add |
| add ···· add | sub ···· sub | add ···· add |
| r ···· r | l ···· l | r ···· r |
| l ···· l | r ···· r | l ···· l |
| pass ···· pass | zero ···· zero | pass ···· pass |
| pass ···· pass | pass ···· pass | pass ···· pass |
| pass ···· pass | zero ···· zero | pass ···· pass |
| | $32HHHH_{10}$ ·· $32HHGH_{11}$ | |
| $32HHHG_{00}$ · $32HHGG_{01}$ | | $32HHHG_{10}$ .. $32HHGG_{11}$ |
| $HHHG_{00}$ .. $HHGG_{01}$ | $HHHH_{10}$ .. $HHGH_{11}$ | $HHHG_{10}$ .. $HHGG_{11}$ |

FIG. 19B

KEY TO FIG 19

| FIG. 19A | FIG. 19B |
|---|---|

FIG 19

CONV_COL CONTROL SIGNALS AND OUTPUTS
DURING THE FORWARD OCTAVE 1 TRANSFORM

| t | Input Data Value | Output of Block 1326 | |
|---|---|---|---|
| 0 | $HHH_{00}$ | | |
| . | . | . | |
| . | . | . | |
| . | . | . | |
| 3 | $HHG_{01}$ | | |
| 4 | $HHH_{10}$ | $32aHHH_{10}$ | |
| . | . | . | |
| . | . | . | |
| 7 | $HHG_{11}$ | $32aHHG_{11}$ | |
| 8 | $HHH_{20}$ | $32HHHG_{00} = 32\{(c+d)HHH_{00} - bHHH_{10} + aHHH_{20}\}$ | |
| . | . | . | |
| . | . | . | |
| 11 | $HHG_{21}$ | $32HHGG_{01} = 32\{(c+d)HHG_{01} - bHHG_{11} + aHHG_{21}\}$ | |
| 12 | $HHH_{30}$ | . | |
| . | . | . | |
| . | . | . | |
| 15 | $HHG_{31}$ | . | |
| 16 | | $32HHHG_{10} = 32\{dHHH_{10} + cHHH_{20} - (b-a)HHH_{30}\}$ | |
| . | | . | |
| . | | . | |
| 19 | | $32HHGG_{11} = 32\{dHHG_{11} + HHG_{21} - (b-a)HHG_{31}\}$ | |

FIG. 20A

CONV_COL DATA FLOW FOR FORWARD
OCTAVE 1 TRANSFORM

| Output of Block 1328 | Output of Block 1330 |
|---|---|
| $32(a+b)HHH_{00}$ | $32(c+d)HHH_{00}$ |
| . . . | . . . |
| $32(a+b)HHG_{01}$ | $32(c+d)HHG_{01}$ |
| $32\{(c+d)HHH_{00} - bHHH_{10}\}$ | $32\{(a+b)HHH_{00} + cHHH_{10}\}$ |
| . . . | . . . |
| $32\{(c+d)HHG_{01} - bHHG_{11}\}$ | $32\{(a+b)HHG_{01} + cHHG_{11}\}$ |
| $32\{aHHH_{10} + bHHH_{20}\}$ | $32\{dHHH_{10} + cHHH_{20}\}$ |
| . . . | . . . |
| $32\{aHHG_{11} + bHHG_{21}\}$ | $32\{dHHG_{11} + cHHG_{21}\}$ |
| $32\{dHHH_{10} + cHHH_{20} - (b-a)HHH_{30}\}$ | $32\{aHHH_{10} + bHHH_{20} + (c-d)HHH_{30}\}$ |
| . . . | . . . |
| $32\{dHHG_{11} + cHHG_{21} - (b-a)HHG_{31}\}$ | $32\{aHHG_{11} + bHHG_{20} + (c-d)HHG_{31}\}$ |

FIG. 20B

CONV_COL DATA FLOW FOR FORWARD
OCTAVE 1 TRANSFORM

Output of Block 1332

$32dHHH_{10}$ $32dHHG_{11}$ $32\{(a+b)HHH_{00} + cHHH_{10} - dHHH_{20}\} = 32HHHH_{00}$ $32\{(a+b)HHG_{01} + cHHG_{11} - dHHG_{21}\} = 32HHGH_{01}$ $32\{aHHH_{10} + bHHH_{20} + (c-d)HHH_{30}\} = 32HHHH_{10}$ $32\{aHHG_{11} + bHHG_{21} + (c-d)HHG_{31}\} = 32HHGH_{11}$

FIG. 20C

CONV_COL DATA FLOW FOR FORWARD
OCTAVE 1 TRANSFORM

KEY TO FIG. 20

| FIG. 20A | FIG. 20B | FIG. 20C |

FIG. 20

CONTROL BLOCK OF THE
DISCRETE WAVELET
TRANSFORM CIRCUIT

CONTROL BLOCK OF THE DISCRETE WAVELET TRANSFORM CIRCUIT

KEY TO FIG. 21

| FIG. 21A | FIG. 21B |

| Time t | 0 ···· 3 | 4 ···· 7 | 8 ···· 11 |
|---|---|---|---|
| muxsel(1) | 2 ···· 2 | 4 ···· 4 | 3 ···· 3 |
| muxsel(2) | 3 ···· 3 | 1 ···· 1 | 1 ···· 1 |
| muxsel(3) | 1 ···· 1 | 1 ···· 1 | 1 ···· 1 |
| andsel(1),(4) | zero ···· zero | pass ···· pass | zero ···· zero |
| andsel(2) | zero ···· zero | pass ···· pass | pass ···· pass |
| andsel(3) | pass ···· pass | pass ···· pass | pass ···· pass |
| addsel(1) | add ···· add | add ···· add | add ···· add |
| addsel(2) | add ···· add | sub ···· sub | add ···· add |
| addsel(3) | add ···· add | add ···· add | add ···· add |
| addsel(4) | sub ···· sub | add ···· add | sub ···· sub |
| centermuxel(1) | r ···· r | l ···· l | r ···· r |
| centermuxel(2) | l ···· l | r ···· r | l ···· l |
| muxandsel(1) | pass ···· pass | pass ···· pass | pass ···· pass |
| muxandsel(2) | zero ···· zero | pass ···· pass | pass ···· pass |
| muxandsel(3) | pass ···· pass | zero ···· zero | pass ···· pass |
| OUT2 | | | |
| OUT1 | | | $8HHH_{00}$ ·· $8HHG_{01}$ |
| OUTPUT LEADS 524 | | | $HHH_{00}$ .. $HHG_{01}$ |

FIG. 22A

CONV_COL CONTROL SIGNALS AND OUTPUTS
FOR INVERSE OCTAVE 1 TRANSFORM

| 12 ···· 15 | 16 ···· 19 | 20 ···· 23 |
|---|---|---|
| 2 ···· 2 | 2 ···· 2 | 4 ···· 4 |
| 2 ···· 2 | 3 ···· 3 | 1 ···· 1 |
| 1 ···· 1 | 1 ···· 1 | 1 ···· 1 |
| pass ···· pass | zero ···· zero | pass ···· pass |
| pass ···· pass | zero ···· zero | pass ···· pass |
| pass ···· pass | pass ···· pass | pass ···· pass |
| add ···· add | add ···· add | add ···· add |
| sub ···· sub | add ···· add | sub ···· sub |
| add ···· add | add ···· add | add ···· add |
| add ···· add | sub ···· sub | add ···· add |
| l ···· l | r ···· r | l ···· l |
| r ···· r | l ···· l | r ···· r |
| pass ···· pass | pass ···· pass | pass ···· pass |
| pass ···· pass | zero ···· zero | pass ···· pass |
| pass ···· pass | pass ···· pass | zero ···· zero |
| 16HHH$_{10}$ ·· 16HHG$_{11}$ |  | 8HHH$_{30}$ ·· 8HHG$_{31}$ |
|  | 16HHH$_{20}$ · 16HHG$_{21}$ |  |
| HHH$_{10}$ ··· HHG$_{11}$ | HHH$_{20}$ ···· HHG$_{21}$ | HHH$_{30}$ ·· HHG$_{31}$ |

FIG. 22B
CONV_COL CONTROL SIGNALS AND OUTPUTS
FOR INVERSE OCTAVE 1 TRANSFORM

KEY TO FIG 22

| FIG. 22A | FIG. 22B |
|---|---|

FIG 22

| Time t | Input Data Value | OUTPUT OF BLOCK 1326 |
|---|---|---|
| 0 | $HHHH_{00}$ | $32cHHHH_{00}$ |
| . | | . |
| . | | . |
| 3 | $HHGH_{01}$ | $32cHHGH_{01}$ |
| 4 | $HHHG_{00}$ | $8HHH_{00} = 32\{(b-a)HHHH_{00} + (c-d)HHHG_{00}\}$ |
| . | | . |
| . | | . |
| 7 | $HHGG_{01}$ | $8HHG_{01} = 32\{(b-a)HHGH_{01} + (c-d)HHGG_{01}\}$ |
| 8 | $HHHH_{10}$ | $32(c+d)HHHH_{10}$ |
| . | | . |
| . | | . |
| 11 | $HHGH_{11}$ | $32(c+d)HHGH_{11}$ |
| 12 | $HHHG_{10}$ | $16HHH_{20} = 32\{-dHHHH_{00} + aHHHG_{00} + bHHHH_{10} + cHHGG_{10}\}$ |
| . | | . |
| . | | . |
| 15 | $HHGG_{11}$ | $16HHG_{21} = 32\{-dHHGH_{01} + aHHGG_{01} + bHHGH_{11} + cHHHG_{11}\}$ |
| 16 | | |
| . | | |
| . | | |
| 19 | | |
| 20 | | |
| . | | |
| . | | |
| 23 | | |

FIG. 23A

CONV_COL DATA FLOW FOR INVERSE
OCTAVE 1 TRANSFORM

| OUTPUT OF BLOCK 1328 | OUTPUT OF BLOCK 1330 |
|---|---|
| $32(b-a)HHHH_{00}$ | . |
| . | . |
| $32(b-a)HHGH_{01}$ | . |
| $32\{cHHHH_{00} - bHHHG_{00}\}$ | $32\{-dHHHH_{00} + aHHHG_{00}\}$ |
| . | . |
| $32\{cHHGH_{01} - bHHGG_{01}\}$ | $32\{-dHHGH_{01} + aHHGG_{01}\}$ |
| $32\{-dHHHH_{00} + aHHHG_{00} + bHHHH_{10}\}$ | $32\{cHHHH_{00} - bHHHG_{00} + aHHHH_{10}\}$ |
| . | . |
| $32\{-dHHGH_{01} + aHHGG_{01} + bHHGH_{11}\}$ | $32\{cHHGH_{01} - bHHGG_{01} + aHHGH_{11}\}$ |
| $32\{(c+d)HHHH_{10} - (a+b)HHHG_{10}\}$ | . |
| . | . |
| $32\{(c+d)HHGH_{11} - (a+b)HHGG_{11}\}$ | . |
| | $32\{(c+d)HHHH_{10} - (a+b)HHHG_{10}\}$ |
| | . |
| | $32\{(c+d)HHGH_{11} - (a+b)HHGG_{11}\}$ |

FIG. 23B

CONV_COL DATA FLOW FOR INVERSE
OCTAVE 1 TRANSFORM

CONV_COL DATA FLOW FOR INVERSE OCTAVE 1 TRANSFORM

| Time t | 0 | 1 | 2 | 3 | 4 |
|---|---|---|---|---|---|
| INPUT DATA VALUE | $HHH_{00}$ | $HHG_{00}$ | $HHH_{01}$ | $HHG_{01}$ | $HHH_{10}$ |
| muxsel(1) | 2 | 4 | 3 | 2 | 2 |
| muxsel(2) | 3 | 1 | 1 | 2 | 3 |
| muxsel(3) | 1 | 1 | 1 | 1 | 1 |
| andsel(1),(4) | zero | pass | zero | pass | zero |
| andsel(2) | zero | pass | pass | pass | zero |
| andsel(3) | pass | pass | pass | pass | pass |
| addsel(1) | add | add | add | add | add |
| addsel(2) | add | sub | add | sub | add |
| addsel(3) | add | add | add | add | add |
| addsel(4) | sub | add | sub | add | sub |
| centermuxsel (1) | r | l | r | l | r |
| centermuxsel (2) | l | r | l | r | l |
| muxandsel (1) | pass | pass | pass | pass | pass |
| muxandsel (2) | zero | pass | pass | pass | zero |
| muxandsel (3) | pass | zero | pass | pass | pass |
| OUT 2 | | | | | $16HH_{01}$ |
| OUT 1 | | | $8HH_{00}$ | | $16HH_{02}$ |
| OUTPUT LEADS 520 | | | | $HH_{00}$ | $HH_{01}$ | $HH_{02}$ |

FIG. 24

CONV_ROW CONTROL SIGNALS AND OUTPUTS FOR INVERSE OCTAVE 1 TRANSFORM

| Time | Input Data Value | Output of Block 926 | Output of Block 928 |
|---|---|---|---|
| 0 | $HHH_{00}$ | $32cHHH_{00}$ | $32(b-a)HHH_{00}$ |
| 1 | $HHG_{00}$ | $8HH_{00} = 32\{(b-a)HHH_{00} + (c-d)HHG_{00}\}$ | $32\{cHHH_{00} - bHHG_{00}\}$ |
| 2 | $HHH_{01}$ | $32(c+d)HHH_{01}$ | $32\{-dHHH_{00} + aHHG_{00} + bHHH_{01}\}$ |
| 3 | $HHG_{01}$ | $16HH_{02} = 32\{-dHHH_{00} + aHHG_{00} + bHHH_{01} + cHHG_{01}\}$ | $32\{(c+d)HHH_{03} - (a+b)HHG_{01}\}$ |
| 4 | $HHH_{10}$ | $32cHHH_{10}$ | $32(b-a)HHH_{10}$ |
| 5 | $HHG_{10}$ | $8HH_{10} = 32\{(b-a)HHH_{10} + (c-d)HHG_{10}\}$ | $32\{cHHH_{10} - bHHG_{10}\}$ |
| 6 | | | |

FIG. 25A

CONV_ROW DATA FLOW FOR INVERSE OCTAVE 1 TRANSFORM

CONV_ROW DATA FLOW FOR INVERSE OCTAVE 1 TRANSFORM

KEY TO FIG. 25

| FIG. 25A | FIG. 25B |

| Time t | 0 .... 7 | 8 .... 15 | 16 .... 23 |
|---|---|---|---|
| muxsel(1) | 2 .... 2 | 4 .... 4 | 2 .... 2 |
| muxsel(2) | 3 .... 3 | 1 .... 1 | 1 .... 1 |
| muxsel(3) | 1 .... 1 | 1 .... 1 | 1 .... 1 |
| andsel(1),(4) | zero .... zero | pass .... pass | zero .... zero |
| andsel(2) | zero .... zero | pass .... pass | pass .... pass |
| andsel(3) | pass .... pass | pass .... pass | pass .... pass |
| addsel(1) | add .... add | add .... add | add .... add |
| addsel(2) | add .... add | sub .... sub | add .... add |
| addsel(3) | add .... add | add .... add | add .... add |
| addsel(4) | sub .... sub | add .... add | sub .... sub |
| centermuxel(1) | r .... r | l .... l | r .... r |
| centermuxel(2) | l .... l | r .... r | l .... l |
| muxandsel(1) | pass .... pass | pass .... pass | pass .... pass |
| muxandsel(2) | zero .... zero | pass .... pass | pass .... pass |
| muxandsel(3) | pass .... pass | zero .... zero | pass .... pass |
| out2 | | | |
| out1 | | | 8H00 .... 8G03 |
| OUTPUT LEADS 524 | | | H00 .... G03 |

FIG. 26A

CONV_COL CONTROL SIGNALS AND OUTPUTS
DURING INVERSE OCTAVE 0 TRANSFORM

| 24 .... 31 | 32 .... 39 | .... | 48 .... 55 |
|---|---|---|---|
| 2 .... 2 | 2 .... 2 | .... | 3 .... 3 |
| 1 .... 1 | 1 .... 1 | .... | 1 .... 1 |
| 1 .... 1 | 1 .... 1 | .... | 1 .... 1 |
| pass .... pass | zero .... zero | .... | zero .... zero |
| pass .... pass | pass .... pass | .... | pass .... pass |
| pass .... pass | pass .... pass | .... | pass .... pass |
| add .... add | add .... add | .... | add .... add |
| sub .... sub | add .... add | .... | add .... add |
| add .... add | add .... add | .... | add .... add |
| add .... add | sub .... sub | .... | sub .... sub |
| l .... l | r .... l | .... | r .... r |
| r .... r | r .... l | .... | l .... l |
| pass .... pass | pass .... pass | .... | pass .... pass |
| pass .... pass | pass .... pass | .... | pass .... pass |
| pass .... pass | pass .... pass | .... | pass .... pass |
| $16H_{10}$ .. $16G_{13}$ | | | |
| | $16H_{20}$ .... $16G_{23}$ | | $16H_{40}$ .... $16G_{43}$ |
| $H_{10}$ .... $G_{13}$ | $H_{20}$ .... $G_{23}$ | | $H_{40}$ .... $G_{43}$ |

FIG. 26B

CONV_COL CONTROL SIGNALS AND OUTPUTS
DURING INVERSE OCTAVE 0 TRANSFORM

| 56 .... 63 | 64 .... 71 | 72 .... 79 |
|---|---|---|
| 2 .... 2 | 2 .... 2 | 4 .... 4 |
| 2 .... 2 | 3 .... 3 | 1 .... 1 |
| 1 .... 1 | 1 .... 1 | 1 .... 1 |
| pass .... pass | zero .... zero | pass .... pass |
| pass .... pass | zero .... zero | pass .... pass |
| pass .... pass | pass .... pass | pass .... pass |
| add .... add | add .... add | add .... add |
| sub .... sub | add .... add | sub .... sub |
| add .... add | add .... add | add .... add |
| add .... add | sub .... sub | add .... add |
| l .... l | r .... r | l .... l |
| r .... r | l .... l | r .... r |
| pass .... pass | pass .... pass | pass .... pass |
| pass .... pass | zero .... zero | pass .... pass |
| pass .... pass | pass .... pass | zero .... zero |
| $16H_{50}$ .... $16G_{53}$ |  | $8H_{70}$ .... $8G_{73}$ |
|  | $16H_{60}$ .... $16G_{63}$ |  |
| $H_{50}$ .... $G_{53}$ | $H_{60}$ .... $G_{63}$ | $H_{70}$ .... $G_{73}$ |

FIG. 26C

CONV_COL CONTROL SIGNALS AND OUTPUTS
DURING INVERSE OCTAVE 0 TRANSFORM

KEY TO FIG 26

| FIG. 26A | FIG. 26B | FIG. 26C |
|---|---|---|

FIG 26

| Time t | Input Data Value | Output of Block 1326 |
|---|---|---|
| 0 | $HH_{00}$ | $32cHH_{00}$ |
| ⋮ | ⋮ | ⋮ |
| 7 | $GH_{03}$ | $32cGH_{03}$ |
| 8 | $HG_{00}$ | $8H_{00} = 32\{(b-a)HH_{00} + (c-d)HG_{00}\}$ |
| ⋮ | ⋮ | ⋮ |
| 15 | $GG_{03}$ | $8G_{03} = 32\{(b-a)GH_{03} + (c-d)GG_{03}\}$ |
| 16 | $HH_{10}$ | $32cHH_{10}$ |
| ⋮ | ⋮ | ⋮ |
| 23 | $GH_{13}$ | $32cGH_{13}$ |
| 24 | $HG_{10}$ | $16H_{20} = 32\{-dHH_{00} + aHG_{00} + bHH_{10} + cHG_{10}\}$ |
| ⋮ | ⋮ | ⋮ |
| 31 | $GG_{13}$ | $16G_{23} = 32\{-dGH_{03} + aGG_{03} + bGH_{13} + cGG_{13}\}$ |
| 32 | $HH_{20}$ | $32cHH_{20}$ |
| ⋮ | ⋮ | ⋮ |
| 39 | $GH_{23}$ | $32cGH_{23}$ |

FIG. 27A

CONV_COL DATA FLOW FOR THE INVERSE OCTAVE 0 TRANSFORM

| Output of Block 1328 | Output of Block 1330 |
|---|---|
| $32(b-a)HH_{00}$ | . |
| . . | . . |
| $32(b-a)GH_{03}$ | . |
| $32cHH_{00} - 32bHG_{00}$ | $-32dHH_{00} + 32aHG_{00}$ |
| . . | . . |
| $32cGH_{03} - 32bGG_{03}$ | $-32dGH_{03} + 32aGG_{03}$ |
| $32\{-dHH_{00} + aHG_{00} + bHH_{10}\}$ | $32\{cHH_{00} - bHG_{00} + aHH_{10}\}$ |
| . . | . . |
| $32\{-dGH_{03} + aGG_{03} + bGH_{13}\}$ | $32\{cGH_{03} - bGG_{03} + aGH_{13}\}$ |
| $32cHH_{10} - 32bHG_{10}$ | $-32dHH_{10} + 32aHG_{10}$ |
| . . | . . |
| $32cGH_{13} - 32bGG_{13}$ | $-32dGH_{13} + 32aGG_{13}$ |
| $32\{-dHH_{10} + aHG_{10} + bHH_{20}\}$ | $32\{cHH_{10} - bHG_{10} + aHH_{20}\}$ |
| | |
| $32\{-dGH_{13} + aGG_{13} + bGH_{23}\}$ | $32\{cGH_{13} - bGG_{13} + aGH_{23}\}$ |
| | |

FIG. 27B

CONV_COL DATA FLOW FOR THE
INVERSE OCTAVE 0 TRANSFORM

CONV_COL DATA FLOW FOR THE INVERSE OCTAVE 0 TRANSFORM

| | | |
|---|---|---|
| 48 | $HH_{30}$ | $32(c+d)HH_{30}$ |
| ⋮ | ⋮ | ⋮ |
| 55 | $GH_{33}$ | $32(c+d)GH_{30}$ |
| 56 | $HG_{30}$ | $16H_{60} = 32\{-dHH_{20} + aHG_{20} + bHH_{30} + cHG_{30}\}$ |
| ⋮ | ⋮ | ⋮ |
| 63 | $GG_{33}$ | $16G_{63} = 32\{-dGH_{23} + aGG_{23} + bGH_{33} + cGG_{33}\}$ |
| 64 | | |
| ⋮ | | ⋮ |
| 71 | | |
| 72 | | |
| ⋮ | | ⋮ |
| 79 | | |

FIG. 27D

CONV_COL DATA FLOW FOR THE
INVERSE OCTAVE 0 TRANSFORM

| | |
|---|---|
| $32\{-dHH_{20} + aHG_{20} + bHH_{30}\}$ | $32\{cHH_{20} - bHG_{20} + aHH_{30}\}$ |
| ⋮ | ⋮ |
| $32\{-dGH_{21} + aGG_{21} + bGH_{31}\}$ | $32\{cGH_{21} - bGG_{21} + aGH_{31}\}$ |
| $32(c+d)HH_{30} - 32(a+b)HG_{30}$ | ⋮ |
| ⋮ | ⋮ |
| $32(c+d)GH_{33} - 32(a+b)GG_{33}$ | ⋮ |
| ⋮ | $32(c+d)HH_{30} - 32(a+b)HG_{30}$ |
| ⋮ | ⋮ |
| ⋮ | $32(c+d)GH_{33} - 32(a+b)GG_{33}$ |
| ⋮ | ⋮ |
| ⋮ | ⋮ |
| ⋮ | ⋮ |

FIG. 27E

CONV_COL DATA FLOW FOR THE
INVERSE OCTAVE 0 TRANSFORM $$32\{cHH_{20} - bHG_{20} + aHH_{30} + dHG_{30}\} = 16H_{50}$$

$$32\{cGH_{23} - bGG_{23} + aGH_{33} + dGG_{33}\} = 16G_{53}$$

$$32\{(c+d)HH_{30} - (a+b)HG_{30}\} = 8H_{70}$$

$$32\{(c+d)GH_{33} - (a+b)GG_{33}\} = 8G_{73}$$

KEY TO FIG. 27

| FIG. 27A | FIG. 27B | FIG. 27C |
|---|---|---|
| FIG. 27D | FIG. 27E | FIG. 27F |

CONV_COL DATA FLOW FOR THE INVERSE OCTAVE 0 TRANSFORM

| Time t | 0 | 1 | 2 | 3 | 4 | 5 |
|---|---|---|---|---|---|---|
| Input Data Value | $H_{00}$ | $G_{00}$ | $H_{01}$ | $G_{01}$ | $H_{02}$ | $G_{02}$ |
| muxsel(1) | 2 | 4 | 2 | 2 | 2 | 2 |
| muxsel(2) | 3 | 1 | 1 | 1 | 1 | 1 |
| muxsel(3) | 1 | 1 | 1 | 1 | 1 | 1 |
| andsel(1),(4) | zero | pass | zero | pass | zero | pass |
| andsel(2) | zero | pass | pass | pass | pass | pass |
| andsel(3) | pass | pass | pass | pass | pass | pass |
| addsel(1) | add | add | add | add | add | add |
| addsel(2) | add | sub | add | sub | add | sub |
| addsel(3) | add | add | add | add | add | add |
| addsel(4) | sub | add | sub | add | sub | add |
| centermuxsel (1) | r | l | r | l | r | l |
| centermuxsel (2) | l | r | l | r | l | r |
| muxandsel (1) | pass | pass | pass | pass | pass | pass |
| muxandsel (2) | zero | pass | pass | pass | pass | pass |
| muxandsel (3) | pass | zero | pass | pass | pass | pass |
| OUT 2 | | | | | $16D_{01}$ | |
| OUT 1 | | | $8D_{00}$ | | $16D_{02}$ | |
| OUTPUT LEADS 520 | | | | $D_{00}$ | $D_{01}$ | $D_{02}$ |

FIG. 28A
CONV_ROW CONTROL SIGNALS AND
OUTPUTS DURING INVERSE OCTAVE 0 TRANSFORM

| 6 | 7 | 8 | 9 | 10 |
|---|---|---|---|---|
| $H_{03}$ | $G_{03}$ | $H_{10}$ | $G_{10}$ | $H_{11}$ |
| 3 | 2 | 2 | 4 | 2 |
| 1 | 2 | 3 | 1 | 1 |
| 1 | 1 | 1 | 1 | 1 |
| zero | pass | zero | pass | zero |
| pass | pass | zero | pass | pass |
| pass | pass | pass | pass | pass |
| add | add | add | add | add |
| add | sub | add | sub | add |
| add | add | add | add | add |
| sub | add | sub | add | sub |
| r | l | r | l | r |
| l | r | l | r | l |
| pass | pass | pass | pass | pass |
| pass | pass | zero | pass | pass |
| pass | pass | pass | zero | pass |
| $16D_{03}$ |  | $16D_{05}$ |  | $8D_{07}$ |
| $16D_{04}$ |  | $16D_{06}$ |  | $8D_{10}$ |
| $D_{03}$ | $D_{04}$ | $D_{05}$ | $D_{06}$ | $D_{07}$ | $D_{10}$ |

FIG. 28B

CONV_ROW CONTROL SIGNALS AND
OUTPUTS DURING INVERSE OCTAVE O TRANSFORM

KEY TO Fig. 28

| Fig. 28A | Fig. 28B |
|---|---|

Fig. 28

| Time | Data Values | Output of Block 926 | Output of Block 928 |
|---|---|---|---|
| 0 | $H_{00}$ | | $32(b-a)H_{00}$ |
| 1 | $G_{00}$ | $8D_{00} = 32\{(b-a)H_{00} + (c-d)G_{00}\}$ | $32\{cH_{00} - bG_{00}\}$ |
| 2 | $H_{01}$ | $32cH_{00}$ | $32\{-dH_{00} + aG_{00} + bH_{01}\}$ |
| 3 | $G_{01}$ | $16D_{02} = 32\{-dH_{00} + aG_{00} + bH_{01} + cG_{01}\}$ | $32\{cH_{01} - bG_{01}\}$ |
| 4 | $H_{02}$ | $32cH_{01}$ | $32\{-dH_{01} + aG_{01} + bH_{02}\}$ |
| 5 | $G_{02}$ | $16D_{04} = 32\{-dH_{01} + aG_{01} + bH_{02} + cG_{02}\}$ | $32\{cH_{02} - bG_{02}\}$ |
| 6 | $H_{03}$ | $32cH_{02}$ | $32\{-dH_{02} + aG_{02} + bH_{03}\}$ |
| 7 | $G_{03}$ | $16D_{06} = 32\{-dH_{02} + aG_{02} + bH_{03} + cG_{03}\}$ | $32\{(c+d)H_{03} - (a+b)G_{03}\}$ |
| 8 | $H_{10}$ | $32(c+d)H_{03}$ | $32(b-a)H_{10}$ |
| 9 | $G_{10}$ | $8D_{10} = 32\{(b-a)H_{10} + (c-d)G_{10}\}$ | $32\{cH_{10} - bG_{10}\}$ |
| 10 | | | |

FIG. 29A   CONV_ROW DATA FLOW FOR THE INVERSE OCTAVE 0 TRANSFORM

CONV_ROW DATA FLOW FOR THE INVERSE OCTAVE 0 TRANSFORM

DWT ADDRESS GENERATOR

DWT ADDRESS GENERATOR

TREE PROCESSOR ENCODER MODE

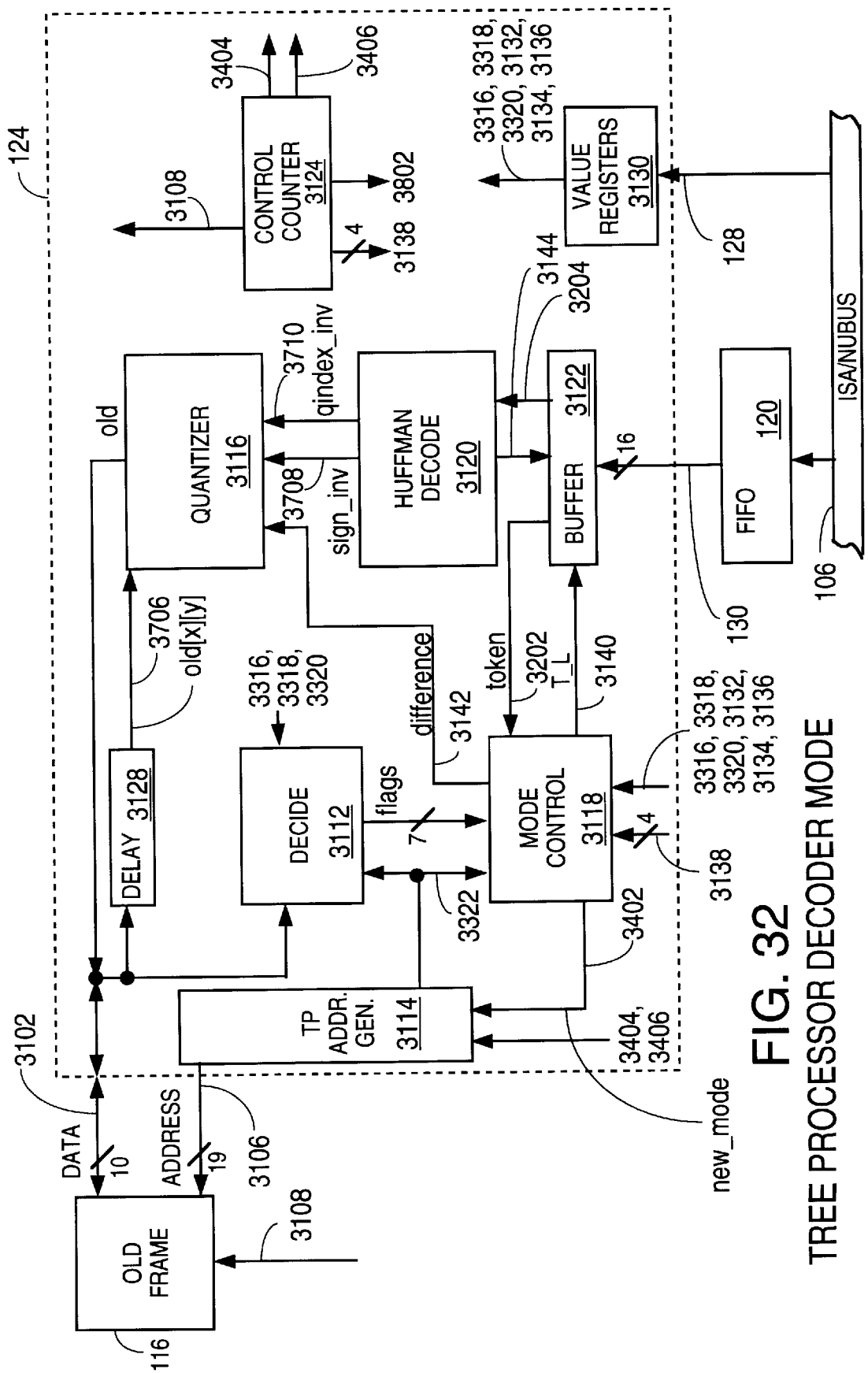
FIG. 32 TREE PROCESSOR DECODER MODE

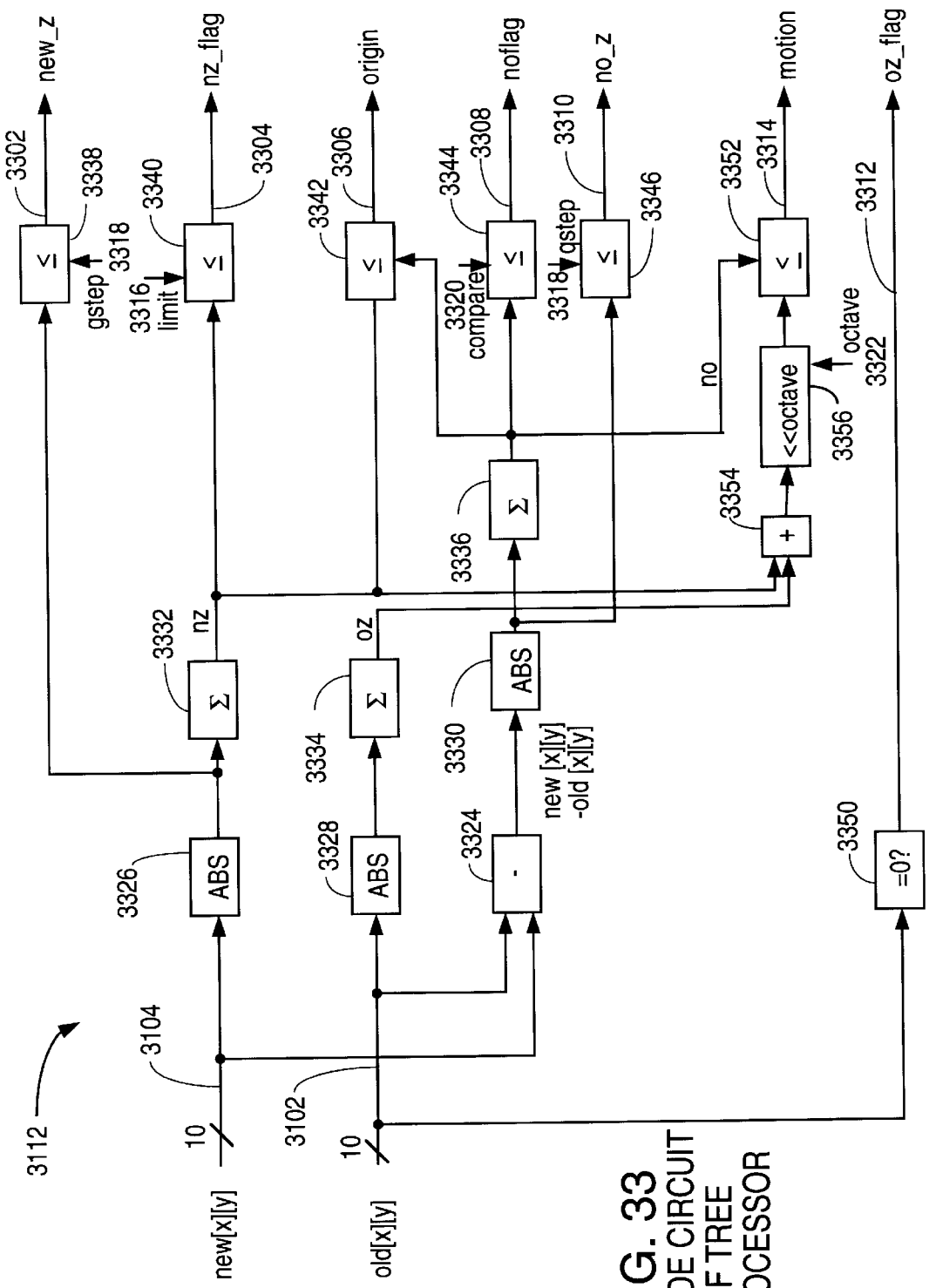
FIG. 33 DECIDE CIRCUIT OF TREE PROCESSOR

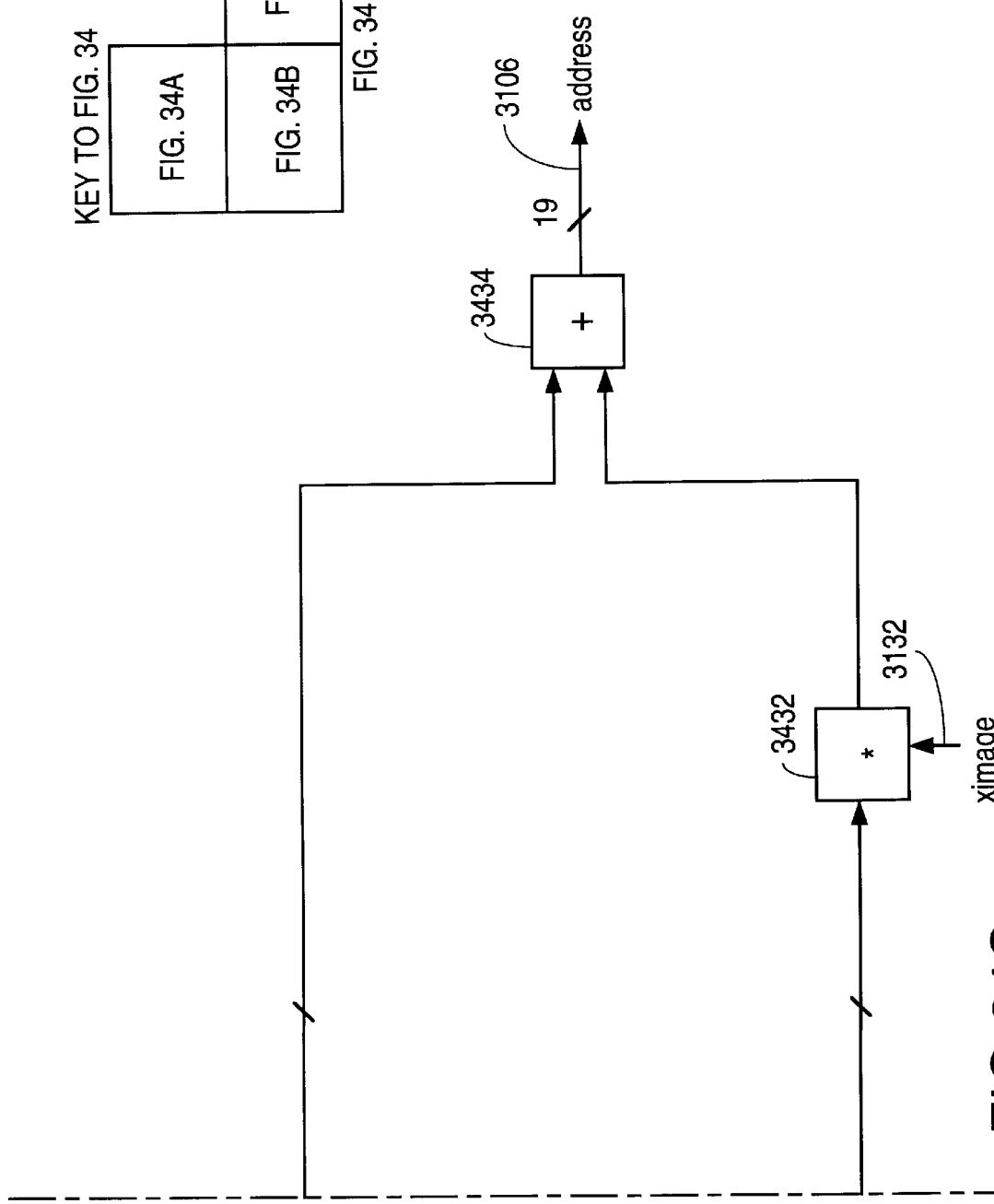

| octave | STATE OF COUNTER C3 | STATE OF COUNTER C2 | STATE OF COUNTER C1 | RELATIVE MOVEMENT BETWEEN TREE NODES |
|---|---|---|---|---|
| 2 | (0-3) | 0 | 0 | up0 |
| 1 | 0 | (0-3) | 0 | up1 |
| 0 | 0 | 0 | (0-3) | zz0 |
| 0 | 0 | 1 | (0-3) | zz1 |
| 0 | 0 | 2 | (0-3) | zz2 |
| 0 | 0 | 3 | (0-3) | zz3 |
| 1 | 1 | (0-3) | 0 | down1 |
| 0 | 1 | 0 | (0-3) | zz0 |
| 0 | 1 | 1 | (0-3) | zz1 |
| 0 | 1 | 2 | (0-3) | zz2 |
| 0 | 1 | 3 | (0-3) | zz3 |
| 1 | 2 | (0-3) | 0 | down2 |
| 0 | 2 | 0 | (0-3) | zz0 |
| 0 | 2 | 1 | (0-3) | zz1 |
| 0 | 2 | 2 | (0-3) | zz2 |
| 0 | 2 | 3 | (0-3) | zz3 |
| 1 | 3 | (0-3) | 0 | down3 |
| 0 | 3 | 0 | (0-3) | zz0 |
| 0 | 3 | 1 | (0-3) | zz1 |
| 0 | 3 | 2 | (0-3) | zz2 |
| 0 | 3 | 3 | (0-3) | zz3 |
| 2 | (0-3) | 0 | 0 | up0 |
| 1 | 0 | (0-3) | 0 | up1 |
| . | . | . | . | . |
| . | . | . | . | . |
| . | . | . | . | . |

FIG. 35

STATE TRANSITION DIAGRAM OF CONTROL ENABLE BLOCK OF TREE PROCESSOR ADDRESS GENERATOR

TREE DECOMPOSITION (3 OCTAVES)

TREE DECOMPOSITION (3 OCTAVES)

QUANTIZER

INPUT / OUTPUT BUFFER

BUFFER IN ENCODER MODE

OUTPUT OF BARREL SHIFTER
OF BUFFER BLOCK IN ENCODER MODE

BUFFER IN DECODER MODE

PIPELINED ENCODING/DECODING

OCTAVE 1

DEVICE AND METHOD FOR DATA COMPRESSION/DECOMPRESSION USING A DISCRETE WAVELET TRANSFORM

CROSS REFERENCE TO RELATED APPLICATIONS

This application is a continuation of application Ser. No. 08/130,571 filed on Oct. 1, 1993 now abandoned, which is a continuation-in-part of U.S. patent application Ser. No. 08/100,747 entitled "Data Compression and Decompression" now U.S. Pat. No. 5,661,822 which in turn is a continuation-in-part of U.S. patent application Ser. No. 08/040,301 entitled "Data Compression and Decompression" now U.S. Pat. No. 5,546,477. The subject matter of both applications is incorporated herein by reference.

CROSS REFERENCE TO PAPER APPENDICES

Appendix A, which is a part of the present disclosure, is a paper appendix of 6 pages. Appendix A is a description of a CONTROL_ENABLE block contained in the tree processor/encoder-decoder portion of a video encoder/decoder integrated circuit chip, written in the VHDL hardware description language.

Appendix B, which is a part of the present disclosure, is a paper appendix of 9 pages. Appendix B is a description of a MODE_CONTROL block contained in the tree processor/encoder-decoder portion of a video encoder/decoder integrated circuit chip, written in the VHDL hardware description language.

Appendix C, which is a part of the present disclosure, is a paper appendix of 10 pages. Appendix C is a description of a CONTROL_COUNTER block contained in the tree processor/encoder-decoder portion of a video encoder/decoder integrated circuit chip, written in the VHDL hardware description language.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The VHDL hardware description language of Appendices A, B and C is an international standard, IEEE Standard 1076-1987, and is described in the "IEEE Standard VHDL Language Reference Manual".

CROSS REFERENCE TO MICROFICHE APPENDIX

Microfiche Appendix D, which is a part of the present disclosure, is a microfiche appendix of 3 sheets of microfiche having a total of 183 frames. Microfiche Appendix D is a description of one embodiment of a video encoder/decoder integrated circuit chip in the VHDL hardware description language. The VHDL hardware description language of Appendix D is an international standard, IEEE Standard 1076-1987, and is described in the "IEEE Standard VHDL Language Reference Manual". The "IEEE Standard VHDL Language Reference Manual" can be obtained from the Institute of Electrical and Electronics Engineers, Inc., 445 Hoese Lane, Piscataway, N.J. 08855, telephone 1-800-678-4333.

FIELD OF THE INVENTION

This invention relates to a method and apparatus for compressing, decompressing, transmitting, and/or storing digitally encoded data. In particular, this invention relates to the compression and decompression of digital video image data.

SUMMARY

An apparatus produces an encoded/compressed digital data stream from an original input digital data stream using a discrete wavelet transform and a tree encoding method. The apparatus is also capable of producing a decoded/decompressed digital data stream closely resembling the originally input digital data stream from an encoded/compressed digital data stream using a corresponding tree decoding method and a corresponding inverse discrete wavelet transform.

The apparatus comprises a discrete wavelet transform circuit which is capable of being configured to perform either a discrete wavelet transform or a corresponding inverse discrete wavelet transform. The discrete wavelet transform circuit comprises an address generator which generates the appropriate addresses to access data values stored in memory. Methods and structures for reducing the total amount of memory necessary to store data values and for taking advantage of various types of memory devices including dynamic random access memory (DRAM) devices are disclosed. A convolver circuit of the discrete wavelet transform circuit performs both boundary and non-boundary filtering for the forward discrete wavelet transform and performs start, odd, even and end reconstruction filtering for the inverse discrete wavelet transform. The convolver may serve the dual functions of 1) reducing the number of image data values before subsequent forward discrete wavelet transforming, and 2) operating on the reduced number of image data values to perform the forward discrete wavelet transform.

The apparatus also comprises a tree processor/encoder-decoder circuit which is configurable in an encoder mode or in a decoder mode. In the encoder mode, the tree processor/encoder-decoder circuit generates addresses to traverse trees of data values of a sub-band decomposition, generates tokens, and quantizes and Huffman encodes selected transformed data values stored in memory. In the decoder mode, the tree processor/decoder-encoder circuit receives Huffman encoded data values and tokens, Huffman decodes and inverse quantizes the encoded data values, recreates trees of transformed data values from the tokens and data values, and stores the recreated trees of data values in memory.

The apparatus is useful in, but not limited to, the fields of video data storage, video data transmission, television, video telephony, computer networking, and other fields of digital electronics in which efficient storage and/or transmission and/or retrieval of digitally encoded data is needed. The apparatus facilitates the efficient and inexpensive compression and storage of video and/or audio on compact laser discs (commonly known as CDs) as well as the efficient and inexpensive storage of video and/or audio on digital video tapes (commonly known as VCR or "video cassette recorder" tapes). Similarly, the invention facilitates the efficient and inexpensive retrieval and decompression of video and/or audio from digital data storage media including CDs and VCR tapes.

BRIEF DESCRIPTION OF THE DRAWINGS

FIG. 10 is a diagram illustrating control signals which control the row convolver of FIG. 5 and signals output by the row convolver of FIG. 5 during a forward octave 0 transform.

FIG. 11 is a diagram showing data flow in the row convolver of FIG. 5 during a forward octave 0 transform.

FIG. 12 is a diagram illustrating data values output by the row convolver of FIG. 5 during the forward octave 0 transform.

FIG. 14 is a diagram illustrating control signals which control the column convolver of FIG. 5 and signals output by the column convolver of FIG. 5 during a forward octave 0 transform.

FIG. 16 is a diagram illustrating data values present in memory unit 116 of FIG. 1 after operation of the column convolver of FIG. 5 during the forward octave 0 transform.

FIG. 17 is a diagram showing control signals controlling the row convolver of FIG. 5 and signals output by the row convolver of FIG. 5 during a forward octave 1 transform.

FIG. 19 is a diagram showing control signals controlling the column convolver of FIG. 5 and signals output by the column convolver of FIG. 5 during a forward octave 1 transform.

FIG. 20 is a diagram showing data flow in the column convolver of FIG. 5 during a forward octave 1 transform.

FIG. 22 is a diagram showing control signals controlling the column convolver of FIG. 5 and signals output by the column convolver of FIG. 5 during an inverse octave 1 transform.

FIG. 24 is a diagram showing control signals controlling the row convolver of FIG. 5 and signals output by the row convolver of FIG. 5 during an inverse octave 1 transform.

FIG. 26 is a diagram showing control signals controlling the column convolver of FIG. 5 and signals output by the column convolver of FIG. 5 during an inverse octave 0 transform.

FIG. 28 is a diagram showing control signals controlling the row convolver of FIG. 5 and signals output by the row convolver of FIG. 5 during an inverse octave 0 transform.

FIG. 32 is a block diagram of the tree processor/encoder-decoder circuit 124 of FIG. 1, simplified to illustrate a decoder mode.

FIG. 33 is a block diagram of the decide circuit block 3112 of the tree processor/encoder-decoder of FIGS. 31–32.

FIG. 35 illustrates the state table for the CONTROL_ENABLE block 3420 of the tree processor address generator of FIG. 34.

DETAILED DESCRIPTION OF PREFERRED EMBODIMENTS

Figure 1B:
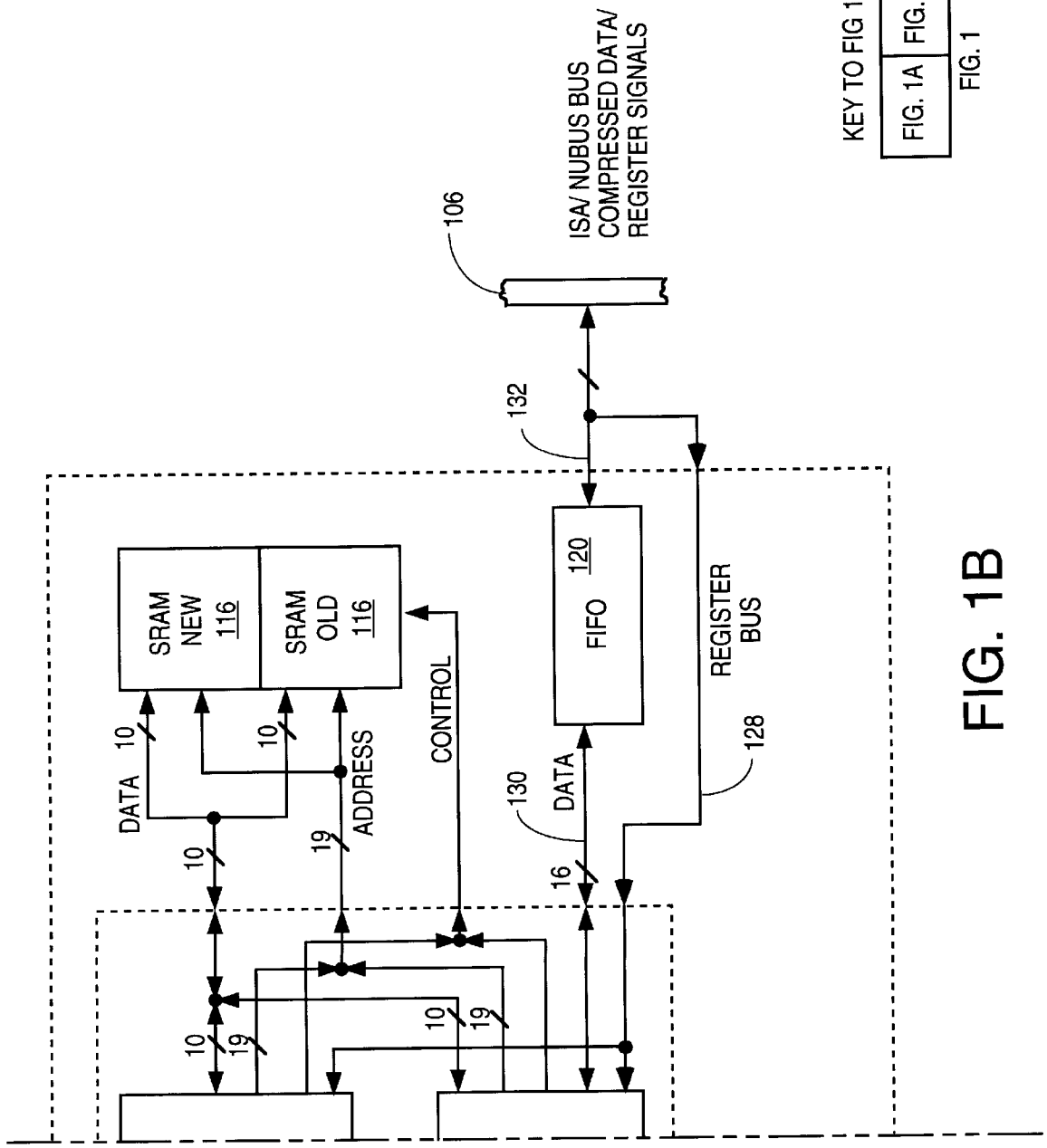
FIG. 1 is a block diagram of an expansion printed circuit board which is insertable into a card slot of a personal computer.

FIG. 1 illustrates a printed circuit expansion board 100 which is insertable into a card slot of a personal computer. Printed circuit board 100 may be used to demonstrate features in accordance with various aspects of the present invention. Printed circuit board 100 receives an analog video signal 101 from an external video source 104 (such as a CD player), converts information in the analog video signal into data in digital form, transforms and compresses the data, and outputs compressed data onto a computer data bus 106 (such as an ISA/NUBUS parallel bus of an IBM PC or IBM PC compatible personal computer). While performing this compression function, the board 100 can also output a video signal which is retrievable from the compressed data. This video signal can be displayed on an external monitor 108. This allows the user to check visually the quality of images which will be retrievable later from the compressed data while the compressed data is being generated. Board 100 can also read previously compressed video data from data bus 106 of the personal computer, decompress and inverse-transform that data into an analog video signal, and output this analog video signal to the external monitor 108 for display.

Board 100 comprises an analog-to-digital video decoder 110, a video encoder/decoder integrated circuit chip 112, two static random access memory (SRAM) memory units 114 and 116, a display driver 118, and a first-in-first-out memory 120. Analog-to-digital (A/D) video decoder 110 converts incoming analog video signal 101 into a digital format. Video encoder/decoder chip 112 receives the video signal in the digital format and performs a discrete wavelet transform (DWT) function, and then a tree processing function, and then a Huffman encoding function to produce a corresponding compressed digital data stream. Memory unit 116 stores "new" and "old" DWT-transformed video frames.

Video encoder/decoder chip 112 comprises a discrete wavelet transform circuit 122 and a tree processor/encoder-decoder circuit 124. The discrete wavelet transform circuit 122 performs either a forward discrete wavelet transformation or an inverse discrete wavelet transformation, depending on whether the chip 112 is configured to compress video data or to decompress compressed video data. Similarly, the tree processor/encoder-decoder circuit 124 either encodes wavelet-transformed images into a compressed data stream or decodes a compressed data stream into decompressed images in wavelet transform form, depending on whether the chip 112 is configured to compress or to decompress video data. Video encoder/decoder chip 112 is also coupled to computer bus 106 via a download register bus 128 so that the discrete wavelet transform circuit 122 and the tree processor/encoder-decoder circuit 124 can receive control values (such as a value indicative of image size) from ISA bus 106. The control values are used to control the transformation, tree processing, and encoding/decoding operations. FIFO buffer 120 buffers data flow between the video encoder/decoder chip 112 and the data bus 106. Memory unit 114 stores a video frame in uncompressed digital video format. Display driver chip 118 converts digital video data from either decoder 110 or from memory unit 114 into an analog video signal which can be displayed on external monitor 108.

Figure 2:
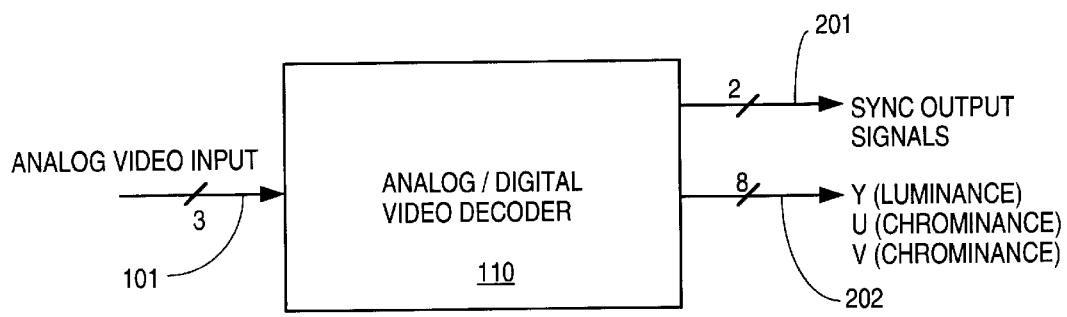
FIG. 2 is a block diagram of an embodiment of the analog/digital video decoder chip depicted in FIG. 1.

FIG. 2 is a block diagram of analog/digital video decoder 110. Analog/digital video decoder 110 converts the analog video input signal 101 into one 8-bit digital image data output signal 202 and two digital video SYNC output signals 201. The 8-bit digital image output signal 202 contains the pixel luminance values, Y, time multiplexed with the pixel chrominance values, U and V. The video SYNC output signals 201 comprise a horizontal synchronization signal and a vertical synchronization signal.

Figure 3A:
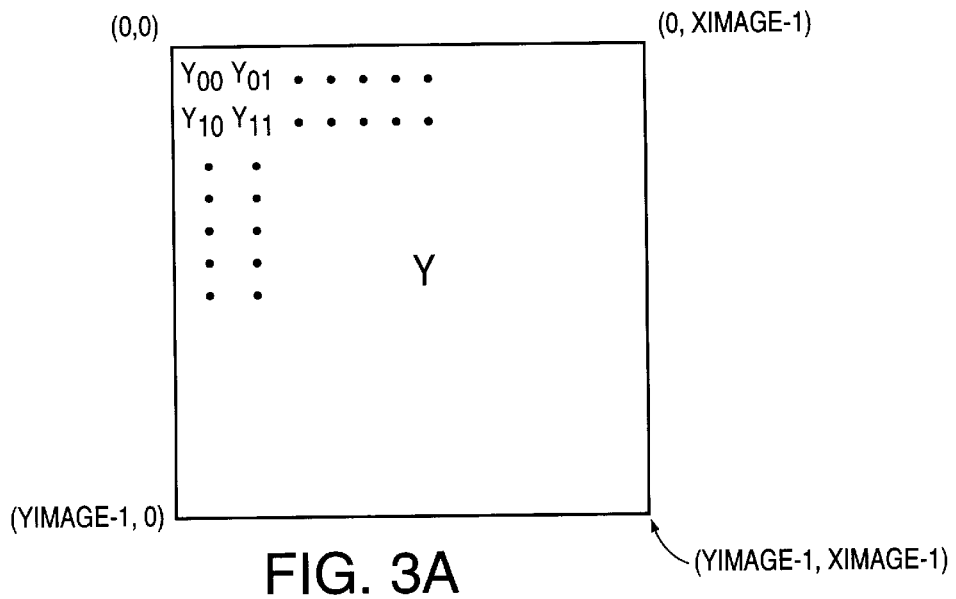
FIGS. 3A–C illustrate a 4:1:1 luminance-chrominance-chrominance format (Y:U:V) used by the expansion board of FIG. 1.
Figure 3B:
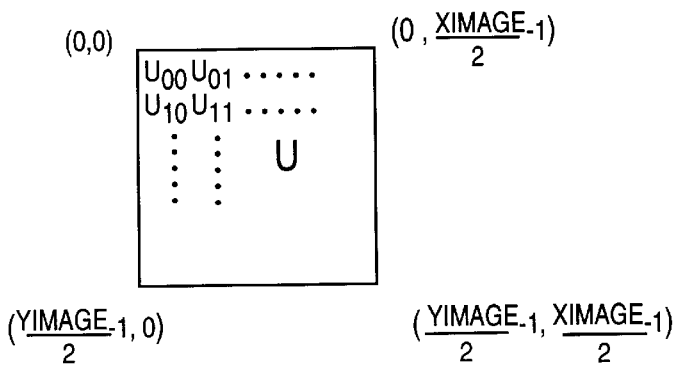
Figure 3C:
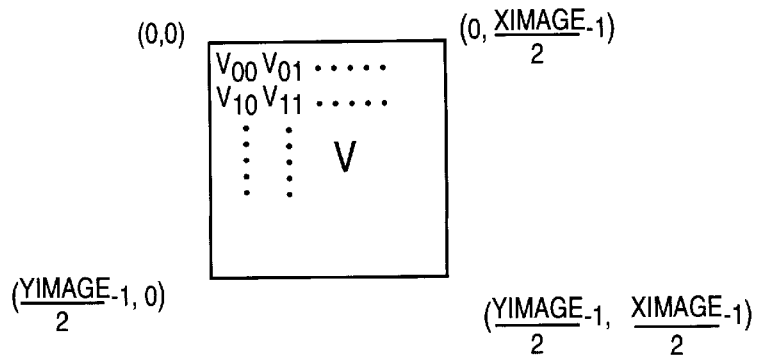

FIGS. 3A–C illustrate a 4:1:1 luminance-chrominance-chrominance format (Y:U:V) used by board 100. Because the human eye is less sensitive to chrominance variations than to luminance variations, chrominance values are subsampled such that each pixel shares an 8-bit chrominance value U and an 8-bit chrominance value V with three of its neighboring pixels. The four pixels in the upper-left hand corner of the image, for example, are represented by $\{Y_{00}, U_{00}, V_{00}\}$, $\{Y_{01}, U_{00}, V_{00}\}$, $\{Y_{10}, U_{00}, V_{00}\}$, and $\{Y_{11}, U_{00}, V_{00}\}$. The next four pixels to the right are represented by $\{Y_{02}, U_{01}, V_{01}\}$, $\{Y_{03}, U_{01}, V_{01}\}$, $\{Y_{12}, U_{01}, V_{01}\}$, and $\{Y_{13}, U_{01}, V_{01}\}$. A/D video decoder 110 serially outputs all the 8-bit Y-luminance values of a frame, followed by all the 8-bit U-chrominance values of the frame, followed by all the 8-bit V-chrominance values of the frame. The Y, U and V values for a frame are output every 1/30 of a second. A/D video decoder 110 outputs values in raster-scan format so that a row of pixel values $Y_{00}, Y_{01}, Y_{02} \ldots$ is output followed by a second row of pixel values $Y_{10}, Y_{11}, Y_{12} \ldots$ and so forth until all the values of the frame of FIG. 3A are output. The values of FIG. 3B are then output row by row and then the values of FIG. 3C are output row by row. In this 4:1:1 format, each of the U and V components of the image contains one quarter of the number of data values contained in the Y component.

Figure 4:
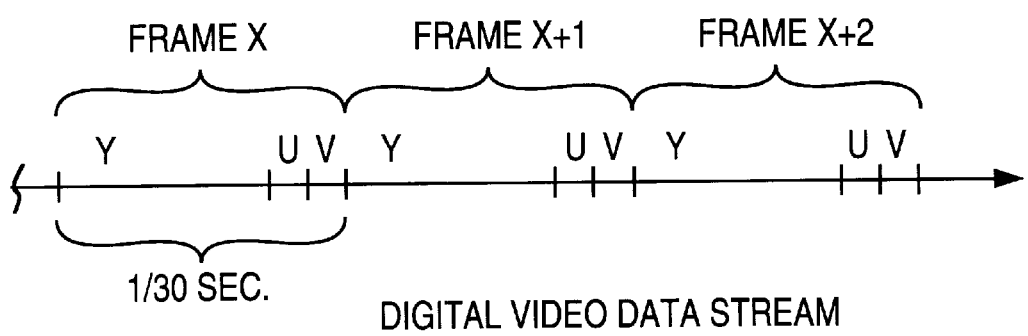
FIG. 4 is an illustration of a timeline of the output values output from the analog/digital video decoder chip of FIGS. 1 and 2.

FIG. 4 is a diagram of a timeline of the output of A/D video decoder 110. The bit rate of the decoder output is equal to 30 frames/sec×12 bits/pixel. For a 640×400 pixel image, for example, the data rate is approximately $110 \times 10^8$ bits/second. A/D video decoder 110 also detects the horizontal and vertical synchronization signals in the incoming analog video input signal 102 and produces corresponding digital video SYNC output signals 201 to the video encoder/decoder chip 112.

The video encoder/decoder integrated circuit chip 112 has two modes of operation. It can either transform and compress ("encode") a video data stream into a compressed data stream or it can inverse transform and decompress ("decode") a compressed data stream into a video data stream. In the compression mode, the digital image data 202 and the synchronization signals 201 are passed from the A/D video decoder 110 to the discrete wavelet transform circuit 122 inside the video encoder/decoder chip 112. The discrete wavelet transform circuit 122 performs a forward discrete wavelet transform operation on the image data and stores the resulting wavelet-transformed image data in the "new" portion of memory unit 116. At various times during this forward transform operation, the "new" portion of memory unit 116 stores intermediate wavelet transform results, such that certain of the memory locations of memory unit 116 are read and overwritten a number of times. The number of times the memory locations are overwritten corresponds to the number of octaves in the wavelet transform. After the image data has been converted into a sub-band decomposition of wavelet-transformed image data, the tree processor/encoder-decoder circuit 124 of encoder/decoder chip 112 reads wavelet-transformed image data of the sub-band decomposition from the "new" portion of memory 116, processes it, and outputs onto lines 130 a compressed ("encoded") digital data stream to FIFO buffer 120. During this tree processing and encoding operation, the tree processor/encoder-decoder circuit 124 also generates a quantized version of the encoded first frame and stores that quantized version in the "old" portion of memory unit 116. The quantized version of the encoded first frame is used as a reference when a second frame of wavelet-transformed image data from the "new" portion of memory unit 116 is subsequently encoded and output to bus 106. While the second frame is encoded and output to bus 106, a quantized version of the encoded second frame is written to the "old" portion of memory unit 116. Similarly, the quantized version of the encoded second frame in the "old" portion of memory unit 116 is later used as a reference for encoding a third frame of image data.

In the decompression mode, compressed ("encoded") data is written into FIFO 120 from data bus 106 and is read from FIFO 120 into tree processor/encoder-decoder circuit 124 of the video encoder/decoder chip 112. The tree processor/encoder-decoder circuit 124 decodes the compressed data into decompressed wavelet-transformed image data and then stores the decompressed wavelet-transformed image data into the "old" portion of memory unit 116. During this operation, the "new" portion of memory unit 116 is not used. Rather, the tree processor/encoder-decoder circuit 124 reads the previous frame stored in the "old" portion of memory unit 116 and modifies it with information from the data stream received from FIFO 120 in order to generate the next frame. The next frame is written over the previous frame in the same "old" portion of the memory unit 116. Once the decoded wavelet-transformed data of a frame of image data is present in the "old" portion of memory unit 116, the discrete wavelet transform circuit 122 accesses memory unit 116 and performs an inverse discrete wavelet transform operation on the frame of image data. For each successive octave of the inverse transform, certain of the memory locations in the "old" portion of memory unit 116 are read and overwritten. The number of times the locations are overwritten corresponds to the number of octaves in the wavelet transform. On the final octave of the inverse transform which converts the image data from octave-0 transform domain into standard image domain, the discrete wavelet transform circuit 122 writes the resulting decompressed and inverse-transformed image data into memory unit 114. The decompressed and inverse-transformed image data may also be output to the video display driver 118 and displayed on monitor 108.

Figure 5:
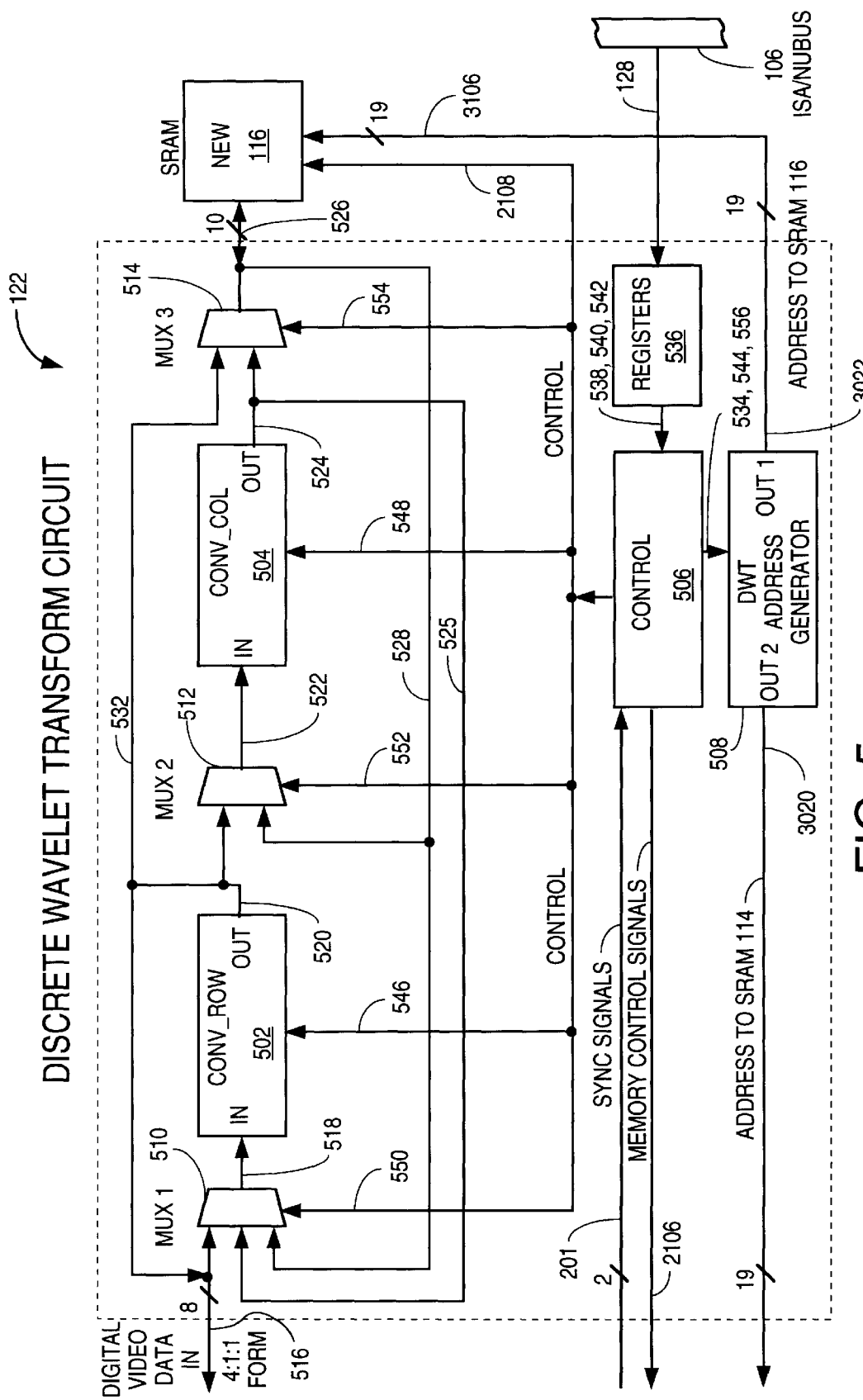
FIG. 5 is a block diagram of the discrete wavelet transform circuit of the video encoder/decoder chip of FIG. 1.

FIG. 5 is a block diagram of the discrete wavelet transform circuit 122 of video encoder/decoder chip 112. The discrete wavelet transform circuit 122 shown enclosed by a dashed line comprises a row convolver block CONV_ROW 502, a column convolver block CONV_COL 504, a control block 506, a DWT address generator block 508, a REGISTERS block 536, and three multiplexers, mux1 510, mux2 512, and mux3 514. In order to transform a frame of digital video image data received from A/D video decoder 110 into the wavelet transform domain, a forward two dimensional discrete wavelet transform is performed. Similarly, in order to return the wavelet transform digital data values of the frame into a digital video output suitable for displaying on a monitor such as 108, an inverse two dimensional discrete wavelet transform is performed. In the presently described embodiment of the present invention, four coefficient quasi-Daubechies digital filters are used as set forth in copending U.S. patent application Ser. No. 08/040,301 entitled "Data Compression and Decompression".

The discrete wavelet transform circuit 122 shown in FIG. 5 performs a forward discrete wavelet transform as follows. First, a stream of 8-bit digital video image data values is supplied, one value at a time, to the discrete wavelet transform circuit 122 via eight leads 516. The digital video image data values are coupled through multiplexer mux1 510 to the input leads 518 of the row convolver CONV_ROW block 502. The output leads 520 of CONV_ROW block 502 are coupled through multiplexer mux2 512 to input leads 522 of the CONV_COL block 504. The output leads 524 of CONV_COL 504 block are coupled to data leads 526 of memory unit 116 through multiplexer mux3 so that the data values output from CONV_COL block 504 can be written to the "new" portion of frame memory unit 116. The writing of the "new" portion of memory unit 116 completes the first pass, or octave, of the forward wavelet transform. To perform the next pass, or octave, of the forward wavelet transform, low pass component data values of the octave 0 transformed data values are read from memory unit 116 and are supplied to input leads 518 of CONV_ROW block 502 via input leads 526, lines 528 and multiplexer mux1 510. The flow of data proceeds through row convolver CONV_ROW block 502 and through column convolver CONV_COL block 504 with the data output from CONV_COL block 504 again being written into memory unit 116 through multiplexer mux3 514 and leads 526. Control block 506 provides control signals to mux1 510, mux2 512, mux3 514, CONV_ROW block 502, CONV_COL block 504, DWT address generator block 508, and memory unit 116 during this process. This process is repeated for each successive octave of the forward transform. The data values read from memory unit 116 for the next octave of the transform are the low pass values written to the memory unit 116 on the previous octave of the transform.

The operations performed to carry out the inverse discrete wavelet transform proceed in an order substantially opposite the operations performed to carry out the forward discrete wavelet transform. The frame of image data begins in the transformed state in memory unit 116. For example, if the highest octave in the forward transform (OCT) is octave 1, then transformed data values are read from memory unit 116 and are supplied to the input leads 522 of the CONV_COL block 504 via leads 526, lines 528 and multiplexer mux2 512. The data values output from CONV_COL block 504 are then supplied to the input leads 518 of CONV_ROW block 502 via lines 525 and multiplexer mux1 510. The data values output from CONV_ROW block 502 and present on output leads 520 are written into memory unit 116 via lines 532, multiplexer mux3 514 and leads 526. The next octave, octave 0, of the inverse transform proceeds in similar fashion except that the data values output by CONV_ROW block 502 are the fully inverse-transformed video data which are sent to memory unit 114 via lines 516 rather than to memory unit 116. Control block 506 provides control signals to multiplexer mux1 510, multiplexer mux2 512, multiplexer mux3 514, CONV_ROW block 502, CONV_COL block 504, DWT address generator block 508, memory unit 116, and memory unit 114 during this process.

In both forward wavelet transform and inverse wavelet transform operations, the control block 506 is timed by the external video sync signals 201 received from A/D video decoder 110. Control block 506 uses these sync signals as well as register input values ximage, yimage, and direction to generate the appropriate control signals mentioned above. Control block 506 is coupled to: multiplexer mux1 510 via control leads 550, multiplexer mux2 512 via control leads 552, multiplexer mux3 via control leads 554, CONV_ROW block 502 via control leads 546, CONV_COL block 504 via control leads 548, DWT address generator block 508 via control leads 534, 544, and 556, memory unit 116 via control leads 2108, and memory unit 114 via control leads 2106.

As shown in FIG. 5, multiplexer mux1 510 couples one of the following three sets of input signals to input leads 518 of CONV_ROW block 502, depending on the value of control signals on leads 550 supplied from CONTROL block 506: digital video input data values received on lines 516 from A/D video decoder 110, data values from memory unit 116 or data values from multiplexer mux3 514 received on lines 528, or data values from CONV_COL block 504 received on lines 525. Multiplexer mux2 512 couples either the data values being output from row convolver CONV_ROW block 502 or the data values being output from multiplexer mux3 514 received on lines 528 to input leads 522 of CONV_COL block 504, depending on the value of control signals on lead 552 generated by CONTROL block 506. Multiplexer mux3 514 passes either the data values being output from CONV_ROW 502 received on lines 532 or the data values being output from CONV_COL 504 onto lines 523 and leads 526, depending on control signals generated by CONTROL block 506. Blocks CONV_ROW 502, CONV_COL 504, CONTROL 506, DWT address generator 508, and REGISTERS 536 of FIG. 5 are described below in detail in connection with a forward transformation of a matrix of digital image data values. Lines 516, 532, 528 and 525 as well as input and output leads 518, 520, 522, 524 and 526 are each sixteen bit parallel lines and leads.

Figure 6:
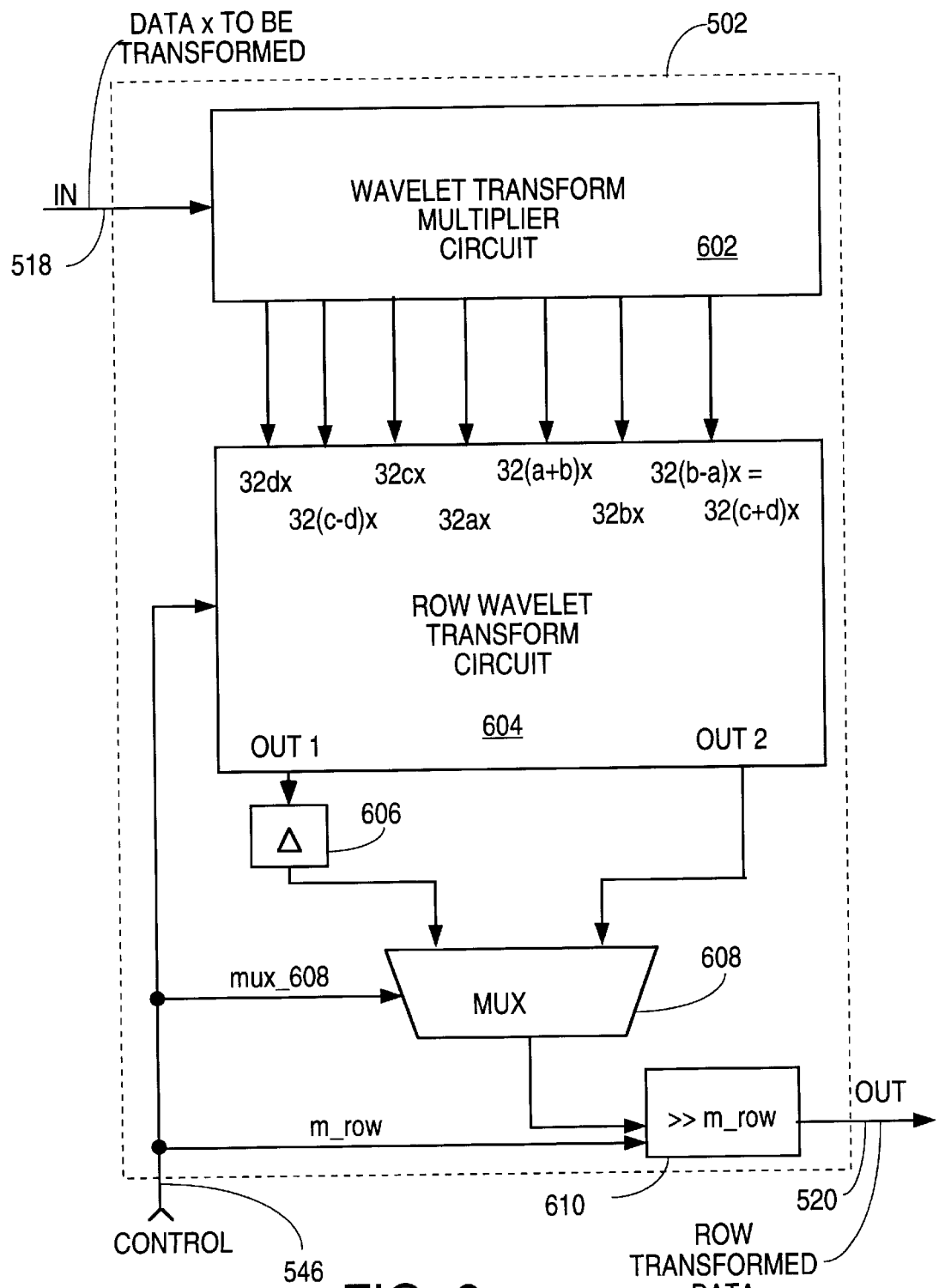
FIG. 6 is a block diagram of the row convolver block of FIG. 5.
Figure 7:
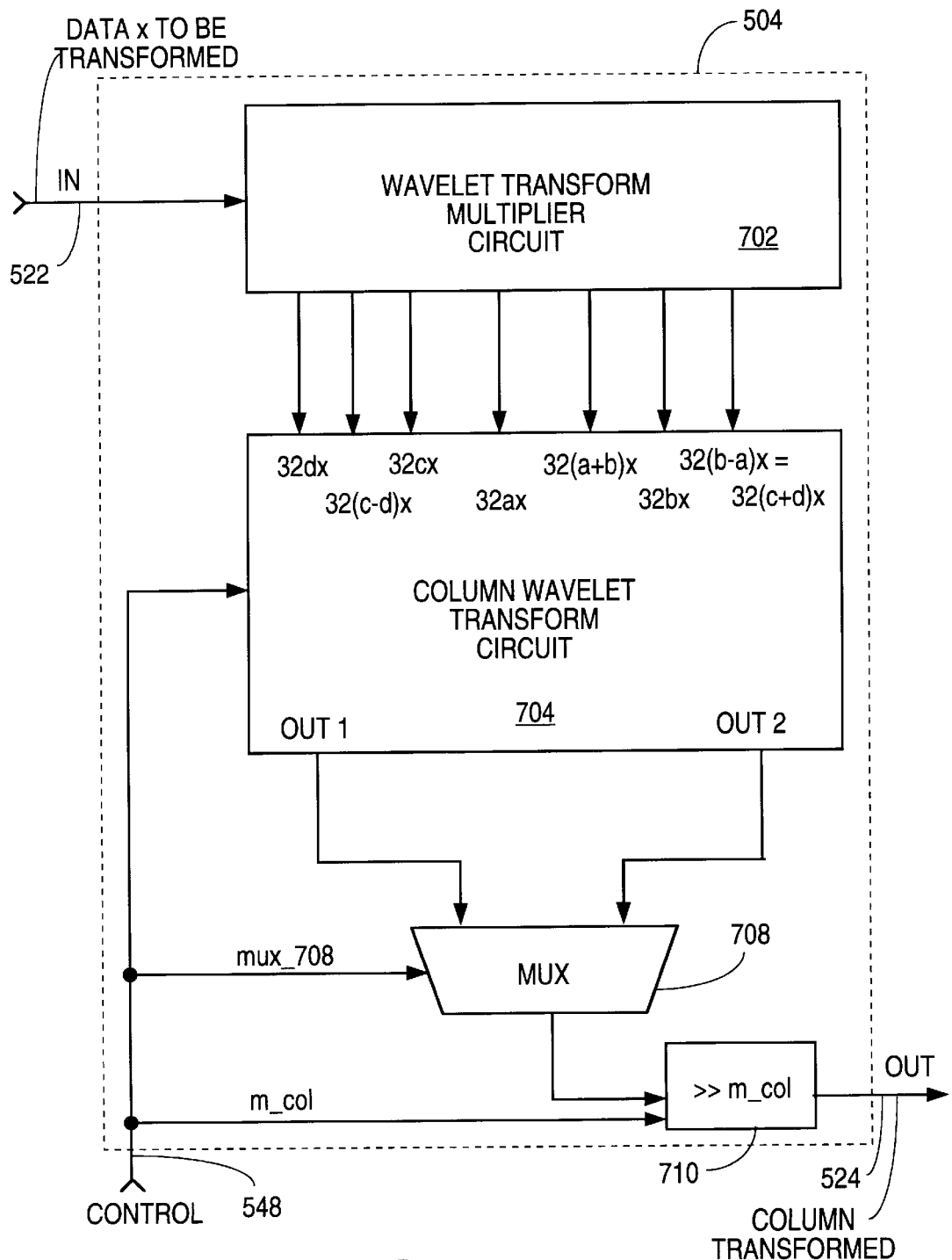
FIG. 7 is a block diagram of the column convolver block of FIG. 5.
Figure 21A:
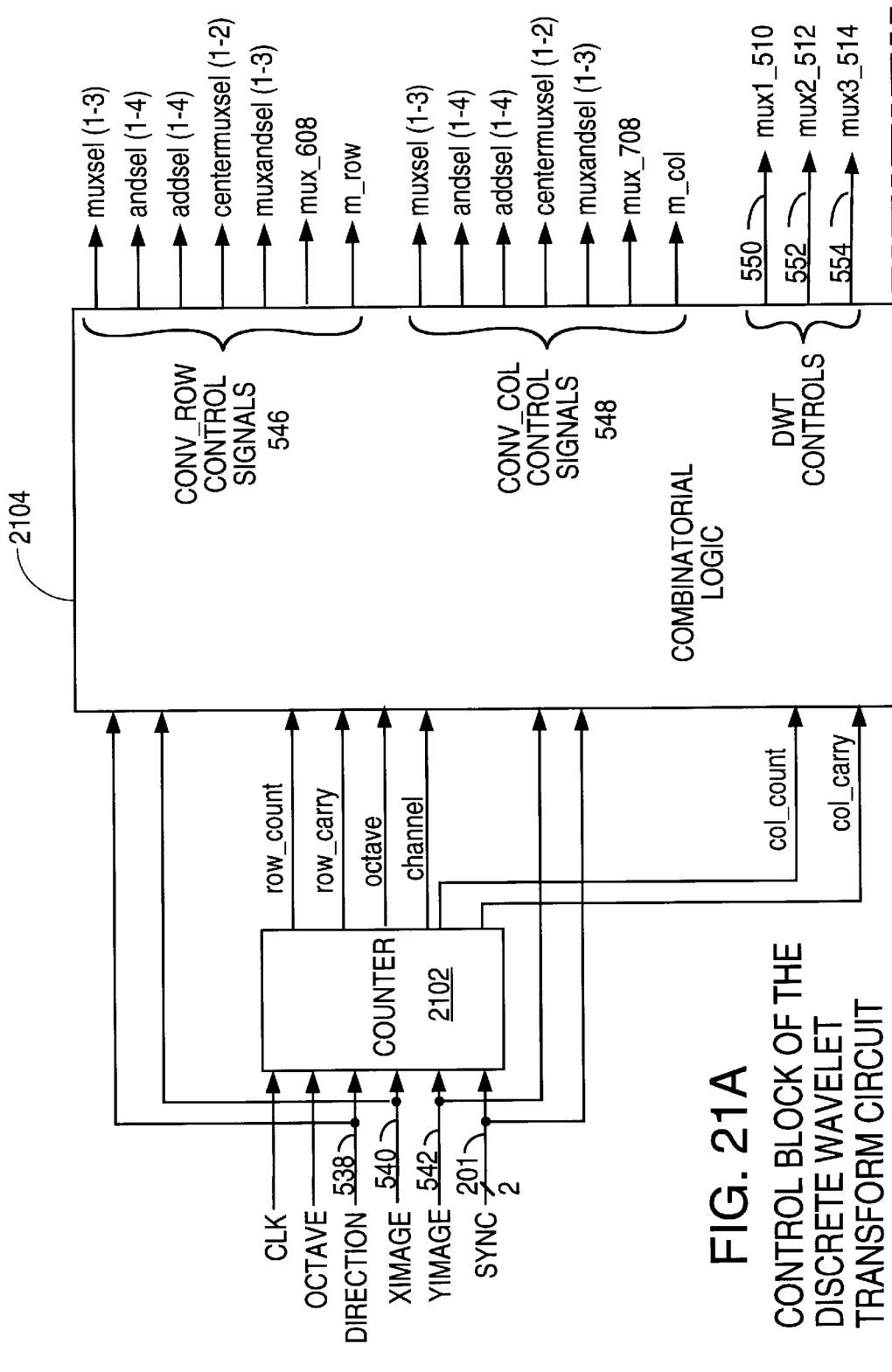
FIG. 21 is a block diagram of one embodiment of the control block 506 of the discrete wavelet transform circuit of FIG. 5.
Figures 21, 21B:
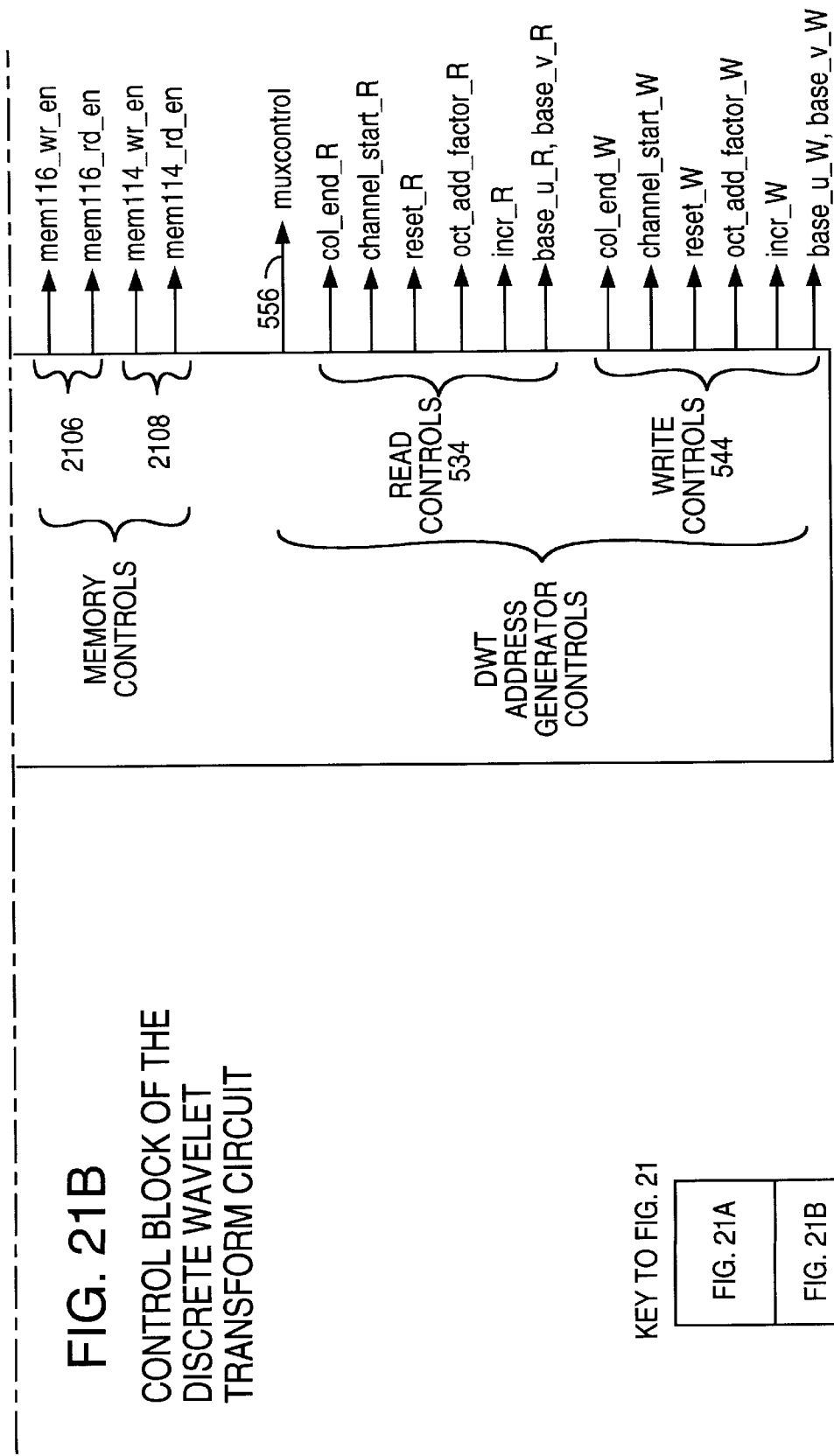
Figure 30A:
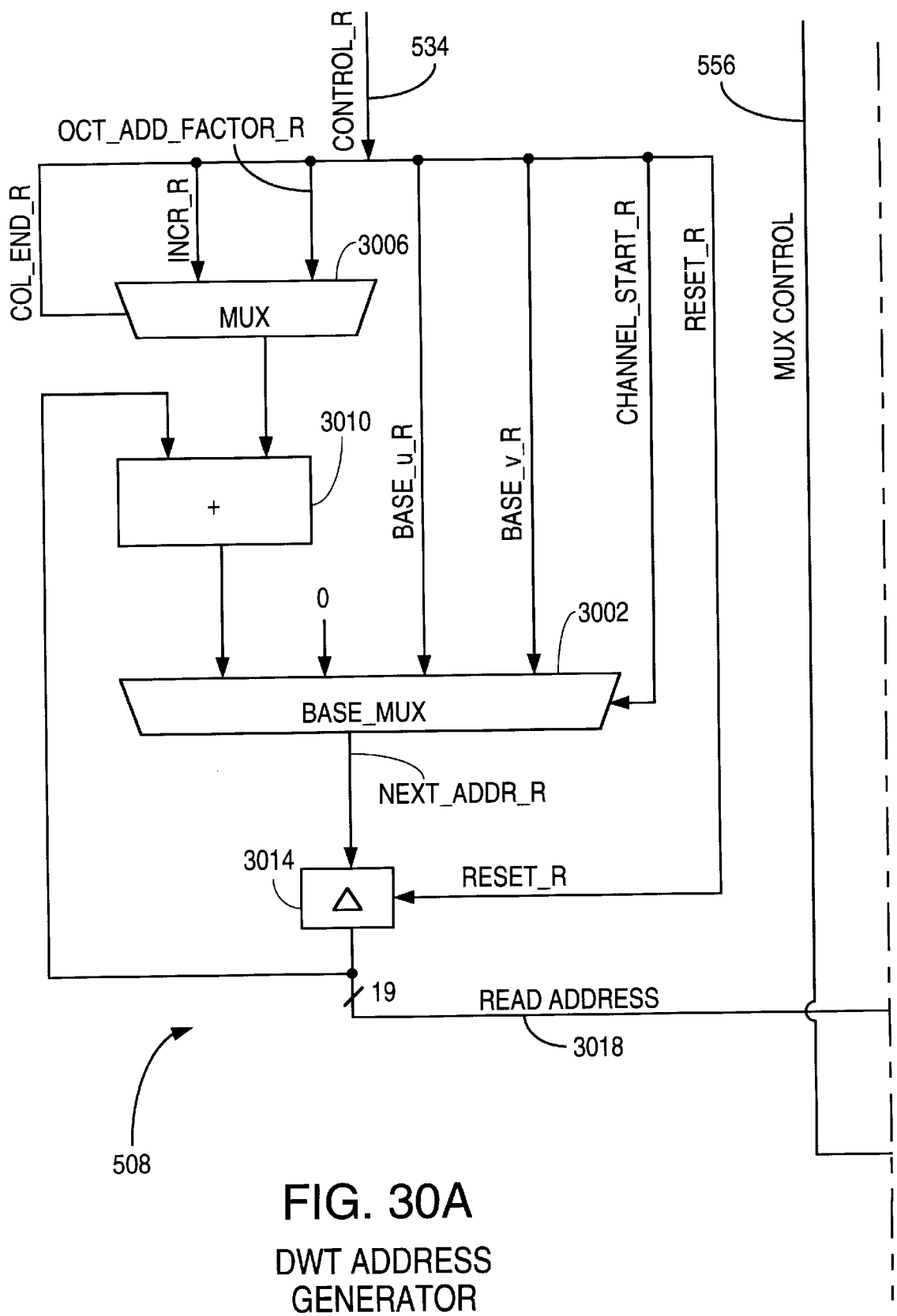
FIG. 30 is a block diagram of the DWT address generator block of the discrete wavelet transform circuit of FIG. 5.
Figure 30B:
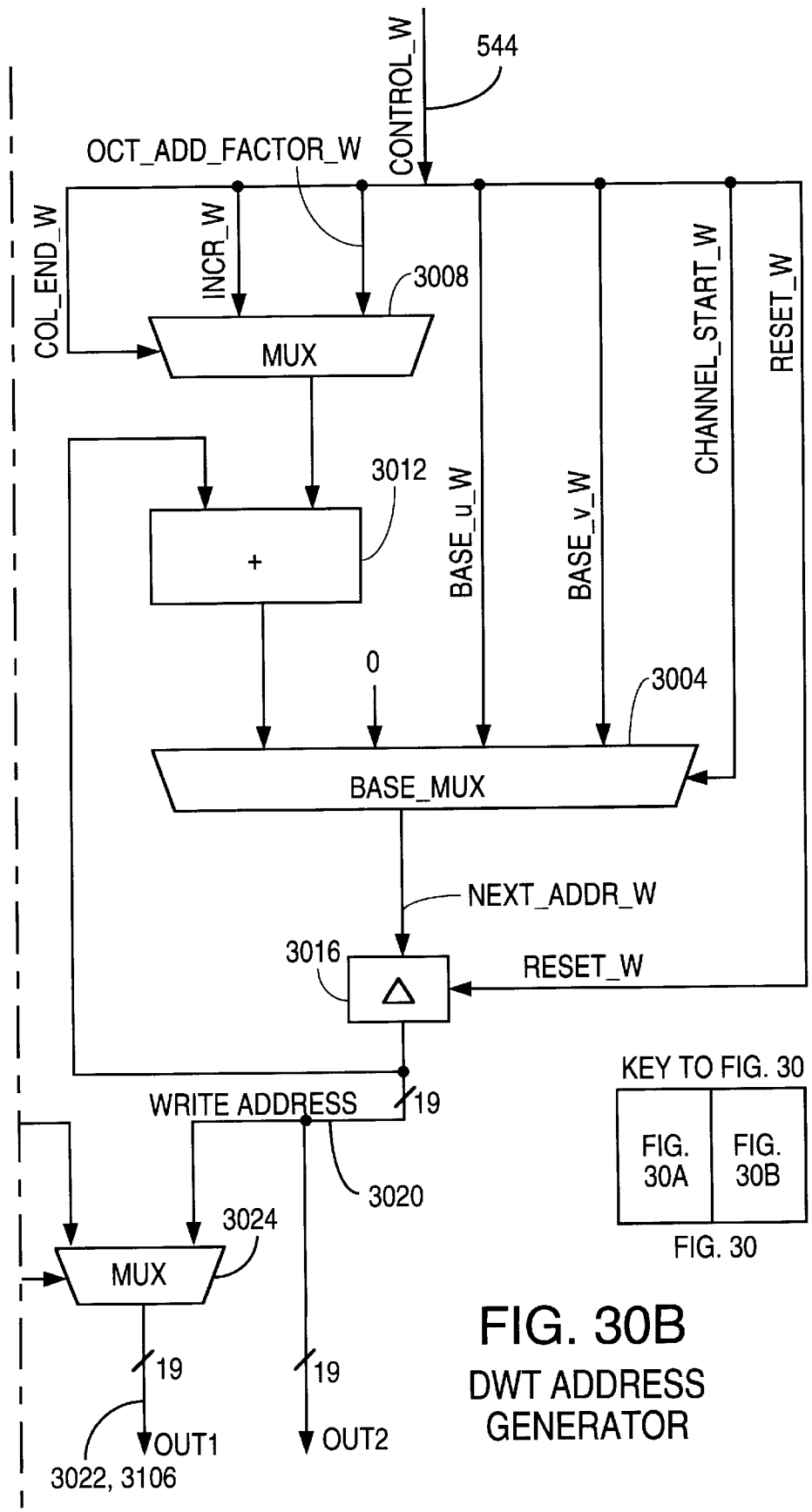

FIG. 6 is a block diagram of the row convolver CONV_ROW block 502. FIG. 7 is a block diagram of the column convolver CONV_COL block 504. FIG. 21 is a block diagram of the CONTROL block 506 of FIG. 5. FIG. 30 is a block diagram of the DWT address generator block 508 of FIG. 5.

As illustrated in FIG. 6, CONV_ROW block 502 comprises a wavelet transform multiplier circuit 602, a row wavelet transform circuit 604, a delay element 606, a multiplexer MUX 608, and a variable shift register 610. To perform a forward discrete wavelet transform, digital video values are supplied one-by-one to the discrete wavelet transform circuit 122 of the video encoder/decoder chip 112 illustrated in FIG. 1. In one embodiment in accordance with the present invention, the digital video values are in the form of a stream of values comprising 8-bit Y (luminance) values, followed by 8-bit U (chrominance) values, followed by 8-bit V (chrominance) values. The digital video data values are input in "raster scan" form. For clarity and ease of explanation, a forward discrete wavelet transform of an eight-by-eight matrix of luminance values Y as described is represented by Table 1. Extending the matrix of Y values to a larger size is straightforward. If the matrix of Y values is an eight-by-eight matrix, then the subsequent U and V matrices will each be four-by-four matrices.

TABLE 1

| $D_{00}$ | $D_{01}$ | $D_{02}$ | ... | $D_{07}$ |
|---|---|---|---|---|
| $D_{10}$ | $D_{11}$ | $D_{12}$ | ... | $D_{17}$ |
| . | . | . | ... | . |
| . | . | . | ... | . |
| . | . | . | ... | . |
| $D_{70}$ | $D_{71}$ | ... | ... | $D_{77}$ |

The order of the Y values supplied to the discrete wavelet transform circuit 122 is $D_{00}$, $D_{01}$, ... $D_{07}$ in the first row, then $D_{10}$, $D_{11}$, ... $D_{17}$ in the second row, and so forth row by row through the values in Table 1. Multiplexer 510 in FIG. 5 is controlled by control block 506 to couple this stream of data values to the row convolver CONV_ROW block 502. The row convolver CONV_ROW block 502 performs a row convolution of the row data values $D_{00}$, $D_{01}$, $D_{02}$, ... $D_{07}$ with a high pass four coefficient quasi-Daubechies digital filter G=(d, c, -b, a) and a low pass four coefficient quasi-Daubechies digital filter H=(a, b, c, -d) where a=11/32, b=19/32, c=5/32, d=3/32. The coefficients a, b, c, d are related to a four coefficient Daubechies wavelet as described in copending U.S. patent application Ser. No. 08/040,301 entitled "Data Compression and Decompression".

Figure 8:
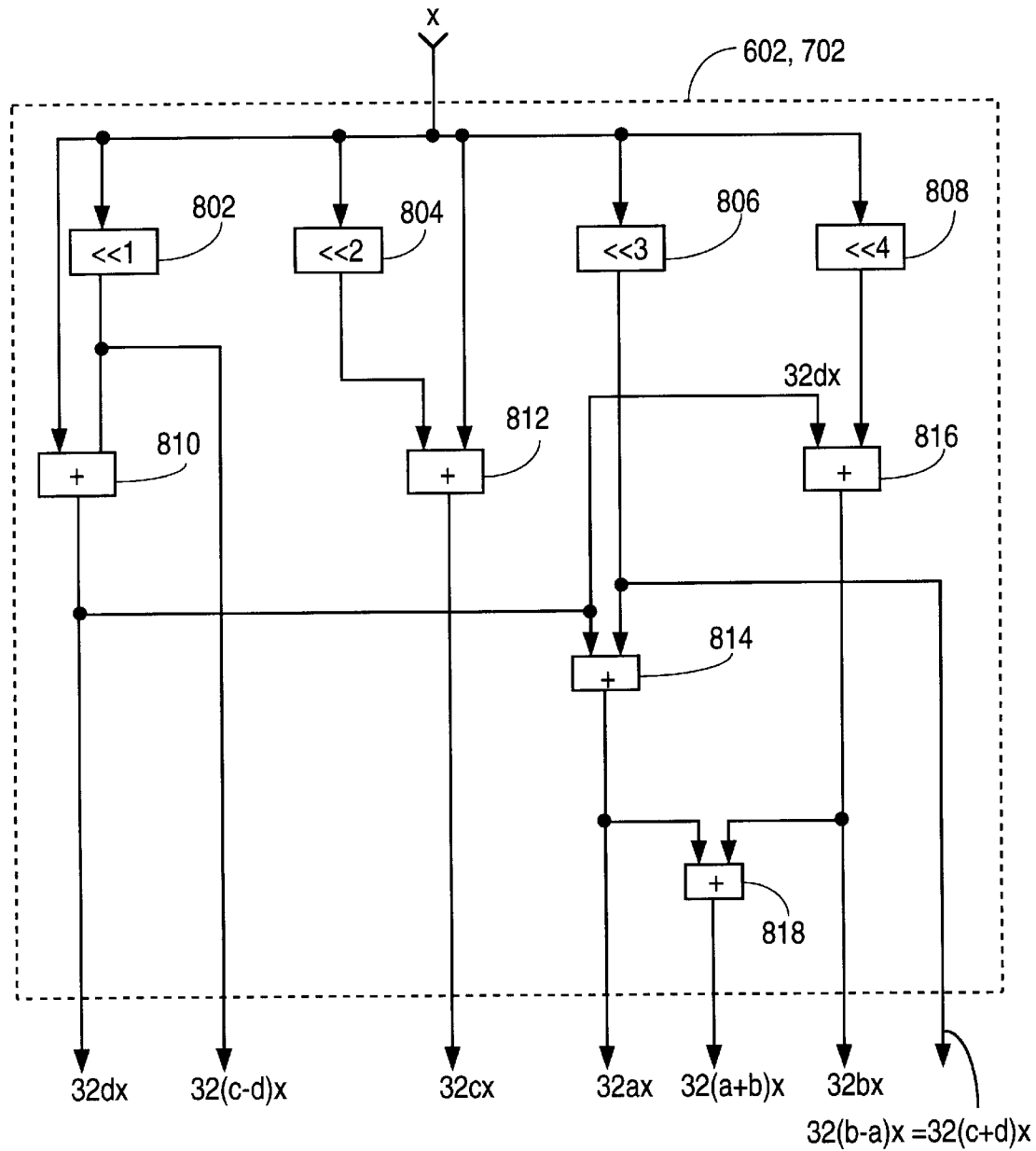
FIG. 8 is a block diagram of the wavelet transform multiplier circuit blocks of FIGS. 6 and 7.
Figure 9:
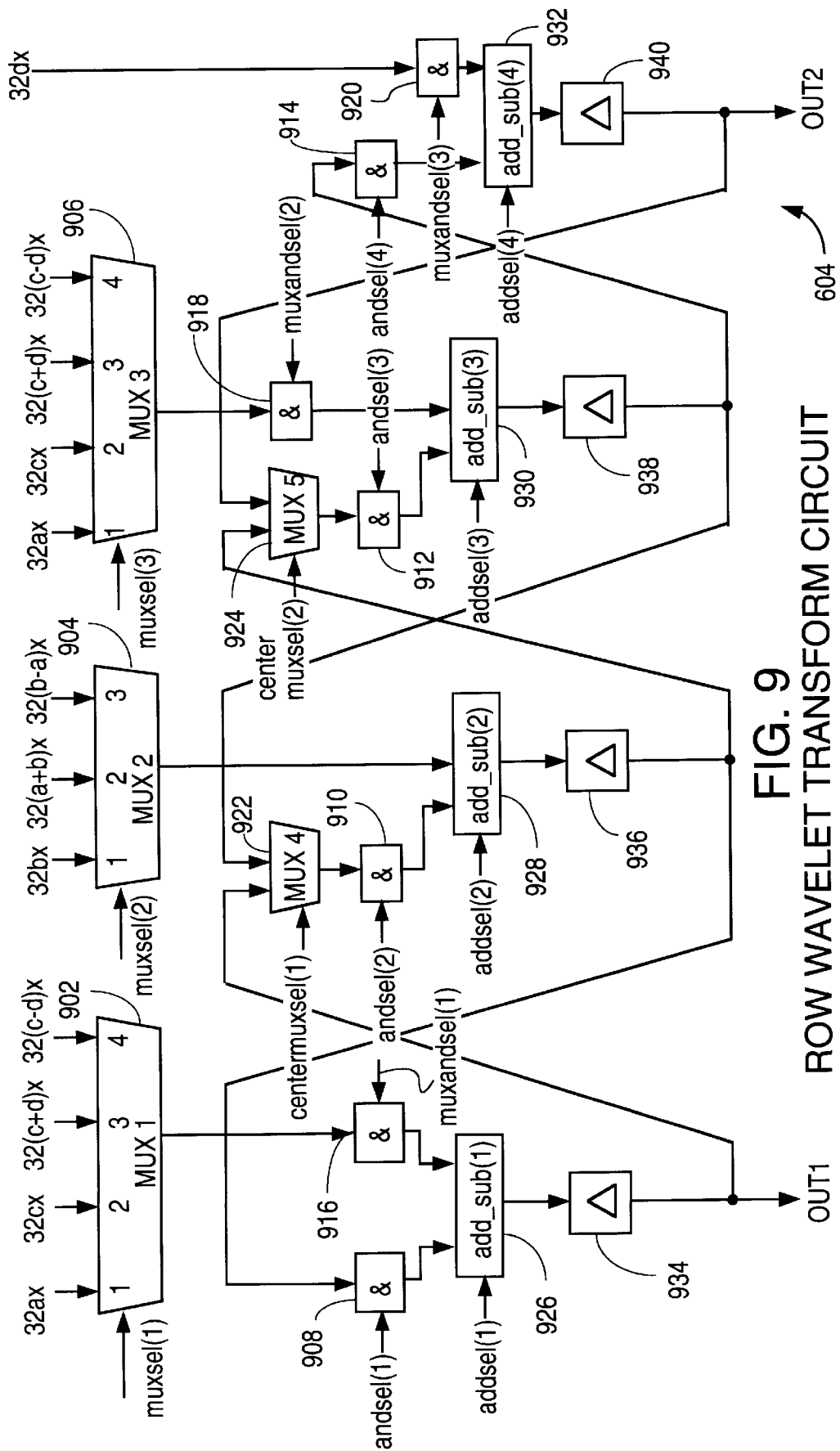
FIG. 9 is a block diagram of the row wavelet transform circuit block of FIG. 6.

The operation of CONV_ROW block 502 on the data values of Table 1 is explained with reference to FIGS. 6, 8, 9, 10 and 11. FIG. 8 is a detailed block diagram of the wavelet transform multiplier circuit 602 of the CONV_ROW block. FIG. 9 is a detailed block diagram of the row wavelet transform circuit 604 of the CONV_ROW block. FIG. 10 shows a sequence of control signals supplied by the control block 506 of FIG. 5 to the row wavelet transform circuit 604 of FIG. 9. This sequence of control signals effects a forward one dimensional wavelet transform on the rows of the matrix Table 1. The wavelet transform multiplier circuit 602 of FIG. 8 comprises combinatorial logic which multiplies each successive input data value x by various scaled combinations of coefficients 32a, 32b, 32c, and 32d. This combinational-logic block comprises shift registers 802, 804, 806, and 808 which shift the multibit binary input data value x to the left by 1, 2, 3, and 4 bits, respectively. Various combinations of these shifted values, as well as the input value x itself, are supplied to multibit adders 810, 812, 814, 816, and 818. The data outputs 32dx, 32(c−d)x, 32cx, 32ax, 32(a+b)x, 32bx, and 32(c+d)x are therefore available to the row wavelet transform circuit 604 on separate sets of leads as shown in detail in FIGS. 6 and 9.

The row wavelet transform circuit 604 of FIG. 9 comprises sets of multiplexers, adders, and delay elements. Multiplexer mux1 902, multiplexer mux2 904, and multiplexer mux3 906 pass selected ones of the data outputs of the wavelet transform multiplier circuit 602 of FIG. 8 as determined by control signals on leads 546 from CONTROL block 506 of FIG. 5. These control signals on leads 546 are designated muxsel(1), muxsel(2), and muxsel(3) on FIG. 9. The remainder of the control signals on leads 546 supplied from CONTROL block 506 to the row wavelet transform circuit 604 comprise andsel(1), andsel(2), andsel(3), andsel(4), addsel(1), addsel(2), addsel(3), addsel(4), muxandsel(1), muxandsel(2), muxandsel(3), centermuxsel(1) and centermuxsel(2).

FIG. 10 shows values of the control signals at different times during a row convolution of the forward transform. For example, at time t=0, the control input signal to multiplexer mux2 904, muxsel(2), is equal to 2. Multiplexer mux2 904 therefore couples its second input leads carrying the value 32(a+b)x to its output leads. Each of multiplexers 908, 910, 912, and 914 either passes the data value on its input leads, or passes a zero, depending on the value of its control signal. Control signals andsel(1) through andsel(4) are supplied to select input leads of multiplexers 908, 910, 912, and 914, respectively. Multiplexers 916, 918, and 920 have similar functionality. The outputs of multiplexers 916, 918, and 920 depend on the values of control signals muxandsel(1) through muxandsel(3), respectively. Multiplexers 922 and 924 pass either the value on their "left" input leads or the value on their "right" input leads, as determined by control select inputs centermuxsel(1) and centermuxsel(2), respectively. Adder/subtractors 926, 928, 930, and 932 either pass the sum or the difference of the values on their left and right input leads, depending on the values of the control signals addsel(1) through addsel(4), respectively. Elements 934, 936, 938, and 940 are one-cycle delay elements which output the data values that were at their respective input leads during the previous time period.

FIG. 11 is a diagram of a data flow through the row convolver CONV_ROW 502 during a forward transform operation on the data values of Table 1 when the control signals 546 controlling the row convolver CONV_ROW 502 are as shown in FIG. 10. At the left hand edge of the matrix of the data values of Table 1, start forward low pass and start forward high pass filters $G_s$ and $H_s$ are applied in accordance with equations 22 and 24 of U.S. patent application Ser. No. 08/040,301 as follows:

$$32H_{00}=32\{(a+b)D_{00}+cD_{01}-dD_{02}\}$$

$$32G_{00}=32\{(c+d)D_{00}-bD_{01}+aD_{02}\}$$

The row wavelet transform circuit of FIG. 9 begins applying these start forward low and high pass filters when the control signals for this circuit assume the values at time t=0 as illustrated in FIG. 10.

At time t=0, muxsel(2) has a value of 2. Multiplexer mux2 904 therefore outputs the value $32(a+b)D_{00}$ onto its output leads. Muxsel(3) has a value of 3 so multiplexer mux3 906 outputs the value $32(c+d)D_{00}$ into its output leads. Because the control signals andsel(2) and andsel(3) cause multiplexers 910 and 912 to output zeros at t=0 as shown in FIG. 10, the output leads of adder/subtractor blocks 928 and 930 carry the values $32(a+b)D_{00}$ and $32(c+d)D_{00}$, respectively, as shown in FIG. 11. These values are supplied to the input leads of delay elements 936 and 938. Delay elements 936 and 938 in the case of the row transform are one time unit delay elements. The control signals centermuxsel(1) and centermuxsel(2) have no effect at t=0, because control signals andsel(2) and andsel(3) cause multipliers 910 and 912 to output zeros.

At time t=1, input data value x is the data value $D_{01}$. Control signal muxsel(2) is set to 1 so that multiplexer mux2 904 outputs the value $32bD_{01}$. The select signal centermuxsel(1) for adder/subtractor block 922 is set to pass the value on its right input leads. The value $32(c+d)D_{00}$, the output of adder/subtractor block 930 at t=0, is therefore passed through multiplexer mux4 922 due to the one time unit delay of delay element 938. The control signal andsel(2) is set to pass, so the two values supplied to the adder/subtractor block 928 are $32(c+d)D_{00}$ and $32bD_{01}$. Because the control signal addsel(2) is set to subtract, the value output by adder/subtractor block 928 is $32\{(c+d)D_{00}-bD_{01}\}$ as shown in FIG. 11. Similarly, with the values of control signals centermuxsel(2), andsel(3), muxsel(3), muxandsel(2), and addsel(3) given in FIG. 10, the value output by adder/subtractor block 930 is $32\{(a+b)D_{00}+cD_{01}\}$ as shown in FIG. 11.

At time t=2, input data value x is data value $D_{02}$. The control signals andsel(1), muxsel(1), and muxandsel(1) are set so that the inputs to adder/subtractor block 926 are $32aD_{02}$ and $32\{(c+d)D_{00}-bD_{01}\}$. The value $32\{(c+d)D_{00}-bD_{01}\}$ as the previous output from adder/subtractor block 928. Because control signal addsel(1) is set to add as shown in FIG. 10, the output of block 926 is $32\{(c+d)D_{00}-bD_{01}+aD_{02}\}$ as shown in FIG. 11. Similarly, with the value of control signals addsel(4), andsel(4) and muxandsel(3), the value output by adder/subtractor block 932 is $32\{(a+b)D_{00}+cD_{01}-dD_{02}\}$ as shown in FIG. 11.

As illustrated in FIG. 10, output leads OUT2 (which are the output leads of delay element 940) carry a value of $32H_{00}$ at time t=3. The value $32\{(a+b)D_{00}-bD_{01}+aD_{02}\}$ is equal to $32H_{00}$ because $32H_{00}=32\{(a+b)D_{00}+cD_{01}-dD_{02}\}$ as set forth above. Similarly, output leads OUT1 (which are the output leads of delay element 934) carry a value of $32G_{00}$ at t=3 because output leads of block 926 have a value of $32\{(c+d)D_{00}-bD_{01}+aD_{02}\}$ one time period earlier. Because $32H_{00}$ precedes $32G_{00}$ in the data stream comprising the high and low pass components in a one-dimensional row convolution, delay element 606 is provided in the CONV_ROW row convolver of FIG. 6 to delay $32G_{00}$ so that $32G_{00}$ follows $32H_{00}$ on the leads which are input to the multiplexer 608. Multiplexer 608 selects between the left and right inputs shown in FIG. 6 as dictated by the value mux_608, which is provided on one of the control leads 546 from control block 506. The signal mux_608 is timed such that the value $32H_{00}$ precedes the value $32G_{00}$ on the output leads of multiplexer 608.

The output leads of multiplexer 608 are coupled to a variable shift register 610 as shown in FIG. 6. The function of the variable shift register 610 is to normalize the data values output from the CONV_ROW block by shifting the value output by multiplexer 608 to the right by m_row bits. In this instance, for example, it is desirable to divide the value output of multiplexer 608 by 32 to produce the normalized values $H_{00}$ and $G_{00}$. To accomplish this, the value m_row provided by control block 506 via one of the control leads 546 is set to 5. The general rule followed by the control block 506 of the discrete wavelet transform circuit is to: (1) set m_row equal to 5 to divide by 32 during the forward transform, (2) set m_row equal to 4 to divide by 16 during the middle of a row during an inverse transform, and (3) set m_row equal to 3 to divide by 8 when generating a start or end value of a row during the inverse transform. In the example being described, the start values of a transformed row during a forward transform are being generated, so m_row is appropriately set equal to 5.

As illustrated in FIG. 10, the centermuxsel(1) and centermuxsel(2) control signals alternate such that the values on the right and the left input leads of multiplexers 922 and 924 are passed to their respective output leads for each successive data value convolved. This reverses data flow through the adder/subtractor blocks 928 and 930 in alternating time periods. In time period t=0, for example, FIG. 11 indicates that the value $32aD_{01}$ in the column designated "Output of Block 926" in time period t=1 is added to $32bD_{02}$ to form the value $32\{aD_{01}+bD_{02}\}$ in the column designated "Output of Block 928" at time t=2. Then, in time period t=3, the value $32\{dD_{01}+cD_{02}\}$ in the column designated "Output of Block 930" is added to $32bD_{03}$ to form the value $32\{dD_{01}+cD_{02}-bD_{03}\}$ in the column designated "Output of Block 928".

Accordingly, in time period t=2, the two values supplied to block 928 are $32bD_{02}$ and the previous output from block 926, $32bD_{01}$. Because addsel(2) is set to add as shown in FIG. 10, the value output by block 928 is $32(aD_{01}+bD_{02})$.

Similarly, the output of block 930 is $32(dD_{01}+cD_{02})$. In this way it can be seen the sequence of control signals in FIG. 10 causes the circuit of FIG. 9 to execute the data flow in FIG. 11 to generate, after passage through multiplexer mux 608 and shift register 610 with m_row set equal to 5, the low and high pass non-boundary components $H_{01}$, $G_{01}$, $H_{02}$, and $G_{02}$. To implement the end forward low and high pass filters beginning at t=7 when the last data value of the first row of Table 1, $D_{07}$, is input to the row convolver, the control signal muxsel(2) is set to 3, so that $32(b-a)D_{07}$ is passed to block 928. Control signal muxsel(3) is set to 4, so that $32(c-d)D_{07}$ is passed to block 930. Control signal addsel(2) is set to subtract and control signal addsel(3) is set to add. Accordingly, the output of adder/subtractor 928 is $32(dD_{05}+cD_{06}-(b-a)D_{07})$. Similarly, the output of adder/subtractor 930 is $32(aD_{05}+bD_{06}+(c-d)D_{07})$.

As shown in FIG. 11, these values are output from blocks 926 and 932 at the next time period when t=8 by setting muxandsel(1) and muxandsel(3) to be both zero so that adder/subtractor blocks 926 and 932 simply pass the values unchanged. Delay elements 934 and 940 cause the values $32G_{03}$ and $32H_{03}$ to be output from output leads OUT1 and OUT2 at time t=9. Multiplexer 608, as shown in FIG. 6, selects between the output of delay unit 606 and the OUT2 output as dictated by CONTROL block 506 of FIG. 5. Shift register 610 then normalizes the output as described previously, with m_row set equal to 5 for the end of the row. The resulting values $G_{03}$ and $H_{03}$ are the values output by the end low pass and end high pass forward transform digital filters in accordance with equations 26 and 28 of U.S. patent application Ser. No. 08/040,301. Thus, a three coefficient start forward transform low pass filter and a three coefficient start forward transform high pass filter have generated the values $H_{00}$ and $G_{00}$. A four coefficient quasi-Daubecheis low pass forward transform filter and a four coefficient quasi-Daubecheis high pass forward transform filter have generated the values $H_{01}$ ... $G_{02}$. A three coefficient end forward transform low pass filter and a three coefficient end forward transform high pass filter have generated the values $H_{03}$ and $G_{03}$.

The same sequence is repeated for each of the rows of the matrix in Table 1. In this way, for each two data values input there is one high pass (G) data value generated and there is one low pass (H) data value generated. The resulting output data values of CONV_ROW block 502 are shown in FIG. 12.

As illustrated in FIG. 5, the values output from row convolver CONV_ROW block 502 are passed to the column convolver CONV_COL block 504 in order to perform column convolution using the same filters in accordance with the method set forth in copending U.S. patent application Ser. No. 08/040,301.

FIG. 7 is a block diagram of the column convolver CONV_COL block 504 of FIG. 5. The CONV_COL block 504 comprises a wavelet transform multiplier circuit 702, a column wavelet transform circuit 704, a multiplexer 708, and a variable shift register 710. In general, the overall operation of the circuit shown in FIG. 7 is similar to the overall operation of the circuit shown in FIG. 6. The wavelet transform multiplier circuit 702 of the column convolver is identical to the wavelet transform multiplier circuit 602 of FIG. 6. The dashed line in FIG. 8. Therefore, is designated with both reference numerals 602 and 702.

Figure 13:
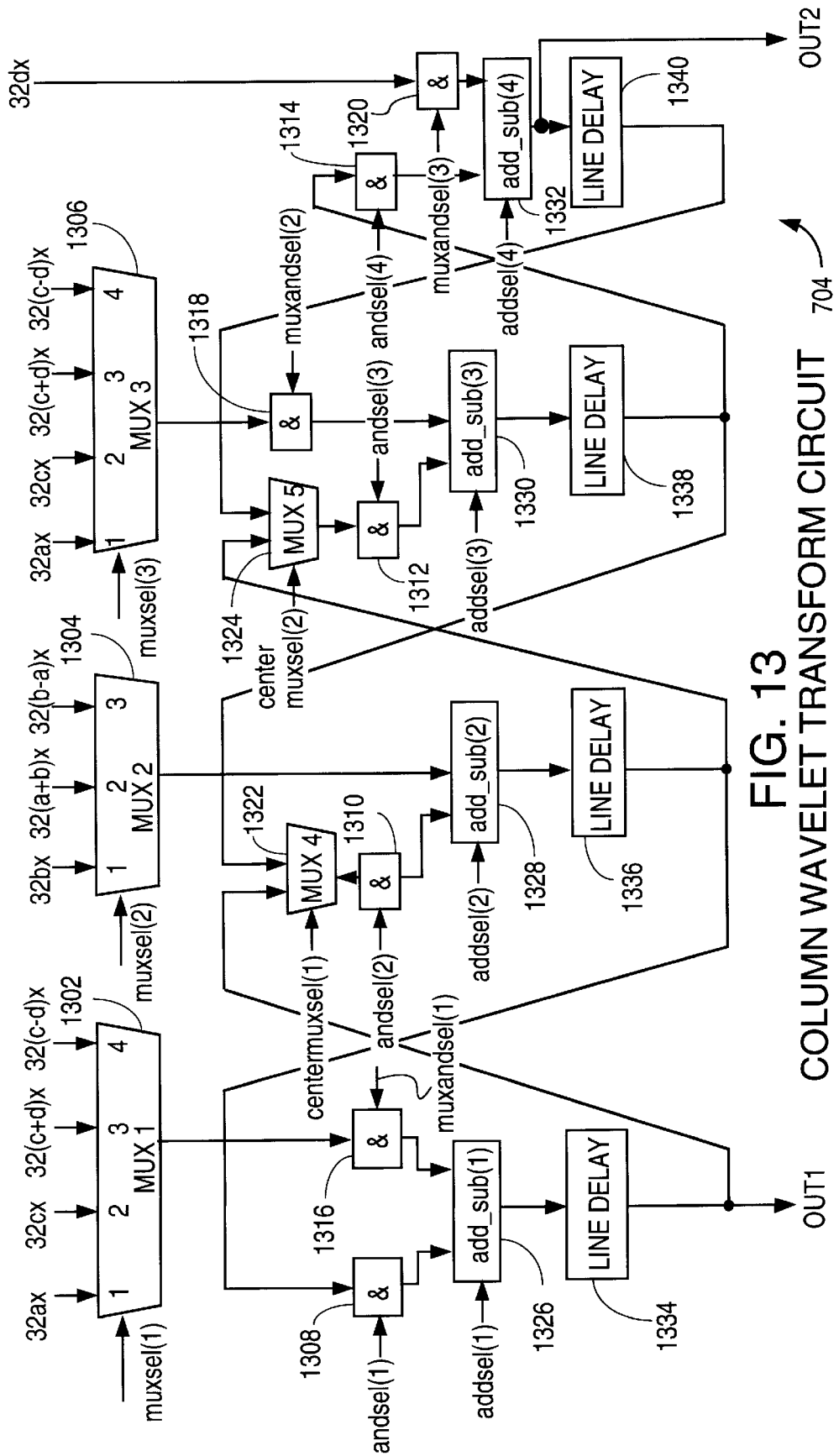
FIG. 13 is a block diagram of the column wavelet transform circuit block of FIG. 7.

FIG. 13 is a detailed block diagram of the column wavelet transform circuit 704 of FIG. 7 of the column convolver. The CONV_COL block 504, as shown in FIG. 13, is similar to the CONV_ROW block 502, except that the unitary delay elements 934, 936, 938, and 940 of the CONV_ROW block 502 are replaced by "line delay" blocks 1334, 1336, 1338, and 1340, respectively. The line delay blocks represent a time delay of one row which, in the case of the matrix of the presently described example, is eight time units. In some embodiments in accordance with the present invention, the line delays are realized using random access memory (RAM).

To perform a column convolution on the values of the matrix of FIG. 12, the first three values $H_{00}$, $H_{10}$, $H_{20}$ of the first column are processed to generate, after a bit shift in shift register 710 of FIG. 7, low and high pass values $HH_{00}$ and $HG_{00}$ of FIG. 16. The first three values $G_{00}$, $G_{10}$, $G_{20}$ of the second column of the matrix of FIG. 12 are then processed to likewise produce $GH_{00}$ and $GG_{00}$, and so on, to produce the top two rows of values of the matrix of FIG. 16. Three values in each column are processed because the start low and high pass filters are three coefficient filters rather than four coefficient filters.

Figure 15B:
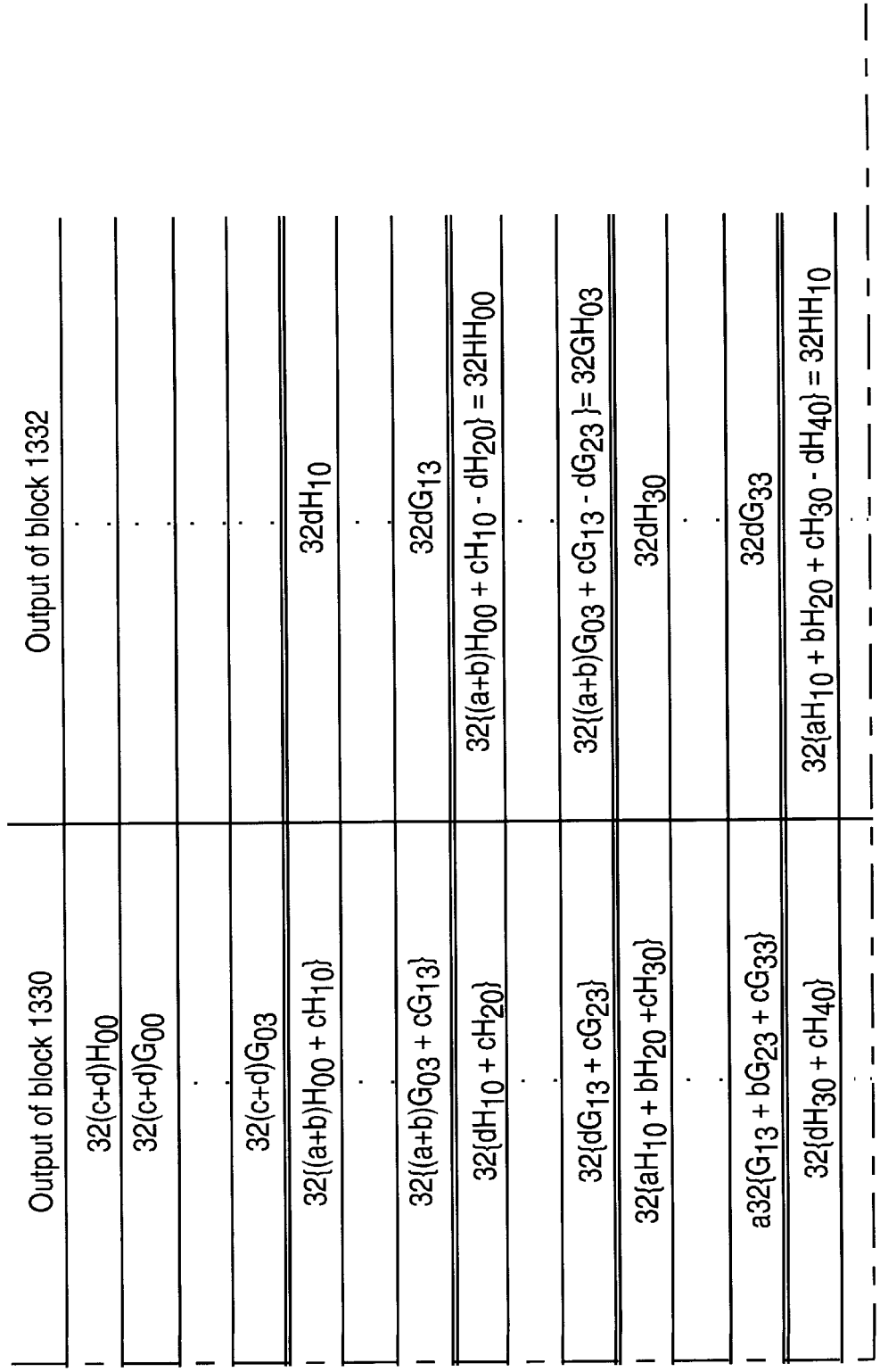
FIG. 15 is a diagram showing data flow in the column convolver of FIG. 5 during a forward octave 0 transform.

FIG. 14 is a diagram illustrating control signals which control the column convolver during the forward transform of the data values of FIG. 12. FIG. 15 is a diagram illustrating data flow through the column convolver. Corresponding pairs of data values are output from line delays 1334 and 1340 of the column wavelet transform circuit 704. For this reason, the low pass filter output values are supplied from the output leads of the adder/subtractor block 1332 at the input leads of line delay 1340 rather than from the output leads of the line delay 1340 so that a single transformed data value is output from the column wavelet transform circuit in each time period. In FIG. 14, output data values $32HH_{00}$ ... $32GH_{03}$ are output during time periods t=16 to t=23 whereas output data values $32HG_{00}$ ... $32GG_{03}$ are output during time periods t=24 to t=31, one line delay later. After being passed through multiplexer 708 and variable shift register 710 of FIG. 7, the column convolved data values $HH_{00}$ ... $GH_{03}$ and $HG_{00}$ ... $GG_{03}$ are written to memory unit 116 under the control of the address generator. After all the data values of FIG. 16 are written to memory unit 116, an octave 0 sub-band decomposition exists in memory unit 116.

Figures 18, 18B:
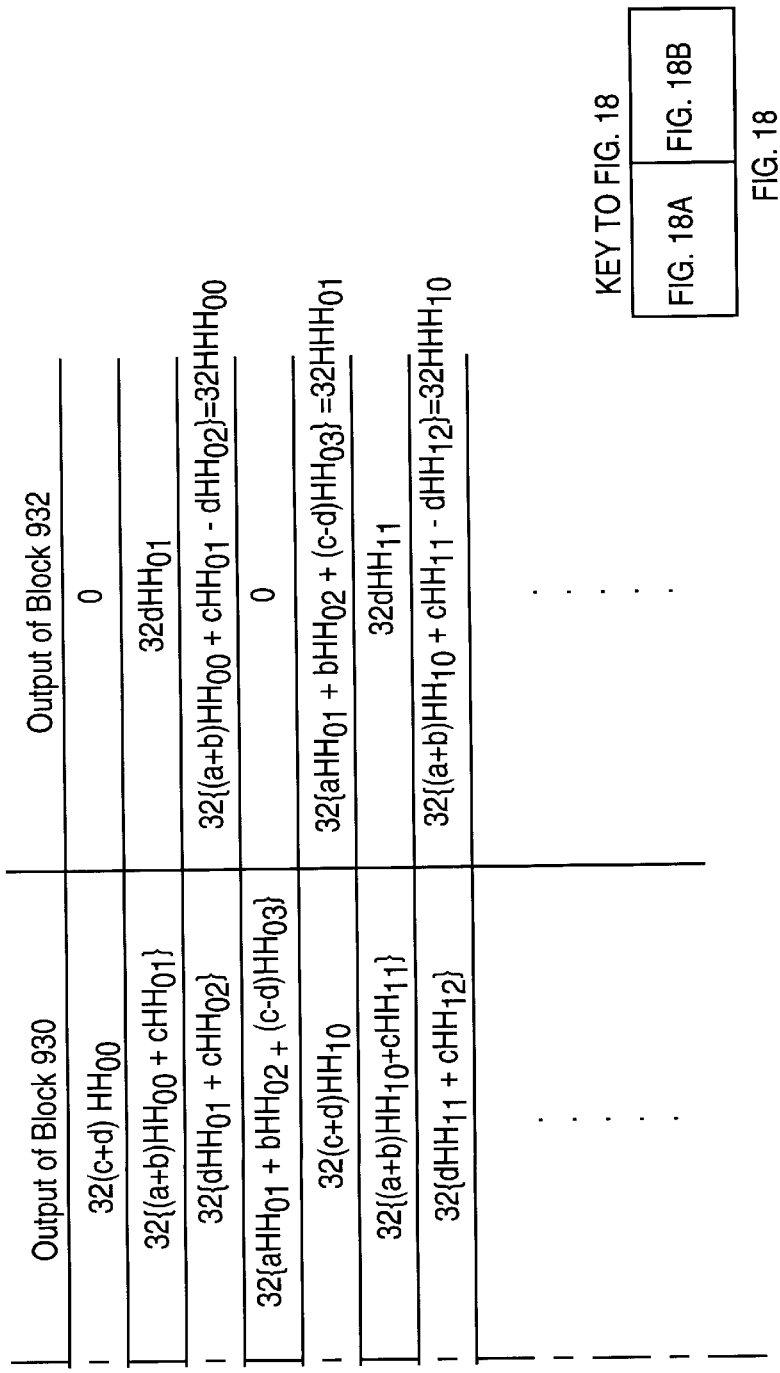
FIG. 18 is a diagram showing data flow in the row convolver of FIG. 5 during a forward octave 1 transform.

To perform the next octave of decomposition, only the low pass component HH values in memory unit 116 are processed. The HH values are read from memory unit 116 and passed through the CONV_ROW block 502 and CONV_COL block 504 as before, except that the control signals for control block 506 are modified to reflect the smaller matrix of data values being processed. The line delay in the CONV_COL block 504 is also shortened to four time units because there are now only four low pass component HH values per row. The control signals to accomplish the octave 1 forward row transform on the data values in FIG. 16 are shown in FIG. 17. The corresponding data flow for the octave 1 forward row transform is shown in FIG. 18. Likewise, the control signals to accomplish the octave 1 forward column transform are shown in FIG. 19, and the corresponding data flow for the octave 1 forward column transform is shown in FIG. 20.

The resulting HHHH, HHHG, HHGH, and HHGG data values output from the column convolver CONV_COL block 504 are sent to memory unit 116 to overwrite only the locations in memory unit 116 storing corresponding HH data values as explained in connection with FIGS. 17 and 18 of U.S. patent application Ser. No. 08/040,301. The result is an octave 1 sub-band decomposition stored in memory unit 116. This process can be performed on large matrices of data values to generate sub-band decompositions having as many octaves as required. For ease of explanation and illustration, control inputs and dataflow diagrams are not shown for the presently described example for octaves higher than octave 1. However, control inputs and dataflows for octaves 2 and above can be constructed given the method described in U.S. patent application Ser. No. 08/040,301 along with the octave 0 and octave 1 implementation of that method described above.

FIG. 21 illustrates a block diagram of one possible embodiment of control block 506 of FIG. 5. Control block 506 comprises a counter 2102 and a combinatorial logic block 2104. The control signals for the forward and inverse discrete wavelet transform operations, as shown in FIGS. 10, 14, 17, 19, 22, 24, 26, and 28, are output onto the output leads of the combinatorial logic block 2104. The input signals to the control block 506 comprise the sync leads 201 which are coupled to A/D video decoder 110, the direction lead 538 which is coupled to REGISTERS block 536, and the image size leads 540 and 542 which are also coupled to REGISTERS block 536. The values of the signals on the register leads 538, 540, and 542 are downloaded to REGISTERS block 536 of the video encoder/decoder chip 112 from data bus 106 via register download bus 128. The output leads of control block 506 comprise CONV_ROW control leads 546, CONV_COL control leads 548, DWT control leads 550, 552, and 554, memory control leads 2106 and 2108, DWT address generator muxcontrol lead 556, DWT address generator read control leads 534, and DWT address generator write control leads 544.

Counter block 2102 generates the signals row_count, row_carry, col_count, col_carry, octave, and channel, and provides these signals to combinatorial logic block 2104. Among other operations, counter 2102 generates the signals row_count and row_carry by counting the sequence of data values from 0 up to ximage, where ximage represents the horizontal dimension of the image received on leads 540. Similarly, counter 2102 generates the signals col_count and col_carry by counting the sequence of data values from 0 up to yimage, where yimage represents the vertical dimension of the image received on leads 542. The inputs to combinatorial logic block 2104 comprise the outputs of counter block 2102 as well as the inputs direction, ximage, yimage and sync to control block 506. The output control sequences of combinatorial logic block 2104 are combinatorially generated from the signals supplied to logic block 2104.

After the Y data values of an image have been transformed, the chrominance components U and V of the image are transformed. In the presently described specific embodiment of the present invention, a 4:1:1 format of Y:U:V values is used. Each of the U and V matrices of data values comprises half the number of rows and columns as does the Y matrix of data values. The wavelet transform of each of these components of chrominance is similar to the transformation of the Y data values except the line delays in the CONV_COL are shorter to accommodate the shorter row length and the size of the matrices corresponding to the matrix of Table 1 is smaller.

Not only does the discrete wavelet transform circuit of FIG. 5 transform image data values into a multi-octave sub-band decomposition using a forward discrete wavelet transformation, but the discrete wavelet transform circuit of FIG. 5 can be used to perform a discrete inverse wavelet transform on transformed-image data to convert a sub-band decomposition back into the image domain. In one octave of an inverse discrete wavelet transform, the inverse column convolver 504 of FIG. 5 operates on transformed-image data values read from memory unit 116 via leads 526, lines 528 and multiplexer mux2 512 and the inverse row convolver 502 operates on the data values output by the column convolver supplied via leads 524, lines 525 and multiplexer mux1 510.

Figure 23C:
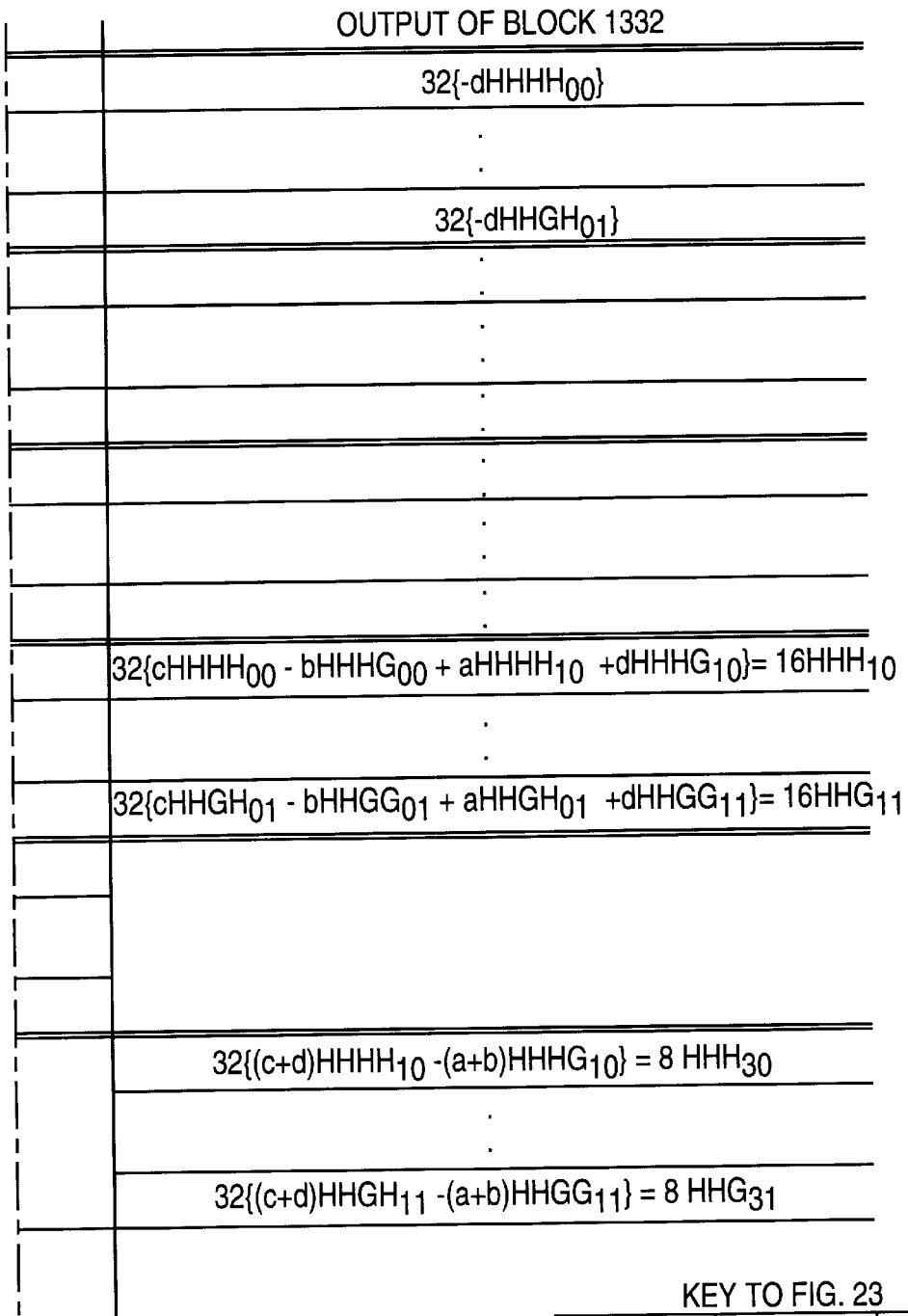
FIG. 23 is a diagram showing data flow in the column convolver of FIG. 5 during a forward octave 1 transform.

FIGS. 22 and 23 show control signals and data flow for the column convolver 504 of FIG. 5 when column convolver 504 performs an inverse octave 1 discrete wavelet transform on transformed-image data located in memory unit 116. As illustrated in FIG. 23, the data value output from adder/subtractor block 1326 of FIG. 13 at time t=4 is $32\{(b-a)HHHH_{00}+(c-d)HHHG_{00}\}$. The column convolver therefore processes the first two values $HHHH_{00}$ and $HHHG_{00}$ in accordance with the two coefficient start reconstruction filter (inverse transform filter) set forth in equation 52 of U.S. patent application Ser. No. 08/040,301. Subsequently, blocks 1332 and 1326 output values indicating that the column convolver performs the four coefficient odd and even reconstruction filters (interleaved inverse transform filters) of equations 20 and 19 of U.S. patent application Ser. No. 08/040,301. FIG. 23 illustrates that the column convolver performs the two coefficient end reconstruction filter (inverse transform filter) on the last two data values $HHHH_{10}$ and $HHHG_{10}$ (see time t=20) of the first column of transformed data values in accordance with equation 59 of U.S. patent application Ser. No. 08/040,301. The data values output from the column convolver of FIG. 13 are supplied to the row convolver 502 of FIG. 5 via lines 525 and multiplexer mux1 510.

Figure 25B:
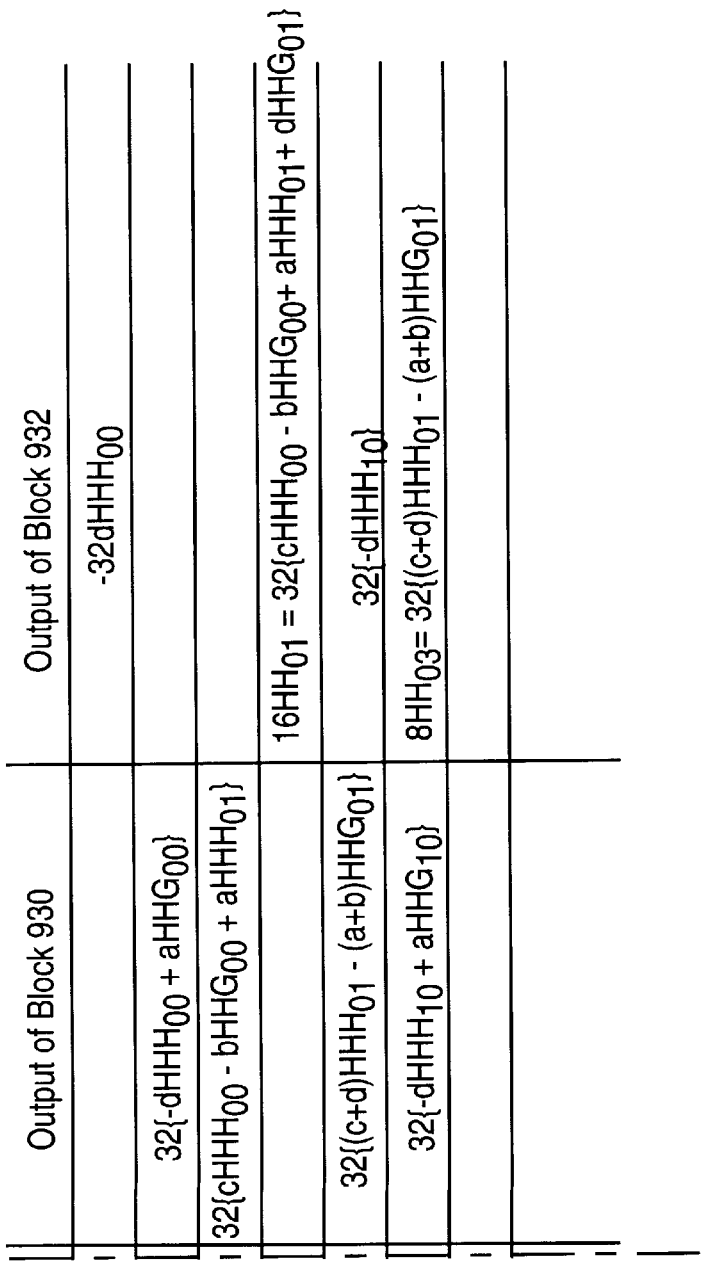
FIG. 25 is a diagram showing data flow in the row convolver of FIG. 5 during an inverse octave 1 transform.
Figure 25:
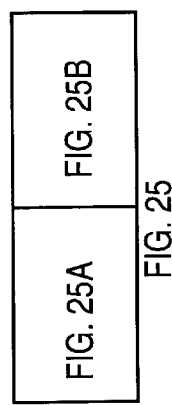

FIGS. 24 and 25 show control signals and data flow for the row convolver 502 of FIG. 5 when the row convolver performs an inverse octave 1 discrete wavelet transform on the data values output from the column convolver. The column convolver 504 has received transformed values $HHHH_{00} \ldots HHGH_{01}$ and so forth as illustrated in FIG. 23 and generated the values $HHH_{00} \ldots HHG_{01}$ and so forth, as illustrated in FIG. 22, onto output leads 524. Row convolver 502 receives the values $HHH_{00} \ldots HHG_{01}$ and so forth as illustrated in FIG. 24 and generates the values $HH_{00}$, $HH_{01}$, $HH_{02}$ and so forth as illustrated in FIG. 24 onto output leads 520 of row convolver 502. The data flow of FIG. 25 indicates that the row convolver performs the start reconstruction filter on the first two data values of a row, performs the odd and even reconstruction filters on subsequent non-boundary data values, and performs the end reconstruction filter on the last two data values of a row. The HH data values output from row convolver 502 are written to memory unit 116 into the memory locations corresponding with the HH data values shown in FIG. 16.

Figure 27C:
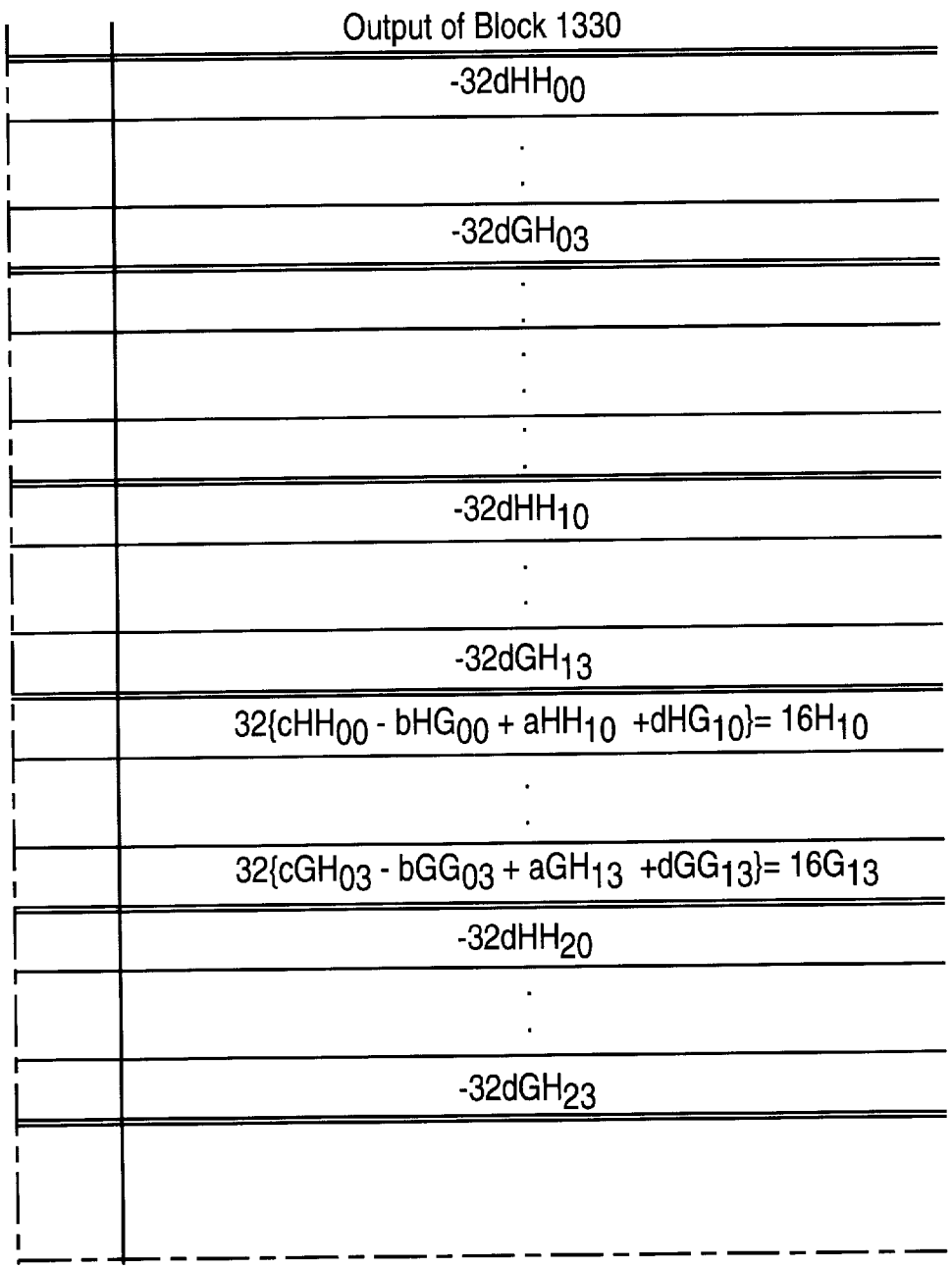
FIG. 27 is a diagram showing data flow in the column convolver of FIG. 5 during an inverse octave 0 transform.

To inverse transform the octave 0 data values in memory unit 116 into the image domain, the column convolver 504 and the row convolver 502 perform an inverse octave 0 discrete wavelet transform. FIGS. 26 and 27 show the control signals and the data flow for the column convolver 504 of FIG. 5 when the column convolver performs an inverse octave 0 discrete wavelet transform on transformed image data values in memory unit 116. The data values output from the column convolver are then supplied to the row convolver 502 of FIG. 5 via lines 528 and multiplexer mux1 510.

Figure 29B:
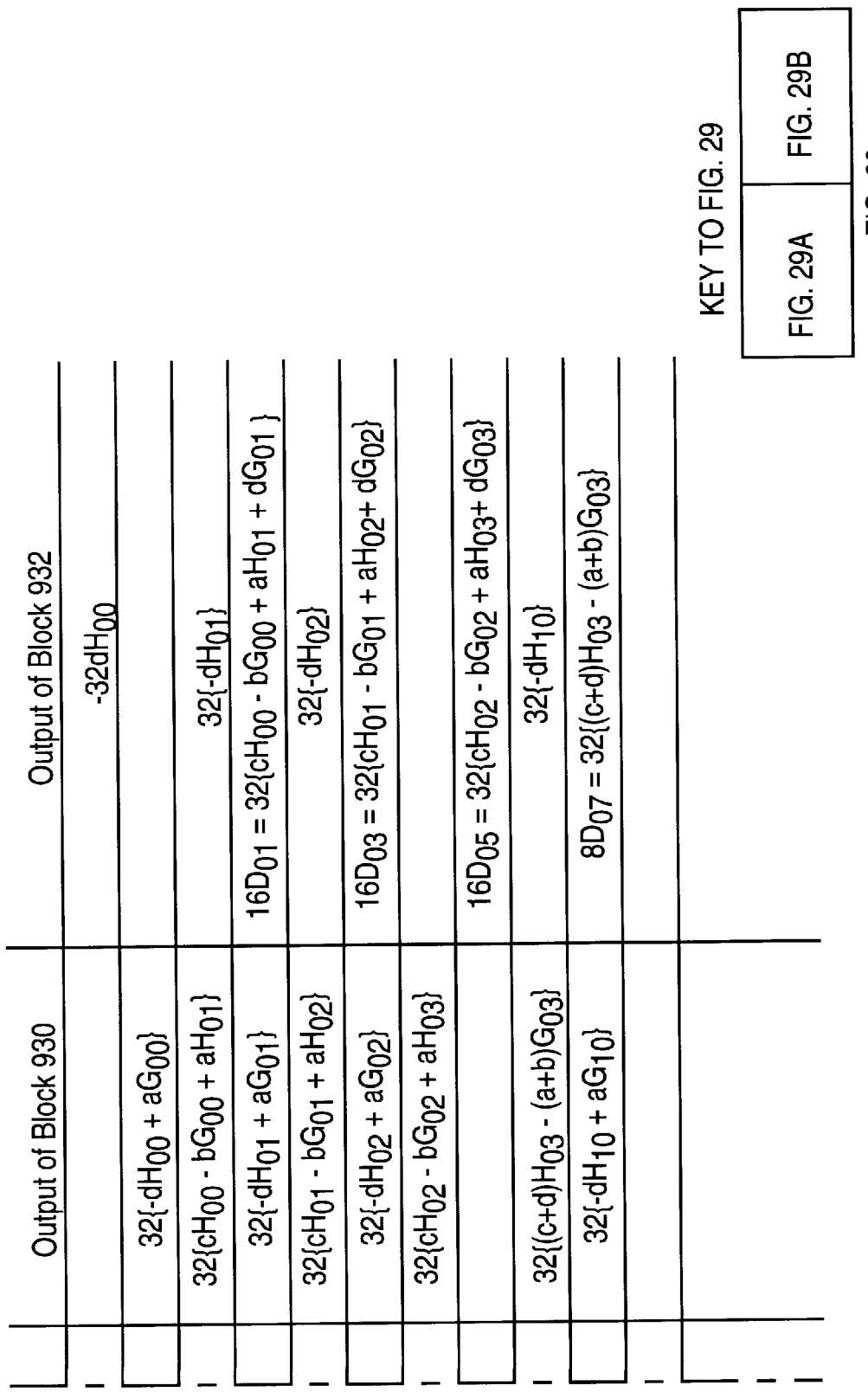
FIG. 29 is a diagram showing data flow in the row convolver of FIG. 5 during an inverse octave 0 transform.

FIGS. 28 and 29 show control signals and data flow for the row convolver 502 of FIG. 5 when the row convolver performs an inverse octave 0 discrete wavelet transform on the data output from the column convolver to inverse transform the transformed-image data back to the image domain. Column convolver 504 receives transformed values $HH_{00} \ldots GH_{03}$ and so forth as illustrated in FIG. 27 and generates the values $H_{00} \ldots G_{03}$ and so forth as illustrated in FIG. 26 onto output leads 524. Row convolver 502 receives the values $H_{00} \ldots G_{03}$ and so forth, as illustrated in FIG. 28, and generates the inverse transformed data values $D_{00}, D_{01}, D_{02} \ldots D_{07}$ and so forth, as illustrated in FIG. 28, onto output leads 520 of row convolver 502. The inverse transformed data values output from row convolver 502 are written to memory unit 114.

The control signals and the data flows of FIGS. 22, 25 23, 24, 25, 26, 27, 28 and 29 comprise the inverse transformation from octave 1 to octave 0 and from octave 0 back into image domain inverse transformed data values which are substantially the same as the original data values of the matrix Table 1. The control signals which control the row convolver and column convolver to perform the inverse transform are generated by control block 506. The addresses and control signals used to read data values from and write data values to memory units 116 and 114 are generated by the DWT address generator block 508 under the control of control block 506.

After the inverse wavelet transform of the Y matrix of transformed data values is completed, the U and V matrices of transformed data values are inverse transformed one after the other in a similar way to the way the Y matrix was inverse transformed.

FIG. 30 is a block diagram of the DWT address generator block 508 of FIG. 5. The DWT address generator block 508 supplies read and/or write addresses to the memory units 116 and 114 for each octave of the forward and inverse transform. The DWT address generator block 508 comprises a read address generator portion and a write address generator portion. The read address generator portion comprises multiplexer 3006, adder 3010, multiplexer 3002, and resettable delay element 3014. The write address generator portion likewise comprises multiplexer 3008, adder 3012, multiplexer 3004, and resettable delay element 3016. The DWT address generator is coupled to the control block 506 via control leads 534, 556, and 544, to memory unit 116 via address leads 3022, and to memory unit 114 via address leads 3020. The input leads of DWT address generator 508 comprise the DWT address generator read control leads 534, the DWT address generator write control leads 544, and the muxcontrol lead 534. The DWT address generator read control leads 534, in turn, comprise 6 leads which carry the values col_end_R, channel_start_R, reset_R, oct_add_factor_R, incr_R, base_u_R, and base_v_R. The DWT address generator write control leads 544, in turn, comprise leads which carry the values col_end_W, channel_start_W, reset_W, oct_add_factor_W, incr_W, base_u_W, and base_v_W. All signals contained on these leads are provided by control block 506. The output leads of DWT address generator block 508 comprise address leads 3022 which provide address information to memory unit 116, and address leads 3020 which provide address information to memory unit 114. The addresses provided on leads 3022 can be either read or write addresses, depending on the cycle of the DWT transform circuit 122 as dictated by control signal muxcontrol provided by control block 506 on lead 556. The addresses provided on leads 3020 are write-only addresses, because memory unit 114 is only written to by the DWT transform circuit 122.

Memory locations of a two-dimensional matrix of data values such as the matrices of Table 1, FIG. 12 and FIG. 16 may have memory location addresses designated 0, 1, 2 and so forth, the addresses increasing by one left to right across each row and increasing by one to skip from the right most memory location at the end of a row to the left most memory location of the next lower row. To address successive data values in a matrix of octave 0 data values, the address is incremented by one to read each new data value D from the matrix.

For octave 1, addresses are incremented by two because the HH values are two columns apart as illustrated in FIG. 16. The row number, however, is incremented by two rather than one because the HH values are located on every other row. The DWT address generator 508 in octave 1 therefore increments by two until the end of a row is reached. The DWT address generator then increments once by ximage+2 as can be seen from FIG. 16. For example, the last HH value in row 0 of FIG. 16 is $HH_{03}$ at memory address 6 assuming $HH_{00}$ has an address of 0 and that addresses increment by one from left to right, row by row, through the data values of the matrix. The next HH value is in row two, $HH_{10}$, at memory address 16. The increment factor in a row is therefore incr=$2^{octave}$. The increment factor at the end of a row is oct_add_factor=($2^{octave}$−1) * ximage+$2^{octave}$ for octave≧0, where ximage is the x dimension of the image.

In some embodiments, the transformed Y data values are stored in memory unit 116 from addresses 0 through (ximage * yimage−1), where yimage is the y dimension of the matrix of the Y data values. The transformed U data values are then stored in memory unit 116 from address base_u up to base_v−1, where:

$$base\_u = ximage * yimage$$

$$base\_v = ximage * yimage + \frac{ximage * yimage}{4}$$

Similarly, the transformed V data values are stored in memory unit 116 at addresses beginning at address base_v.

The operation of the read address generator portion in FIG. 30 is representative of both the read and write portions. In operation, multiplexer base_mux 3002 of FIG. 30 sets the read base addresses to be 0 for the Y channel, base_u_R for the U channel, and base_V_R for the V channel. Multiplexer 3002 is controlled by the control signals channel_start_R which signifies when each Y, U, V channel starts. Multiplexer mux 3006 sets the increment factor to be incr_R, or, at the end of each row, to oct_add_factor_R. The opposite increment factor is supplied to adder 3010 which adds the increment factor to the current address present on the output leads of delay elements 3014 so as to generate the next read address, next_addr_R. The next read address next_addr_R is then stored in the delay element 3014.

In some embodiments in accordance with the present invention, tables of incr_R and oct_add_factor_R for each octave are downloaded to REGISTERS block 536 on the video encoder/decoder chip 112 at initialization via download registers bus 128. These tables are passed to the control block 506 at initialization. To clarify the illustration, the leads which connect REGISTERS block 536 to control block 506 are not included in FIG. 5. In other embodiments, values of incr_R and oct_add_factor_R are precalculated in hardware from the value of ximage using a small number of gates located on-chip. Because the U and V matrices have half the number of columns as the Y matrix, the U and V jump tables are computed with ximage replaced by $$\frac{ximage}{2},$$

a one bit shift. Because the tree encoder/decoder restricts ximage to be a multiple of $2^{(OCT+1)} > 2^{octave}$, the addition of $2^{octave}$ in the oct_add_factor is, in fact, concatenation. Accordingly, only the factor ($2^{octave}$−1) * ximage must be calculated and downloaded. The jump tables for the U and V addresses can be obtained from the Y addresses by shifting this factor one bit to the right and then concatenating with $2^{octave}$. Accordingly, appropriate data values of a matrix can be read from a memory storing the matrix and processed data values can be written back into the matrix in the memory to the appropriate memory locations.

Figure 31:
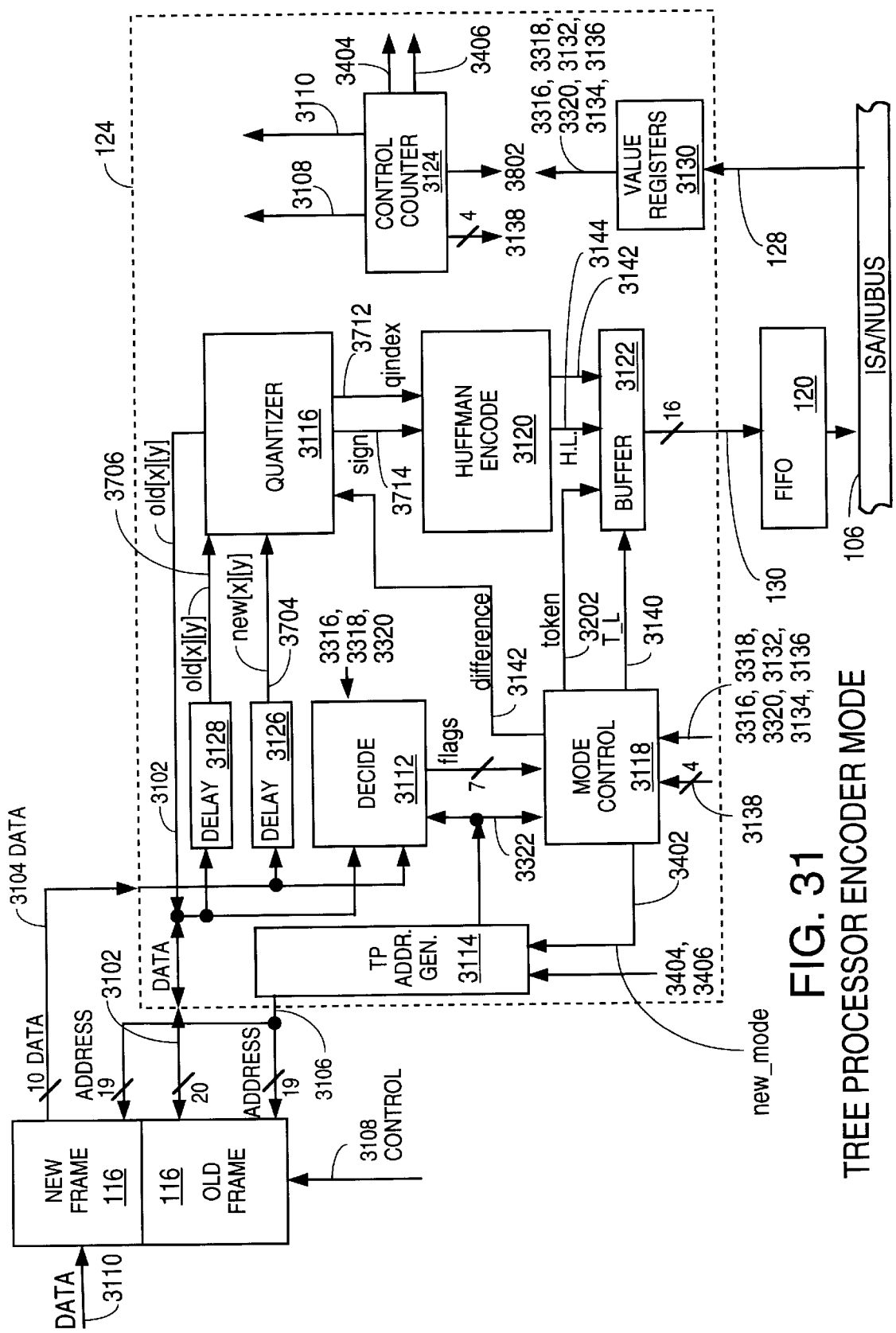
FIG. 31 is a block diagram of the tree processor/encoder-decoder circuit 124 of FIG. 1, simplified to illustrate an encoder mode.

FIGS. 31 and 32 are block diagrams of one embodiment of the tree processor/encoder-decoder circuit 124 of FIG. 1. FIG. 31 illustrates the circuit in encoder mode and FIG. 32 illustrates the circuit in decoder mode. Tree processor/encoder-decoder circuit 124 comprises the following blocks: DECIDE block 3112, TP_ADDR_GEN block 3114, quantizer block 3116, MODE_CONTROL block 3118, Huffman encoder-decoder block 3120, buffer block 3122, CONTROL_COUNTER block 3124, delay element 3126, delay element 3128, and VALUE_REGISTERS block 3130.

The tree processor/encoder-decoder circuit 124 is coupled to FIFO buffer 120 via input/output data leads 130. The tree processor/encoder-decoder circuit 124 is coupled to memory unit 116 via an old frame data bus 3102, a new frame data bus 3104, an address bus 3106, and memory control buses 3108 and 3110. The VALUE_REGISTERS block 3130 of the tree processor/encoder-decoder circuit 124 is coupled to data bus 106 via a register download bus 128. FIGS. 31 and 32 illustrate the same physical hardware; the encoder and decoder configurations of the hardware are shown separately for clarity. Although two data buses 3104 and 3102 are illustrated separately in FIG. 31 to facilitate understanding, the new and old frame data buses may actually share the same pins on video encoder/decoder chip 112 so that the new and old frame data are time multiplexed on the same leads 526 of memory unit 116 as illustrated in FIG. 5. Control buses 3108 and 3110 of FIG. 31 correspond with the control lines 2108 in FIG. 5. The DWT address generator block 508 of the discrete wavelet transform circuit 122 and the tree processor address generator block 3114 of the tree processor/encoder-decoder circuit 124 access memory unit 116 therefore may use the same physical address, data and control lines.

FIG. 33 illustrates an embodiment of DECIDE block 3112. A function of DECIDE block 3112 is to receive a two-by-two block of data values from memory unit 116 for each of the old and new frames and from these two-by-two blocks of data values and from the signals on leads 3316, 3318, 3320 and 3322, to generate seven flags present on leads 3302, 3304, 3306, 3308, 3310, 3312 and 3314. The MODE_CONTROL block 3118 uses these flags as well as values from VALUE_REGISTERS block 3130 supplied via leads 3316, 3318 and 3320 to determine the mode in which the new two-by-two block will be encoded. The addresses in memory unit 116 at which the data values of the new and old two-by-two blocks are located and determined by the address generator TP_ADDR_GEN block 3114.

The input signal on register lead 3316 is the limit value output from VALUE_REGISTERS block 3130. The input signal on register leads 3318 is the qstep value output from VALUE_REGISTERS block 3130. The input signal on register lead 3320 is the compare value output from VALUE_REGISTERS block 3130. The input signal on register lead 3322 is the octave value generated by TP_ADDR_GEN block 3114 as a function of the current location in the tree of the sub-band decomposition. As described in U.S. patent application Ser. No. 08/040,301 at equations 62–71, the values of the flags new_z, nz_flag, origin, noflag, no_z, oz_flag, and motion, produced on leads 3302, 3304, 3306, 3308, 3310, 3312, and 3314, respectively, are determined in accordance with the following equations:

$$nz = \sum_{0 \leq x, y \leq 1} |\text{new}[x][y]| \quad \text{(equ. 1)}$$

$$oz = \sum_{0 \leq x, y \leq 1} |\text{old}[x][y]| \quad \text{(equ. 2)}$$

$$no = \sum_{0 \leq x, y \leq 1} |\text{new}[x][y] - \text{old}[x][y]| \quad \text{(equ. 3)}$$

$$nz\_\text{flag} = nz < \text{limit} \quad \text{(equ. 4)}$$

$$\text{noflag} = no < \text{compare} \quad \text{(equ. 5)}$$

$$\text{origin} = nz \leq no \quad \text{(equ. 6)}$$

$$\text{motion} = ((nz + oz) \ll \text{octave}) \leq no \quad \text{(equ. 7)}$$

$$\text{new}\_z = |\text{new}[x][y]| < qstep, \quad \text{(equ. 8)}$$
$$\text{for } 0 \leq x, y \leq 1$$

$$no\_z = |\text{new}[x][y] - \text{old}[x][y]| < qstep, \quad \text{(equ. 9)}$$
$$\text{for } 0 \leq x, y \leq 1$$

$$oz\_\text{flag} = \text{old}[x][y] = 0, \quad \text{(equ. 10)}$$
$$\text{for all } 0 \leq x, y \leq 1$$

The DECIDE block 3112 comprises subtractor block 3324, absolute value (ABS) blocks 3326, 3328, and 3330, summation blocks 3332, 3334, and 3336, comparator blocks 3338, 3340, 3342, 3344, 3346, 3350, and 3352, adder block 3354, and shift register block 3356. The value output by ABS block 3326 is the absolute value of the data value new[x][y] on leads 3104. Similarly, the value output by ABS block 3328 is the absolute value of the data value old[x][y] on leads 3102. The value output by ABS block 3330 is the absolute value of the difference between the data values new[x][y] and old[x][y]. Comparator 3338, coupled to the output leads of ABS block 3326, unasserts new_z flag on lead output 3302 if qstep is less than the value output by block 3326. Block 3332 sums the last four values output from block 3326 and the value output by block 3332 is supplied to comparator block 3340. Comparator block 3340 compares this value to the value of limit 3316. The flag nz_flag 3304 is asserted on lead 3304 if limit is greater than or equal to the value output by block 3332. This value corresponds to nz_flag in equation 4. Summation block 3334 similarly sums the four most recent values output by block 3328. The values outputs by blocks 3332 and 3334 are added together by block 3354, the values output by block 3354 being supplied to shift register block 3356. The shift register block 3356 shifts the value received to the left by octave bits. Summation block 3336 adds the four most recent values output by block 3330. Comparator block 3342 compares the value output by block 3332 to the value output by block 3336 and asserts the motion flag in accordance with equation 7. The origin flag on output lead 3306 is asserted when the value output by block 3332 is less than the value output by 3336. This value corresponds to origin in equation 6 above. The value output by block 3336 is compared to the value compare by block 3344 such that flag noflag is asserted when compare is greater than the value output from block 3336. Block 3346 compares the value output by block 3330 to the value qstep such that flag no_z is unasserted when qstep is less. This corresponds to flag no_z in equation 9. The old input value on leads 3102 is compared to the value 0 by block 3350 such that flag oz_flag on lead 3312 is asserted when each of the values of the old block is equal to 0. This corresponds to oz_flag in equation 10 above. The seven flags produced by the DECIDE block of FIG. 33 are passed to the MODE_CONTROL block 3118 to determine the next mode.

The tree processor/encoder-decoder circuit 124 of FIG. 31 comprises delay elements 3126 and 3128. Delay element 3126 is coupled to the NEW portion of memory unit 116 via new frame data bus 3104 to receive the value new[x][y]. Delay element 3128 is coupled to the OLD portion of memory unit 116 via old frame data bus 3102 to receive the value old[x][y]. These delay elements, which in some embodiments of the invention are implemented in static random access memory (SRAM), serve to delay their respective input values read from memory unit 116 for four cycles before the values are supplied to quantizer block 3116. This delay is needed because the DECIDE block 3112 introduces a four-cycle delay in the dataflow as a result needing to read the four most recent data values before the new mode in which those data values will be encoded is determined. The delay elements therefore synchronize signals supplied to quantizer block 3116 by the MODE_CONTROL block 3118 with the values read from memory unit 116 which are supplied to quantizer block 3116.

The tree processor/encoder-decoder circuit 124 of FIGS. 31 and 32 comprises a VALUE_REGISTERS block 3130. The VALUE_REGISTERS block 3130 serves the function of receiving values from an external source and asserting these values onto leads 3316, 3318, 3320, 3132, 3134 and 3136, which are coupled to other blocks in the tree processor/encoder-decoder 124. In the presently described embodiment the external source is data bus 106 and VALUE_REGISTERS block 3130 is coupled to data bus 106 via a download register bus 128. Register leads 3316 carry a signal corresponding to the value of limit and are coupled to DECIDE block 3112 and to MODE_CONTROL block 3118. Register leads 3318 carry signals indicating the value of qstep and are coupled to DECIDE block 3112 and to MODE_CONTROL block 3118. Register leads 3320 carry signals indicating the value of compare and are coupled to DECIDE block 3112 and to MODE_CONTROL block 3118. Register leads 3132 carry signals indicating the value of ximage and are coupled to TP_ADDR_GEN block 3114 and to MODE_CONTROL block 3118. Register leads 3134 carry signals indicating the value of yimage and are coupled to TP_ADDR_GEN block 3114 and to MODE_CONTROL block 3118. Register lead 3136 carries a signal corresponding to the value of direction and is coupled to TP_ADDR_GEN block 3114, MODE CONTROL block 3118, buffer block 3122, Huffman encoder-decoder block 3120, and quantizer block 3116. To clarify the illustration, only selected ones of the connections between the VALUE_REGISTERS block 3130 and other blocks of the tree processor/encoder-decoder circuit 124 are illustrated in FIGS. 31 and 32. VALUE REGISTERS block 3130 is, in some embodiments, a memory mapped register addressable from bus 106.

Figure 34A:
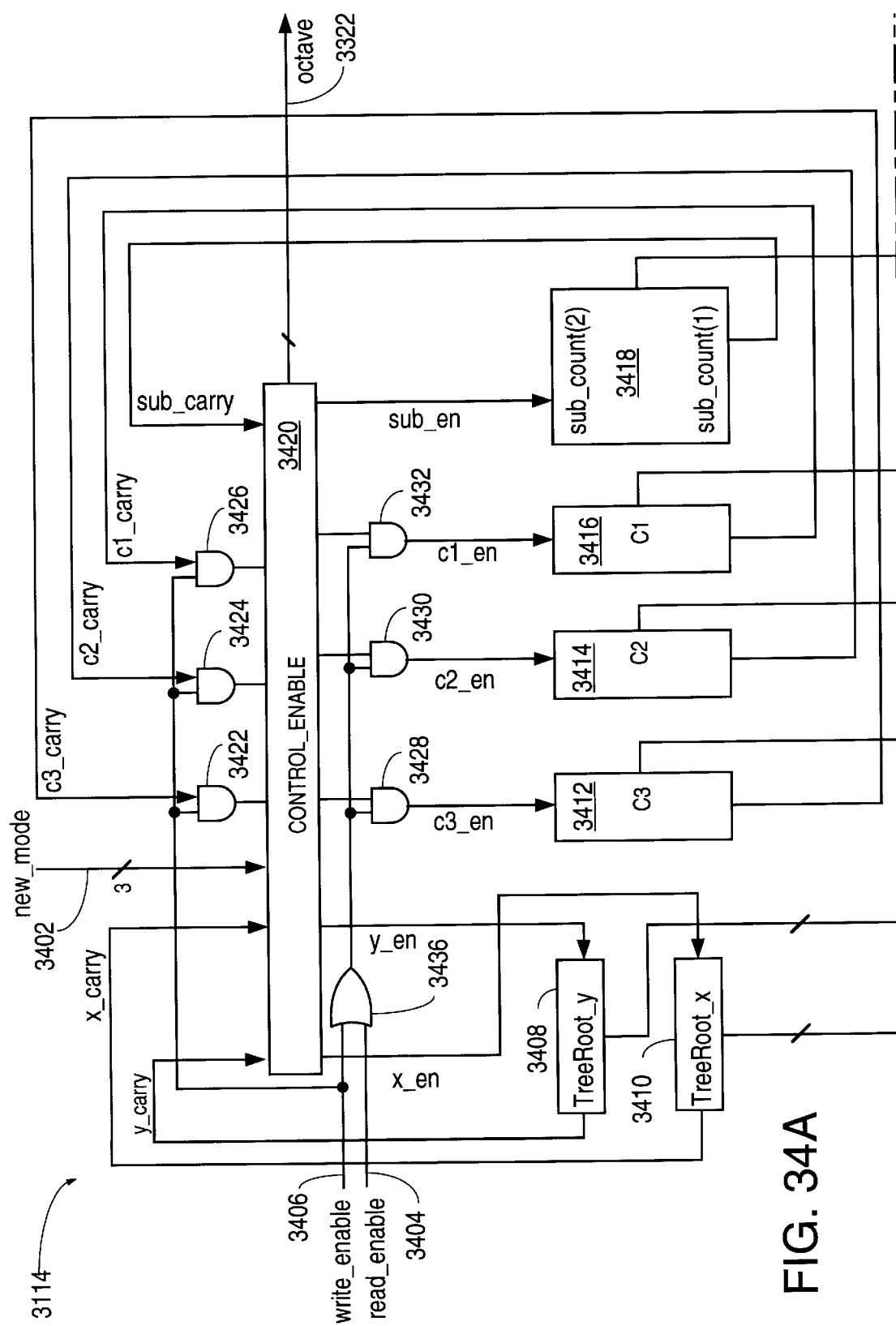
FIG. 34 is a block diagram of the tree processor address generator TP_ADDR_GEN block 3114 of the tree processor/encoder-decoder of FIGS. 31–32.
Figure 34B:
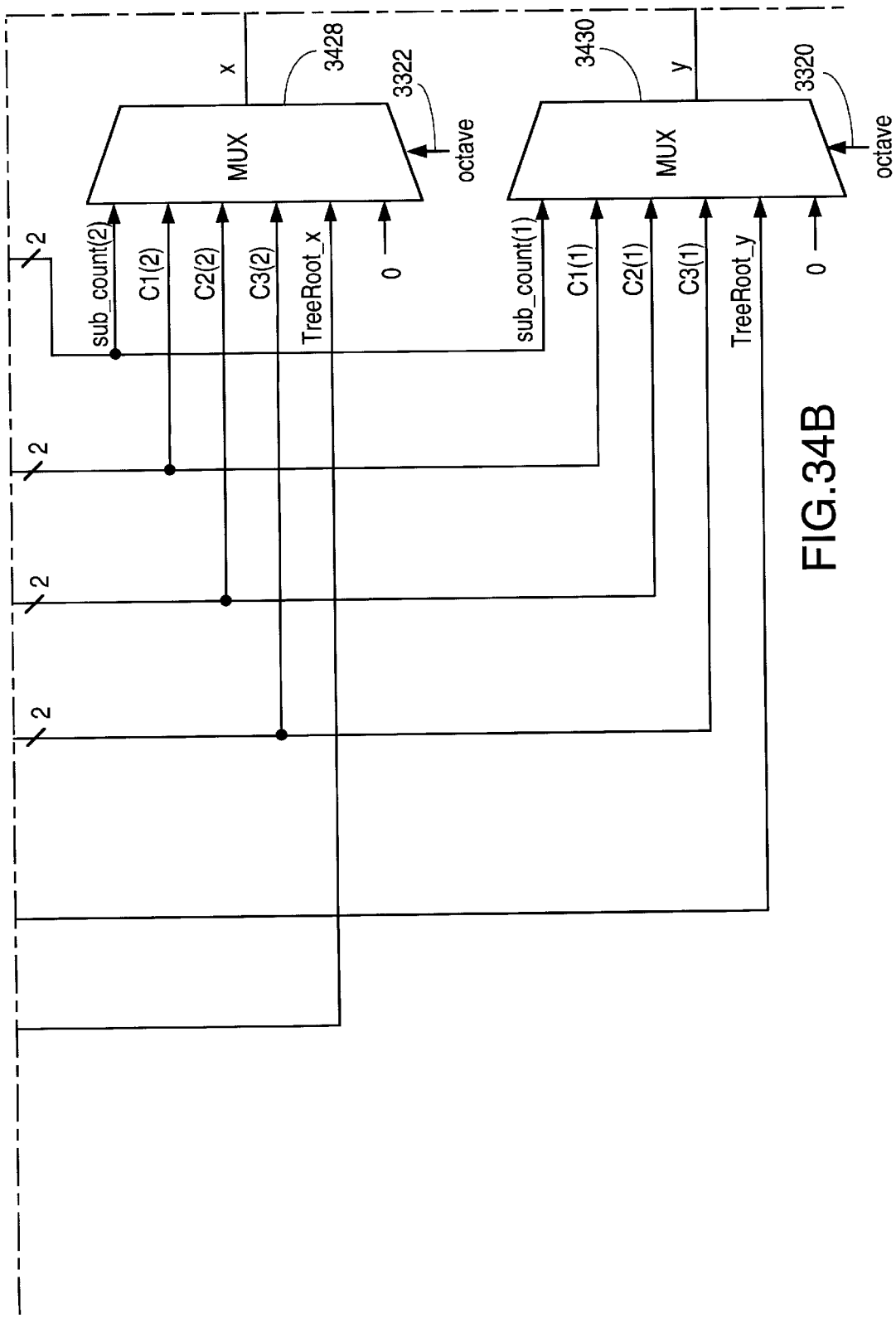

FIG. 34 is a block diagram of an embodiment of address generator TP_ADDR_GEN block 3114 of FIG. 32. The TP_ADDR_GEN block 3114 of FIG. 34 generates addresses to access selected two-by-two blocks of data values in a tree of a sub-band decomposition using a counter circuit (see FIGS. 27–29 of U.S. patent application Ser. No. 08/040,301 and the corresponding text). FIG. 34 illustrates a three-octave counter circuit. The signals supplied to TP_ADDR_GEN block 3114 are provided by MODE_CONTROL block 3118, CONTROL_COUNTER block 3124, and VALUE_REGISTERS block 3130. MODE_CONTROL block 3118 is coupled to TP_ADDR_GEN block 3114 by leads 3402 which carry the three bit value new_mode. CONTROL_COUNTER 3124 is coupled to TP_ADDR_GEN block 3114 by leads 3404 and 3406 which carry signals read_enable and write_enable, respectively. VALUE_REGISTER block 3130 is coupled to TP_ADDR_GEN block 3114 by register leads 3132 which carry a signal indicating the value of ximage. The output leads of TP_ADDR_GEN block 3114 comprise tree processor address bus 3106 and octave leads 3322. The address generator TP_ADDR_GEN block 3114 comprises a series of separate counters: counter TreeRoot_x 3410, counter TreeRoot_y 3408, counter C3 3412, counter C2 3414, counter C1 3416, and counter sub_count 3418. TP_ADDR_GEN block 3114 also comprises CONTROL_ENABLE block 3420, multiplexer 3428, multiplexer 3430, NOR gate 3436, AND gates 3422, 3424 and 3426, AND gates 3428, 3430 and 3432, multiplier block 3432 and adder block 3434.

Counter TreeRoot_x 3410 counts from 0 up to $$\frac{ximage}{2^{OCT+1}} - 1$$

and counter TreeRoot_y 3408 counts from 0 up to $$\frac{yimage}{2^{OCT+1}} - 1,$$

where OCT is the maximum number of octaves in the decomposition. Counters C3, C2, C1, and sub_count are each 2-bit counters which count from 0 up to 3, and then return to 0. Each of these counters takes on its next value in response to a respective count enable control signal supplied by CONTROL_ENABLE block 3420. FIG. 34 shows count enable control signals x_en, y_en, c3_en, c2_en, c1_en, and sub_en, being supplied to the counters TreeRoot_x, TreeRoot_y, C3, C2, C1 and sub_count, respectively. When one of the counters reaches its maximum value, the counter asserts a carry out signal back to the CONTROL_ENABLE block 3420. These carry out signals are denoted in FIG. 34 as x_carry, y_carry, c3_carry, c2_carry, c1_carry, and sub_carry.

CONTROL_ENABLE block 3420 responds to input signal new_mode on leads 3402 and to the carry out signals to generate the counter enable signals. The octave signal output by CONTROL_ENABLE is the value of the octave of the transform of the data values currently being addressed. The c1_carry, c2_carry, and c3_carry signals are logically ANDed with the write_enable signal supplied from CONTROL_COUNTER block 450 before entering the CONTROL_ENABLE block 3420. This AND operation is performed by AND gates 3422, 3424, and 3426 as shown in FIG. 34. The counter enable signals from CONTROL_ENABLE block 3420 are logically ANDed with the signal resulting from the logical ORing of read_enable and write_enable by OR gate 3436. These ANDing operations are performed by AND gates 3428, 3430, and 3432 as shown in FIG. 34. AND gates 3422, 3424, 3426, 3428, 3430, and 3432 function to gate the enable and carry signals with the read_enable and write_enable signals such that the address space is cycled through twice per state, once for reading and once for writing.

The CONTROL_ENABLE block 3420 outputs the enable signals enabling selected counters to increment when the count value reaches 3 in the case of the 2-bit counters 3412, 3414, and 3418, or when the count value reaches $$\frac{ximage}{2^{OCT+1}} - 1$$

in the case of TreeRoot_x 3410, or when the count value reaches $$\frac{yimage}{2^{OCT+1}} - 1$$

in the case of TreeRoot_y 3408. The resulting x and y addresses of a two-by-two block of data values of a given octave in a matrix of data values are obtained from the signals output by the various counters as follows:

For octave =0:

| | |
|---|---|
| x=TreeRoot_x C3(2) C2(2) C1(2) sub_count(2) | (equ. 11) |
| y=TreeRoot_y C3(1) C2(1) C1(1) sub_count(1) | (equ. 12) |

For octave =1:

| | |
|---|---|
| x=TreeRoot_x C3(2) C2(2) sub_count(2) 0 | (equ. 13) |
| y=TreeRoot_y C3(1) C2(1) sub_count(1) 0 | (equ. 14) |

For octave =2:

| | |
|---|---|
| x=TreeRoot_x C3(2) sub_count(2) 0 0 | (equ. 15) |
| y=TreeRoot_y C3(1) sub_count(1) 0 0 | (equ. 16) |

FIG. 34 and equations 11–16 illustrate how the x and y address component values are generated by ultiplexers 3428 and 3430, respectively, depending on the value of octave. The (2) in equations 11–16 denotes the least significant bit of a 2-bit counter whereas the (1) denotes the most significant bit of a 2-bit counter. TreeRoot_x and TreeRoot_y are the multibit values output by counters 3410 and 3408, respectively. The output of multiplexer 3430 is supplied to multiplier 3432 so that the value output by multiplexer 3430 is multiplied by the value ximage. The value output by multiplier 3432 is added to the value output by multiplexer 3428 by adder block 3434 resulting in the actual address being output onto address bus 3106 and to memory unit 116.

Appendix A discloses one possible embodiment of CONTROL_ENABLE block 3420 of a three octave address generator described in the hardware description language VHDL. An overview of the specific implementation given in this VHDL code is provided below. The CONTROL_ENABLE block 3420 illustrated in FIG. 34 and disclosed in Appendix A is a state machine which allows trees of a sub-band decomposition to be ascended or descended as required by the encoding or decoding method. The CONTROL_ENABLE block 3420 generates enable signals such that the counters generate four addresses of a two-by-two block of data values at a location in a tree designated by MODE_CONTROL block 3118. Instructions from the MODE_CONTROL block 3118 are read via leads 3402 which carry the value new_mode. Each state is visited for four consecutive cycles so that the four addresses of the block are output by enabling the appropriate counter C3 3412, C2 3414 or C1 3416. Once the appropriate counter reaches a count of 3, a carry out signal is sent back to CONTROL_ENABLE block 3420 so that the next state is entered on the next cycle.

Figure 36A:
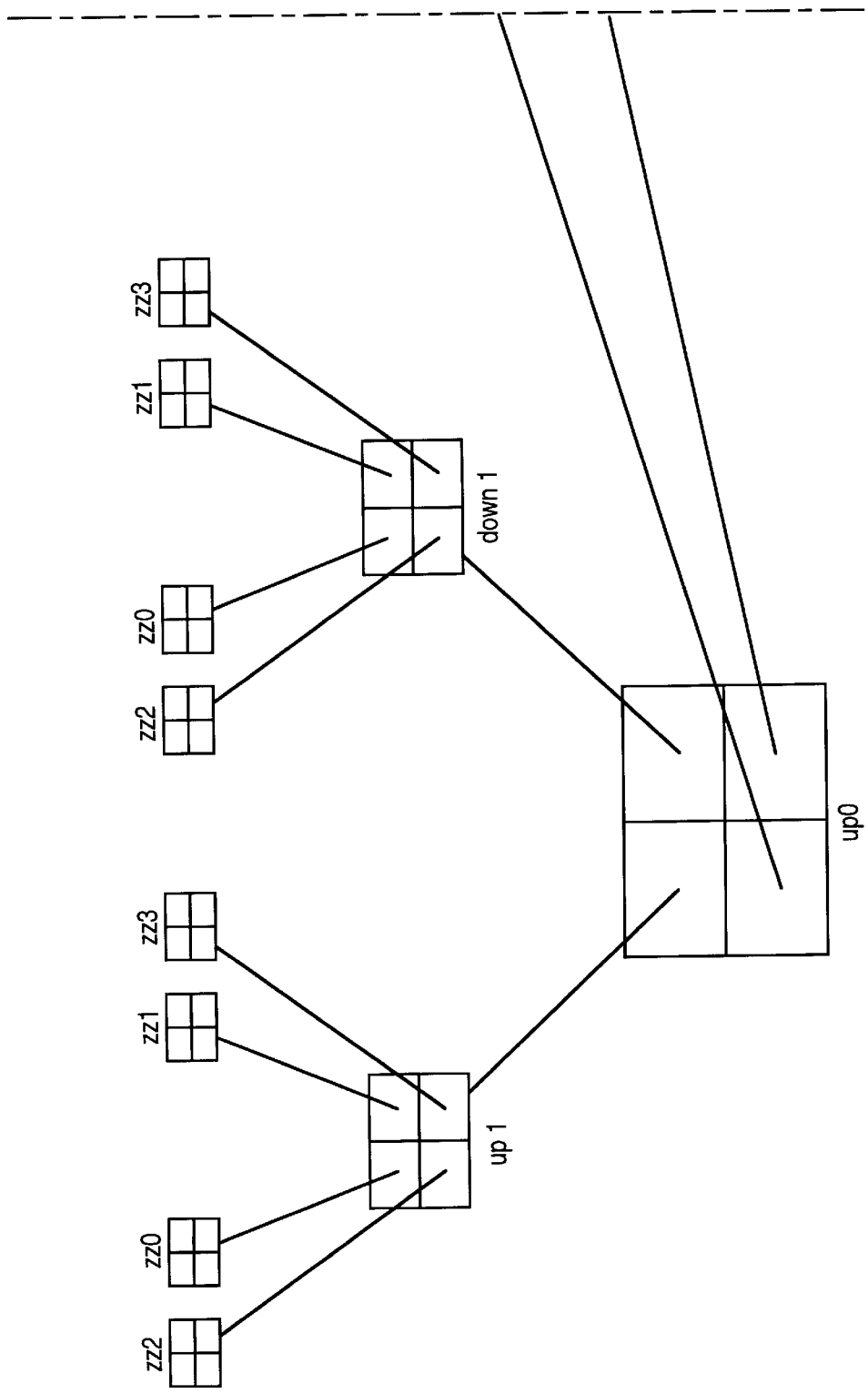
FIG. 36 is a graphical illustration of the tree decomposition process, illustrating the states and corresponding octaves of FIG. 35.
Figure 36B:
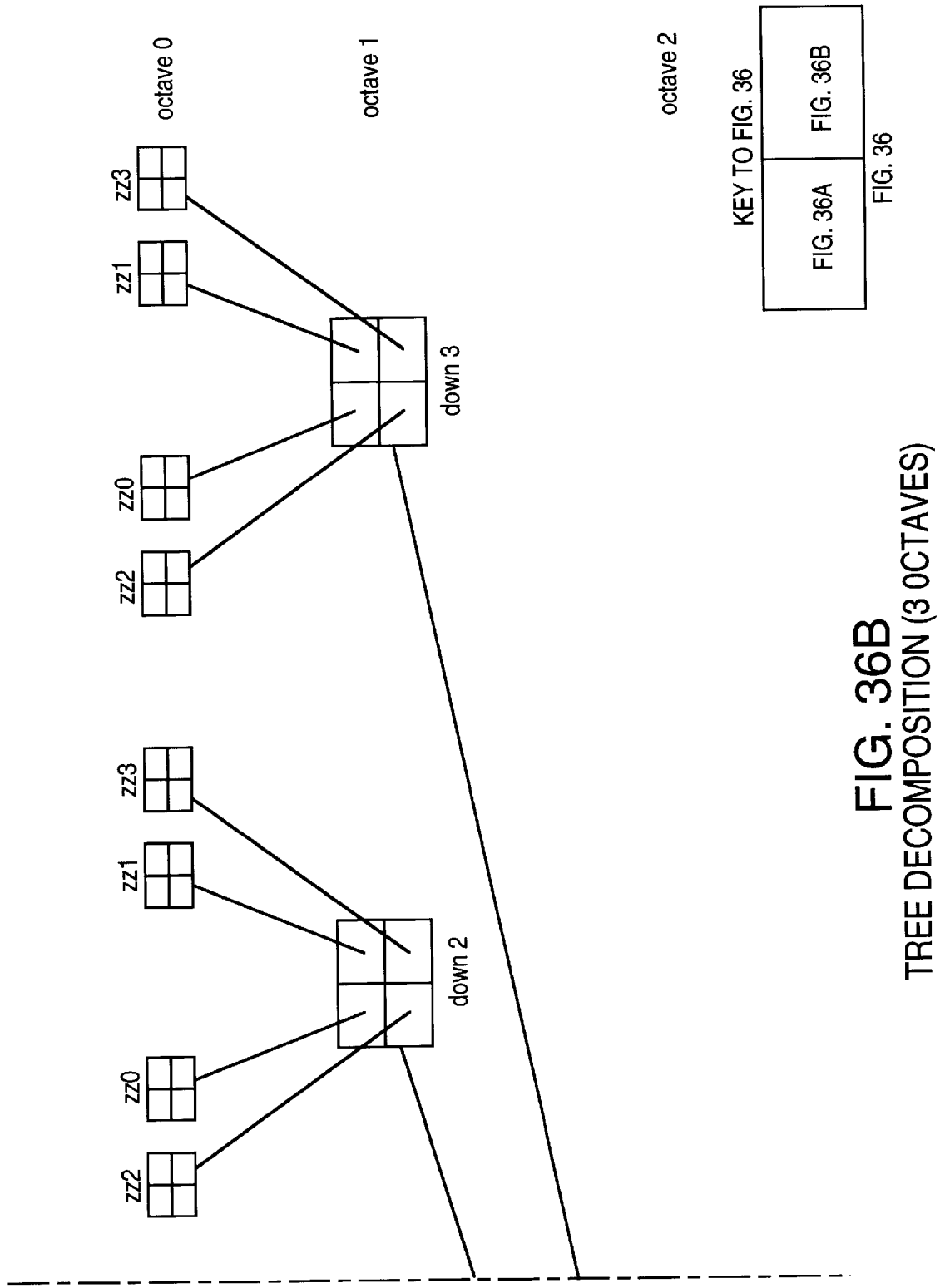

FIG. 35 is a state table for the TP_ADDR_GEN block 3114 of FIG. 34 when the TP_ADDR_GEN block 3114 traverses all the blocks of the tree illustrated in FIG. 36. FIG. 35 has rows, each of which represents the generation of four address values of a block of data values. The (0–3) designation in FIG. 35 represents the four values output by a counter. The names of the states (i.e, up0, up1, down1) do not indicate movement up or down the blocks of a tree but rather correspond with state names present in the VHDL code of Appendix A. (In Appendix A, the states down1, down 2 and down 3 are all referred to as down1 to optimize the implementation.) The state up0 in the top row of FIG. 35, for example, corresponds to addressing the values of two-by-two block located at the root of the tree of FIG. 36. In the tree of FIG. 36 there are three octaves. After these four addresses of the two-by-two block at the root of the tree are generated, the tree may be ascended to octave 1 by entering the state up1.

FIG. 36 illustrates a complete traversal of all the data values of one tree of a 3-octave sub-band decomposition as well as the corresponding states of the CONTROL_ENABLE block of FIG. 35. One such tree exists for each of the "GH", "HG" and "GG" sub-bands of a sub-band decomposition.

First, before a tree of the sub-band decomposition is traversed, all low pass HHHHHH component values of the decomposition are addressed by setting counter sub_count to output 00. Counter C3 3412 is incremented through its four values. Counter TreeRoot_x is then incremented and counter C3 3412 is incremented through its four values again. This process is repeated until TreeRoot_x reaches its maximum value. The process is then repeated with TreeRoot_y being incremented. In this manner, all HHHHHH low pass components are accessed. Equations 15 and 16 are used to compute the addresses of the HHHHHH low pass component data values.

Next, the blocks of the "GH" subband of a tree given by TreeRoot_x and TreeRoot_y are addressed. This "GH" subband corresponds to the value sub_count=10 (sub_count (1)=1 and sub_count (2)=0). The upo state shown in FIG. 35 is used the generate the four addresses of the root block of the "GH" tree in accordance with equation 15. The up1 state shown in FIG. 35 is then used such that addresses corresponding to equations 13 and 14 are computed to access the desired two-by-two block of data values in octave 1. The four two-by-two blocks in octave 0 are then accessed in accordance with equations 11 and 12. With TreeRoot_x and TreeRoot_y and sub_count untouched, the states zz0, zz1, zz2 and zz3 are successively entered, four addresses being generated in each state. After each one of these four states is exited, the C2 counter 3414 is incremented by CONTROL_ENABLE block 3420 via the c2_en signal once in order to move to the next octave 0 block in that branch of the tree. After incrementing in state zz3 is completed, the left hand branch of the tree is exhausted. To move to the next two-by-two block, the C3 counter 3412 is incremented and the C2 counter 3414 is cycled through its four values to generate the four addresses of the next octave 1 block in state downl in accordance with equations 13 and 14. In this way, the TP_ADDR_GEN block 3114 generates the appropriate addresses to traverse the tree in accordance with instructions received from MODE_CONTROL block 3118. When the traversal of the "GH" sub-band tree is completed, the traversal of the sub-band decomposition moves to the corresponding tree of the next sub-band without changing the value of TreeRoot_x and TreeRoot_y. Accordingly, a "GH" "HG" and "GG" family of trees are traversed. After all the blocks of the three sub-band trees have been traversed, the TreeRoot_x and TreeRoot_y values are changed to move to another family of sub-band trees.

To move to the next family of sub-band trees, the counter TreeRoot_x 3410 is incremented, and the C3 3412, C2 3414, C1 3416 counters are returned to 0. The process of traversing the new "GH" tree under the control of the MODE_CONTROL block 3118 proceeds as before. Similarly, the corresponding "HG" and "GG" trees are traversed. After TreeRoot_x 3410 reaches its final value, a whole row of tree families has been searched. The counter TreeRoot_y 3408 is therefore incremented to move to the next row of tree families. This process may be continued until all of the trees in the decomposition have been processed.

The low pass component HHHHHH (when sub_count=00) does not have a tree decomposition. In accordance with the present embodiment of the present invention, all of the low pass component data values are read first as described above and are encoded before the tree encoder reads and encodes the three subbands. The address of the data values in the HHHHHH subband are obtained from the octave 3 x and y addresses with sub_count=00. Counters C3 3412, TreeRoot_x 3410, and TreeRoot_y 3408 run through their respective values. After the low pass component data values and all of the trees of all the sub-bands for the Y data values have been encoded, the tree traversal method repeats on the U and V data values.

Although all the blocks of the tree of FIG. 36 are traversed in the above example of a tree traversal, the MODE_CONTROL block 3118 may under certain conditions decide to cease processing data values of a particular branch and to move to the next branch of the tree as set forth in U.S. patent application Ser. No. 08/040,301. This occurs, for example, when the value new_mode output by the MODE_CONTROL block 3118 indicates the mode STOP. In this case, the state machine of CONTROL_ENABLE block 3420 will move to, depending on the current location in the tree, either the next branch, or, if the branch just completed is the last branch of the last tree, the next tree.

FIG. 34 illustrates control signal inputs read_enable and write_enable being supplied to TP_ADDR_GEN block 3114. These enable signals are provided because the reading of the new/old blocks and the writing of the updated values to the old frame memory occur at different times. To avoid needing two address generators, the enable signals of the counters C3 3412, C2 3414, and C1 3416 are logically ANDed with the logical OR of the read_enable and write_enable signals. Similarly, the carryout signals of these counters are logically ANDed with the write_enable signal. During time periods when the new/old blocks are read from memory, the read_enable signal is set high and the write_enable signal is set low. This has the effect of generating the addresses of a two-by-two block, but disabling the change of state at the end of the block count. The counters therefore return to their original values they had the start of the block count so that the same sequence of four address values will be generated when the write_enable signal is set high. This time, however, the carry out is enabled into the CONTROL_ENABLE block 3420. The next state is therefore entered at the conclusion of the block count. In this manner, the address space is cycled through twice per state, once for reading and once for writing.

Figure 37:
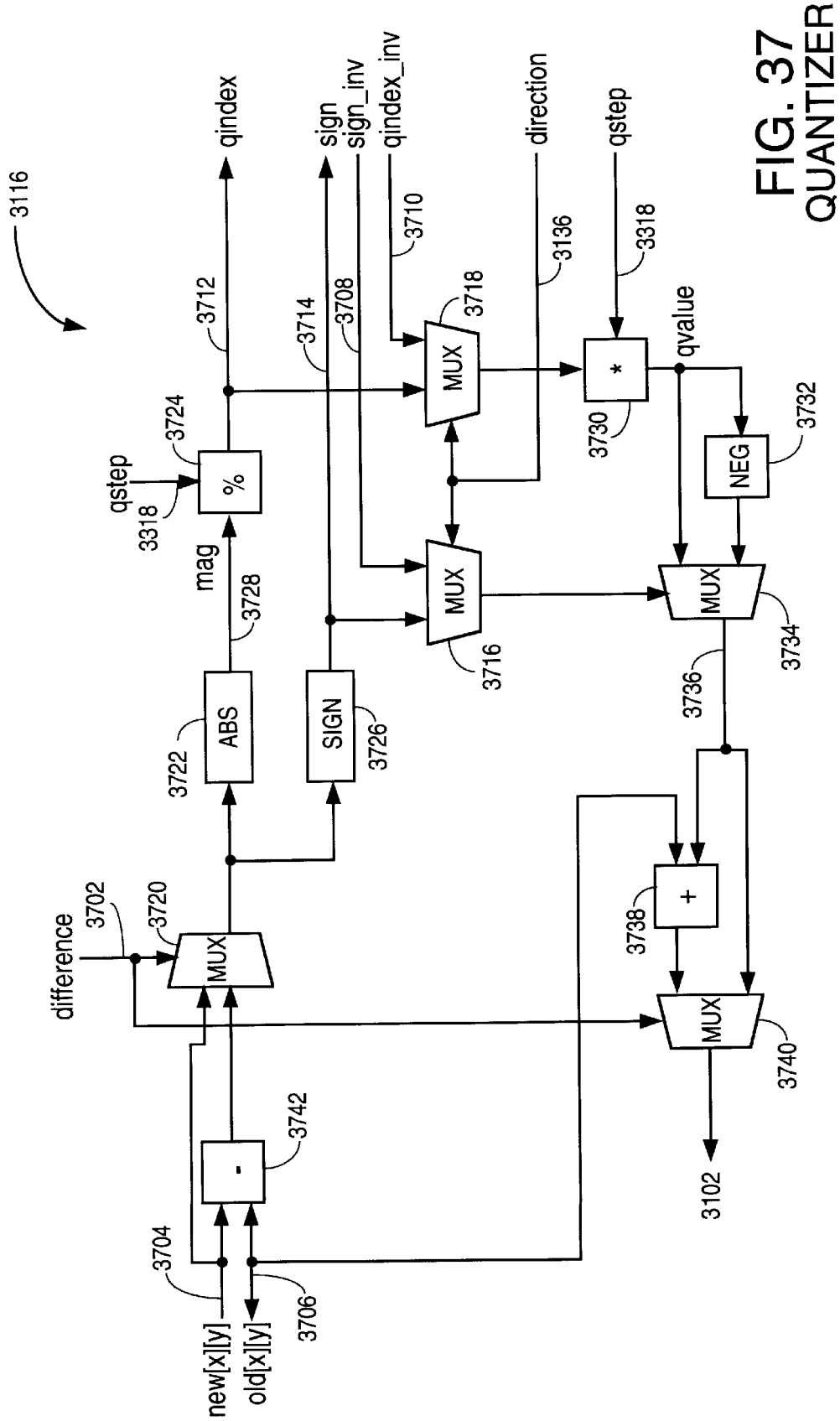
FIG. 37 is a block diagram of the quantizer circuit block 3116 of the tree processor/encoder-decoder of FIGS. 31–32.

FIG. 37 is a block diagram of one embodiment of quantizer block 3116 of FIG. 31. As shown in FIG. 31, quantizer block 3116 is coupled to MODE_CONTROL block 3118, a Huffman encoder-decoder block 3120, delay block 3126, delay block 3128, and VALUE_REGISTERS block 3130. Input lead 3702 carries the signal difference from MODE_CONTROL block 3118 which determines whether a difference between the new frame and old frame is to be quantized or whether the new frame alone is to be quantized. Values new[x][y] and old[x][y] are supplied on lines 3704 and 3706, respectively, and represent values from memory unit 116 delayed by four clock cycles. Input leads 3708 and 3710 carry the values sign_inv and qindex_inv from the Huffman encoder-decoder block 3120, respectively. Register leads 3318 and 3136 carry signals corresponding to the values qstep and direction from VALUE_REGISTERS block 3130, respectively.

During encoding, quantizer block 3116 performs quantization on the values new[x][y], as dictated by the signal difference and using the values old[x][y], and generates the output values qindex onto output leads 3712, sign onto output lead 3714, and a quantized and then inverse quantized value old[x][y] onto data bus 3102. The quantized and inverse quantized value old[x][y] is written back into memory unit 116.

During decoding, quantizer block 3116 performs inverse quantization on the values old[x][y], as dictated by the signals difference, sign_inv, and qindex_inv, and generates an inverse quantized value, old[x][y], which is supplied to the old portion of memory unit 116 via bus 3102. Lead 3136 carries the value direction supplied by the VALUE_REGISTERS 3130.

The value direction controls whether the quantizer operates in the encoder mode or the decoder mode. FIG. 37 illustrates that multiplexers 3716 and 3718 use the direction signal to pass signals corresponding to the appropriate mode (sign and qindex for encoder mode; sign_inv and qindex_inv for decoder mode). Multiplexer 3720 passes either the difference of the new and old data values or passes the new value depending on the value of the difference signal. Absolute value block ABS 3722 converts the value output by multiplexer 3720 to absolute value form and supplies the absolute value form value to block 3724. The output leads of multiplexer 3720 are also coupled to sign block 3726. Sign block 3726 generates a sign signal onto lead 3714 and to multiplexer 3716.

Block 3724 of the quantizer block 3116 is an human visual system (HVS) weighted quantizer having a threshold of qstep. The value on input leads 3728 denoted mag in FIG. 37 is quantized via a modulo-qstep division (see FIGS. 30 and 31 of U.S. patent application Ser. No. 08/040,301 and the corresponding text). The resulting quantized index value qindex is output onto leads 3712 to the Huffman encoder block 3120. Multiplexer 3716 receives the sign signal on leads 3714 from block 3726 and also the sign_inv signal on lead 3708. Multiplexer 3716 passes the sign value in the encoder mode and passes the sign_inv value in the decoder mode. Likewise, multiplexer 3718 has as two inputs, the qindex signal on leads 3712 and the qindex_inv signal on leads 3710. Multiplexer 3718 passes the qindex value in the encoder mode and the qindex_inv value in the decoder mode. Inverse quantizer block 3730 inverse quantizes the value output by multiplexer 3718 by the value qstep to generate the value qvalue. Block NEG 3732 reverses the sign of the value on the output lead of block 3730, denoted qvalue in FIG. 37. Multiplexer 3734 chooses between the positive and negative versions of qvalue as determined by the signal output from multiplexer 3716.

In the encoder mode, if the difference signal is asserted, then output leads 3712 qindex carry the quantized magnitude of the difference between the new and old data values and the output leads 3736 of multiplexer 3734 carry the inverse quantization of this quantized magnitude of the difference between the new and old values. In the encoder mode, if the difference input is deasserted, then the output leads 3712 qindex carry only the quantized magnitude of the new data value and the value on leads 3736 is the inverse quantization of the quantized magnitude of the new data value.

Adder block 3738 adds the inverse quantized value on leads 3736 to the old[x][y] data value and supplies the result to multiplexer 3740. Accordingly, when the difference signal is asserted, the difference between the old inverse quantized value on leads 3706 and the inverse quantized value produced by inverse quantizer 3730 is determined by adding in block 3738 the opposite of the inverse quantized output of block 3730 to the old inverse quantized value. Multiplexer 3740 passes the output of adder block 3738 back into the OLD portion of memory unit 116 via bus 3102. If, on the other hand, the difference signal is not asserted, then multiplexer 3740 passes the value on leads 3736 to the OLD portion of memory unit 116 via bus 3102. Accordingly, a frame of inverse quantized values of the most recently encoded frame is maintained in the old portion of memory unit 116 during encoding.

In accordance with one embodiment of the present invention, the value of qstep is chosen so that qstep=$2^n$, where $0 \leq n \leq 7$, so that quantizer block 3724 and inverse quantizer 3730 perform only shifts by n bits. Block 3724 then becomes in VHDL, where >> denotes a shift to the left, and where mag denotes the value output by block 3722:

CASE n is
 WHEN 0=>qindex:=mag;
 WHEN 1=>qindex:=mag>>1;
 .
 .
 WHEN 7=>qindex:=mag>>7;
 END CASE;

Similarly, block 3730 is described in VHDL as follows:
 CASE n is
 WHEN 0=>qvalue:=qindex;
 WHEN 1=>qvalue:=(qindex<<1) & "0";
 WHEN 2=>qvalue:=(qindex<<2) & "01";
 WHEN 7=>qvalue:=(qindex<<7) & "0111111";

where << denotes a shift to the right and where & denotes concatenation. The factor concatenated after the shift is $2^{n-1}-1$.

The tree processor/encoder-decoder circuit 124 of FIG. 31 also includes a MODE CONTROL block 3118. In the encoder mode, MODE_CONTROL block 3118 determines mode changes as set forth in U.S. patent application Ser. No. 08/040,301 when trees of data values are traversed to compress the data values into a compressed data stream. In the decoder mode, MODE_CONTROL block 3118 determines mode changes as set forth in U.S. patent application Ser. No. 08/040,301 when trees of data values are recreated from an incoming compressed data stream of tokens and data values.

MODE_CONTROL block 3118 receives signals from DECIDE block 3112, CONTROL_COUNTER block 3124, TP_ADDR_GEN block 3114, and VALUE_REGISTERS block 3130. MODE_CONTROL block 3118 receives the seven flag values from DECIDE block 3112. The input from CONTROL_COUNTER block 3124 is a four-bit state vector 3138 indicating the state of the CONTROL_COUNTER block 3124. Four bits are needed because the CONTROL_COUNTER block 3124 can be in one of nine states. The input from TP_ADDR_GEN block 3114 is the octave signal carried by leads 3322. The VALUE_REGISTERS block 3130 supplies the values on leads 3316, 3318, 3320, 3132, 3134, and 3136 to MODE_CONTROL block 3118. Additionally, in the decoder mode, buffer 3122 supplies token values which are not Huffman decoded onto leads 3202 and to the MODE_CONTROL block 3118 as shown in FIG. 32.

MODE_CONTROL block 3118 outputs a value new_mode which is supplied to TP_ADDR_GEN block 3114 via leads 3402 as well as a token length value T_L which is supplied to buffer block 3122 via leads 3140. In the encoder mode, MODE_CONTROL block 3118 also generates and supplies tokens to buffer block 3122 via leads 3202. Leads 3202 are therefore bidirectional to carry token values from MODE_CONTROL block 3118 to buffer block 3122 in the forward mode, and to carry token values from buffer 3122 to MODE_CONTROL block 3118 in the decoder mode. The token length value T_L, on the other hand, is supplied by MODE_CONTROL block 3118 to buffer block 3122 in both the encoder and decoder modes. MODE_CONTROL block 3118 also generates the difference signal and supplies the difference signal to quantizer block 3116 via lead 3142. MODE_CONTROL block 3118 asserts the difference signal when differences between new and old values are to be quantized and deasserts the difference signal when only new values are to be quantized. Appendix B is a VHDL description of an embodiment of the MODE_CONTROL block 3118 in the VHDL language.

In the encoding process, the MODE_CONTROL block 3118 initially assumes a mode, called pro_mode, from the block immediately below the block presently being encoded in the present tree. For example, the blocks in FIG. 36 corresponding to states zz0, . . . , zz3 in the left-most branch inherit their respective pro_modes from the left-most octave 1 block. Similarly, the left-most octave 1 block in FIG. 36 inherits its pro_mode from the root of the tree in octave 2. After the data values of the new and old blocks are read and after the DECIDE block 3112 has generated the flags for the new block as described above, the state machine of MODE_CONTROL block 3118 determines the new_mode for the new block based on the new data values, the flags, and the pro-mode. The value of new_mode, once determined, is then stored as the current mode of the present block in a mode latch. There is one mode latch for each octave of a tree and one for the low pass data values. The mode latches form a stack pointed to by octave so that the mode latches contain the mode in which each of the blocks of the tree was encoded.

The tree processor circuit of FIGS. 31 and 32 also comprises a Huffman encoder-decoder block 3120. In the encoder mode, inputs to the Huffman encoder-decoder block 3120 are supplied by quantizer block 3116. These inputs comprise the qindex value and the sign signal and are carried by leads 3712 and 3714, respectively. The outputs of Huffman encoder-decoder 3120 comprise the Huffman encoded value on leads 3142 and the Huffman length H_L on leads 3144, both of which are supplied to buffer block 3122.

In the decoder mode, the input to the Huffman encoder-decoder block 3120 is the Huffman encoded value carried by leads 3204 from buffer block 3122. The outputs of the Huffman encoder-decoder 3120 comprise the Huffman length H_L on leads 3144 and the sign_inv and qindex_inv values supplied to quantizer block 3116 via leads 3708 and 3710, respectively.

The Huffman encoder-decoder block 3120 implements the Huffman table shown in Table 2 using combinatorial logic.

TABLE 2

| qindex | Huffman code |
| --- | --- |
| −38 . . . −512 | 1 1 0 0 0 0 0 0 1 1 1 1 1 1 1 1 |
| −22 . . . −37 | 1 1 0 0 0 0 0 0 1 1 1 1 (\|qindex\| −22) |
| −7 . . . −21 | 1 1 0 0 0 0 0 0 (\|qindex\| −7) |
| −6 | 1 1 0 0 0 0 0 1 |
| . | . |
| . | . |
| . | . |
| −2 | 1 1 0 1 |
| −1 | 1 1 1 |
| 0 | 0 |
| 1 | 1 0 1 |
| 2 | 1 0 0 1 |
| . | . |
| . | . |
| . | . |
| 6 | 1 0 0 0 0 0 0 1 |
| 7 . . . 21 | 1 0 0 0 0 0 0 0 (\|qindex\| −7) |
| 22 . . . 37 | 1 0 0 0 0 0 0 0 1 1 1 1 (\|qindex\| −22) |
| 38 . . . 511 | 1 0 0 0 0 0 0 0 1 1 1 1 1 1 1 1 |

In the encoder mode, qindex values are converted into corresponding Huffman codes for incorporation into the cmpressed data stream. Tokens generated by the MODE_CONTROL block 3118, on the other hand, are not encoded but rather are written directly into the cmpressed data stream.

Figure 38:
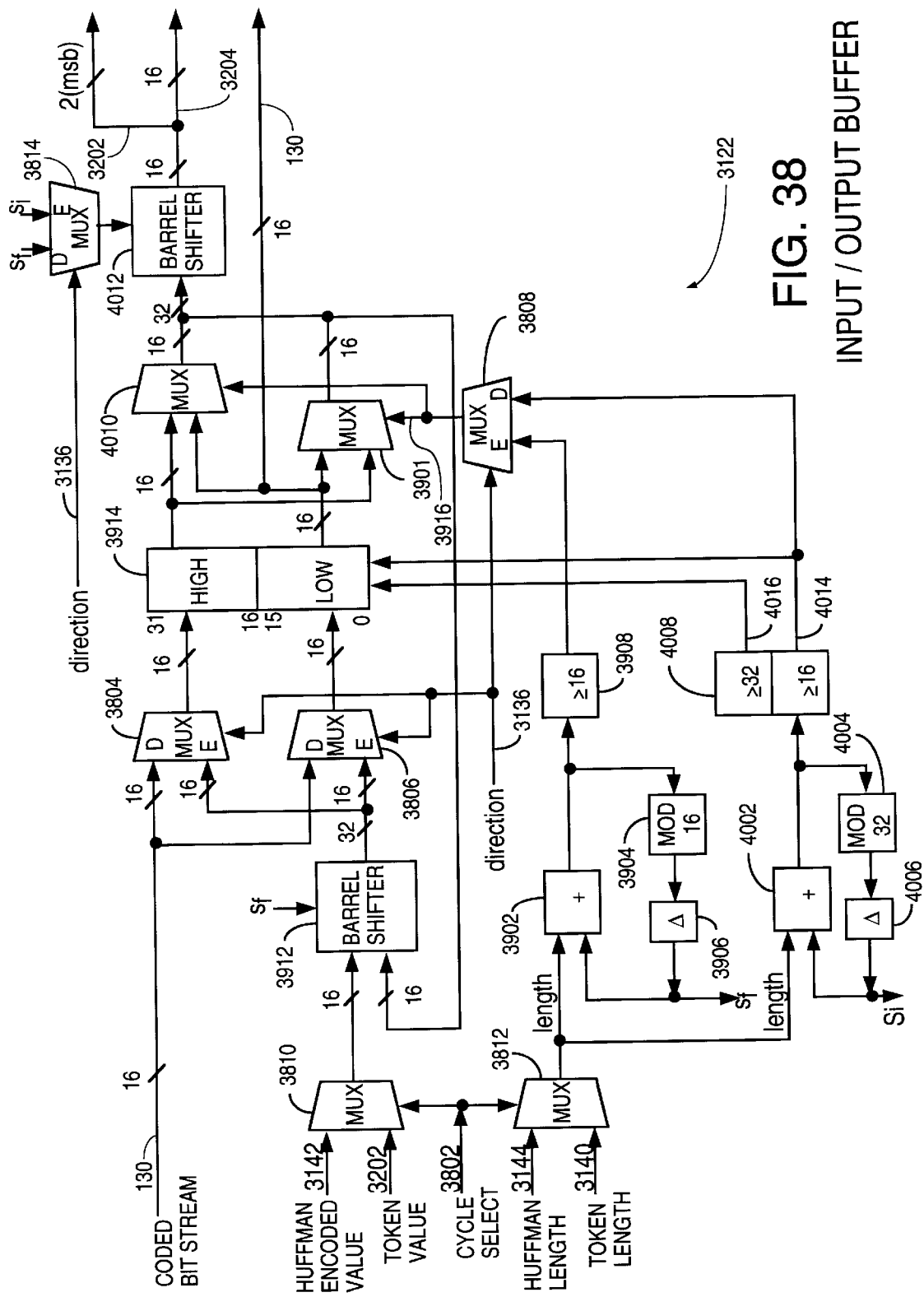
FIG. 38 is a block diagram of the buffer block 3122 of the tree processor/encoder-decoder of FIGS. 31–32.

FIG. 38 illustrates one possible embodiment of buffer block 3122 of FIGS. 31 and 32. The function of buffer block 3122 in the encoder mode is to assemble encoded data values and tokens into a single serial compressed data stream. In the decoder mode, the function of buffer block 3122 is to deassemble a compressed serial data stream into encoded data values and tokens. Complexity is introduced into buffer block 3122 due to the different lengths of different Huffman encoded data values. As illustrated in FIG. 31, buffer 3122 is coupled to FIFO buffer 120 via input-output leads 130, to MODE_CONTROL block 3118 via token value leads 3202 and token length leads 3140, to Huffman encoder-decoder 3120 via leads 3144 and Huffman length leads 3144, to CONTROL_COUNTER 3124 via cycle select leads 3802, and to VALUE_REGISTERS 3130 via leads 3136.

The direction signal carried on leads 3136 from VALUE_REGISTERS block 3130 determines whether the buffer block 3122 operates in the encoder mode or in the decoder mode. In encoder mode, multiplexers 3804, 3806, 3808 and 3814 select the values corresponding to their "E" inputs in FIG. 38. In the encoder mode, the buffer block 3122 processes the Huffman encoded value signal present on leads 3142, the token value signal present on leads 3202, the cycle select signal on leads 3802, the Huffman length signal H_L on leads 3144, and the token length signal T_L on leads 3140. The cycle select signal, supplied by CONTROL_COUNTER block 3124 via leads 3802, is supplied to multiplexers 3810 and 3812 to control whether a Huffman encoded value (received from Huffman encoder-decoder block 3120) or whether a non-encoded token value (received from MODE_CONTROL block 3118) is the value presently being assembled into the output data stream.

Figure 39:
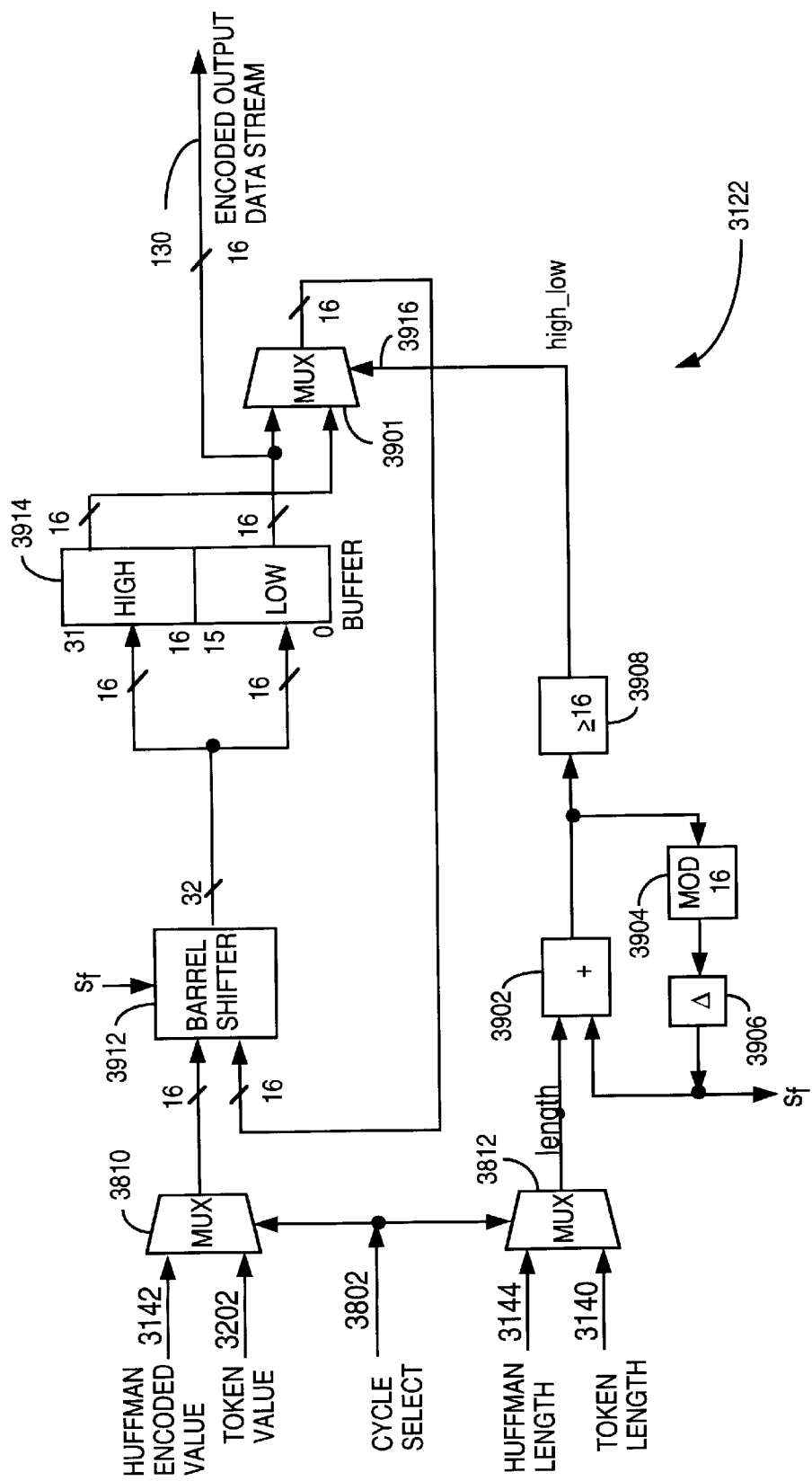
FIG. 39 is a diagram of the buffer block 3122 of FIG. 38 which has been simplified to illustrate buffer block 3122 operation in the encoder mode.

FIG. 39 illustrates a simplified diagram of the buffer block 3122 of FIG. 38 when configured in encoder mode. The value $s_f$ is a running modulo sixteen sum of the input token length values and Huffman value length values. The circuit which determines $s_f$ comprises adder block 3902, modulo sixteen divider block 3904, and delay block 3906. When the incoming length value added to the prior value $s_f$ produces a length result of sixteen or greater, block 3904 subtracts sixteen from this length result to determine the new value of $s_f$. Comparator block 3908 also sends a signal high_low to input lead 3916 of multiplexer 3901 indicating that $s_f$ has exceeded sixteen. FIG. 39 shows a barrel shifter 3912 receiving data input values from the output data leads of multiplexer 3901 and from the output data leads of multiplexer 3810. Barrel shifter 3912 sends a 32-bit output signal to a 32-bit buffer 3914. The lower 16-bit output of 32-bit buffer 3914 constitutes the encoded bit stream output of the video encoder/decoder chip which is output onto input/output leads 130.

When the prior value of $s_f$ plus the incoming value length is sixteen or greater, then the lower sixteen bits of buffer 3914 are sent out to FIFO buffer 120 and multiplexer 3901 is set to pass the upper sixteen bits of buffer 3914 back into the lower sixteen bit positions in barrel shifter 3912. The value $s_f$ is then decremented by sixteen. These passed back bits will next become some of the bits in the lower sixteen bits of buffer 3914, on which a subsequent incoming encoded value or token received from multiplier 3810 will be stacked by the barrel shifter starting at location $s_f$ to make sixteen or more packed bits.

Alternatively, if the value of $s_f$ plus the length of the new incoming value is less than sixteen, then multiplexer 3901 is controlled to pass the lower sixteen bits of buffer 3914 back to barrel shifter 3912 and no bits are applied to FIFO buffer 120. The bits of a subsequent incoming encoded value or taken from multiplexer 3810 will be stacked on top of the bits of prior encoded data values or tokens in barrel shifter 3912. Because the value $s_f$ did not exceed sixteen, $s_f$ is not decremented by sixteen.

Figure 40:
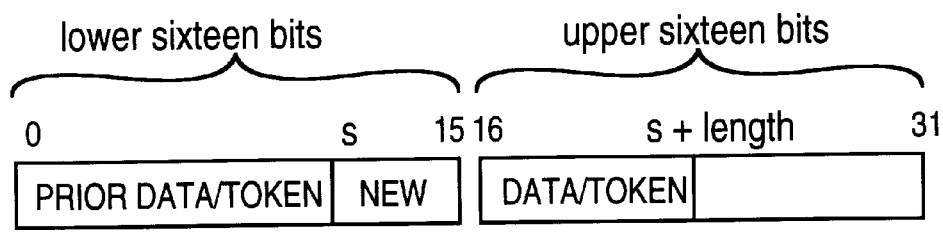
FIG. 40 illustrates the output of barrel shifter 3912 of buffer block 3122 when buffer block 3122 is in the encoder mode as in FIG. 39.

FIG. 40 illustrates a typical output of the barrel shifter 3912 of the buffer 3122 in encoder mode. The maximum length of a Huffman encoded word is sixteen bits. All tokens are two bits in length, where length is the number of bits in the new encoded value or token. The value s in FIG. 40 indicates the bit position in the barrel shifter 3912 immediately following the last encoded data value or token present in the barrel shifter. Accordingly, a new encoded value or token is written into barrel shifter 3912 at positions s . . . s+length. The resulting 32-bit output of the barrel shifter is rewritten to the 32-bit buffer 3914. The comparator block compares the new value of s+length to sixteen. If this value s+length is sixteen or greater as illustrated in FIG. 40, then the control signal high_low on multiplexer input lead 3916 is asserted. The lower sixteen bits of the buffer are therefore already completely packed with either bits of data values and/or with bits of tokens. These lower sixteen bits are therefore output to comprise part of the output data stream. The upper sixteen bits, which are incompletely packed with data values and/or tokens, are sent back to the lower sixteen bit positions in the barrel shifter so that the remaining unpacked bits in the lower sixteen bits can be packed with new data bits or new token bits.

If, on the other hand, this value s+length is fifteen or less, then there remain unpacked bits in the lower sixteen bit positions in barrel shifter 3912. These lower bits in barrel shifter 3912 can therefore not yet be output via buffer 3914 onto lines 130. Only when s+length is sixteen or greater will the contents of barrel shifter 3912 be written to buffer 3914 so that the lower sixteen bits will be output via leads 130.

In the decoder mode, buffer 3122 receives an encoded data stream on leads 130, the token length signal T_L on leads 3140 from MODE_CONTROL block 3118, the Huffman encoded length signal H_L on leads 3144, and the control signal cycle select on lead 3802. Multiplexers 3804, 3806, and 3808 are controlled to select values on their respective "D" inputs. Cycle select signal 3802 selects between the Huffman encoded length H_L and the token length T_L depending on whether a data value or a token is being extracted from the incoming data stream.

Figure 41:
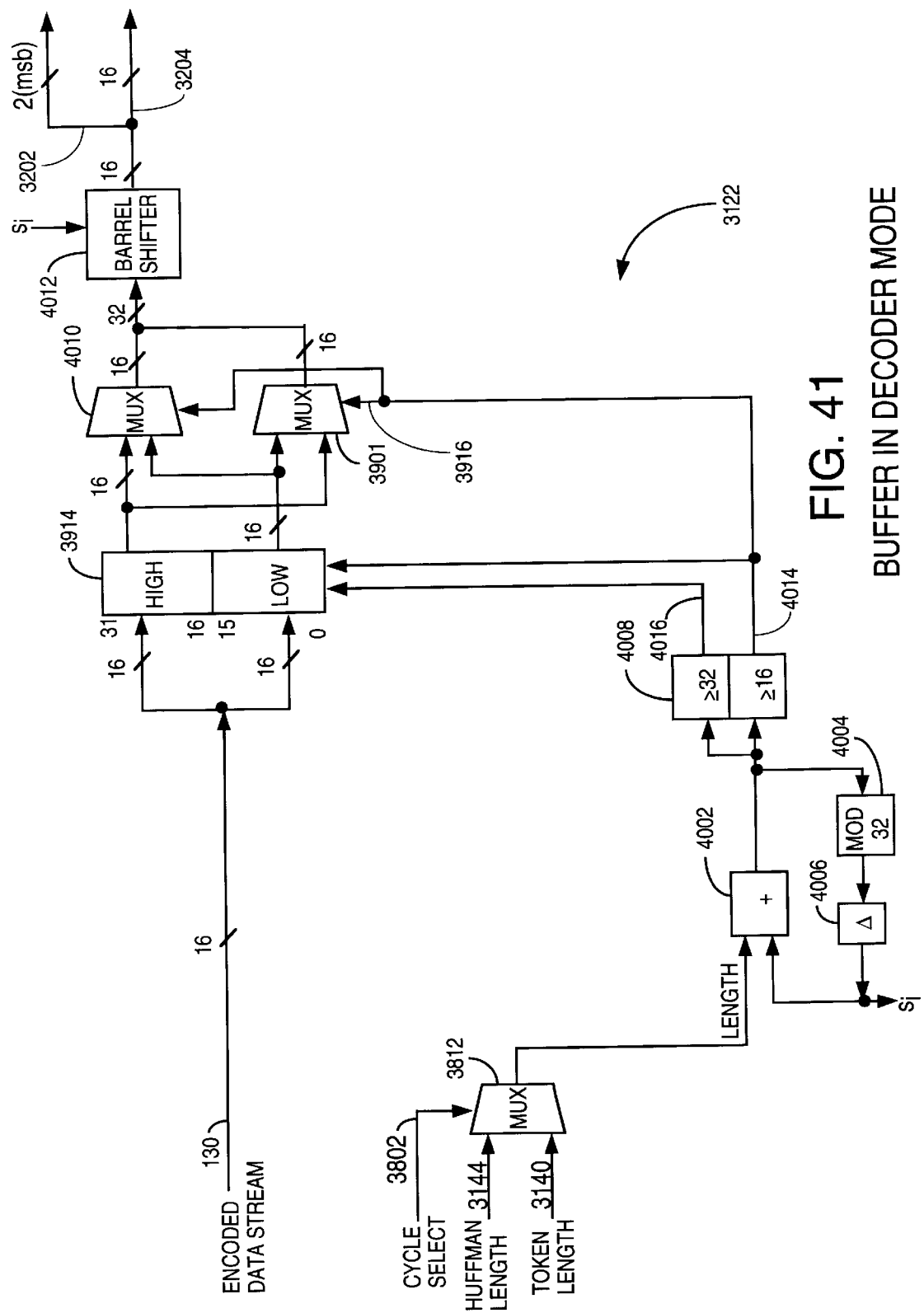
FIG. 41 is a diagram of the buffer block 3122 of FIG. 38 which has been simplified to illustrate buffer block 3122 operation in the decoder mode.

FIG. 41 illustrates a simplified diagram of the buffer block 3122 configured in the decoder mode. The value $s_i$ is a running modulo thirty-two sum of the input token length values and Huffman value length values. The circuit which determines the value of $s_i$ comprises adder block 4002, modulo thirty-two divider block 4004, and delay block 4006. When the incoming length value added to $s_i$ results in a value greater than thirty-two, modulo thirty-two divider block 4004 subtracts thirty-two from this value. A comparator block 4008 sends a signal to buffer 3914 indicating when $s_i$ has reached a value greater than or equal to thirty-two. Additionally, comparator block 4008 sends a signal to both buffer 3914 and to multiplexers 3901 and 4010 indicating when $s_i$ has reached a value greater than or equal to sixteen.

Buffer 3122 in the decoder mode also comprises buffer 3914, multiplexers 3901 and 4010, and barrel shifter 4012. In the case of a Huffman encoded data value being the next value in the incoming data stream, sixteen bits of the encoded data stream that are present in barrel shifter 4012 are passed via output leads 3204 to the Huffman decoder block 3120. The number of bits in the sixteen bits that represent an encoded data value depends on the data value itself in accordance with the Huffman code used. In the case of a token being the next value in the incoming data stream, only the two most significant bits from barrel shifter 4012 are used as the token value which is output onto leads 3202 to MODE_CONTROL block 3118. The remaining fourteen bits are not output during this cycle. After a number of bits of either an encoded data value or a two-bit token is output, the value of $s_i$ is updated to point directly to the first bit of the bits in barrel shifter 4012 which follows the bit last output. The circuit comprising adder block 4002, module block 4004, and delay element 4006 adds the length of the previously output value or token to $s_i$ modulo thirty-two to determine the starting location of the next value or token in barrel shifter 4012. Comparator block 4008 evaluates the value of $s_i$ plus the incoming length value, and transmits an active value on lead 4014 when this value is greater than or equal to sixteen and also transmits an active value on lead 4016 if this value is greater than or equal to thirty-two. When $s_i$ is greater or equal to sixteen, the buffer 3914 will read in a new sixteen bits of encoded bit stream bits into its lower half. When $s_i \geq 32$, the buffer 3914 will read a new sixteen bits into its upper half. The two multiplexers 4010 and 3910 following the buffer 3914 rearrange the order of the low and high halves of the buffer 3914 to maintain at the input leads of barrel shifter 4012 the original order of the encoded data stream.

The tree processor/encoder-decoder circuit 124 of FIGS. 31 and 32 comprises a CONTROL_COUNTER block 3124. CONTROL_COUNTER block 3214 controls overall timing and sequencing of the other blocks of the tree processor/encoder/decoder circuit 124 by outputting the control signals that determine the timing of the operations that these blocks perform. In accordance with one embodiment of the present invention, the tree processor/encoder/decoder 112 is fully pipelined in a nine stage pipeline sequence, each stage occupying one clock cycle. Appendix C illustrates an embodiment of CONTROL_COUNTER block 3124 described in VHDL code.

The signals output by CONTROL_COUNTER block 3124 comprise a read_enable signal on lead 3404, which is active during read cycles, and a write_enable signal on lead 3406, which is active during write cycles. The signals output also comprise memory control signals on leads 3108 and 3110, which control the old and new portions of memory unit 116, respectively, for reading from memory or writing to memory. The signals output also comprise a 4-bit state vector on lead 3138, which supplies MODE_CONTROL block 3118 with the current cycle. The four-bit state vector counts through values 1 through 4 during the "skip" cycle, the value 5 during the "token" cycle, and the values 6–9 during the "data" cycle. The signals output by CONTROL_COUNTER block 3124 also comprise a cycle state value on leads 3802, which signals buffer 3122 when a token cycle or data cycle is taking place.

Figure 42:
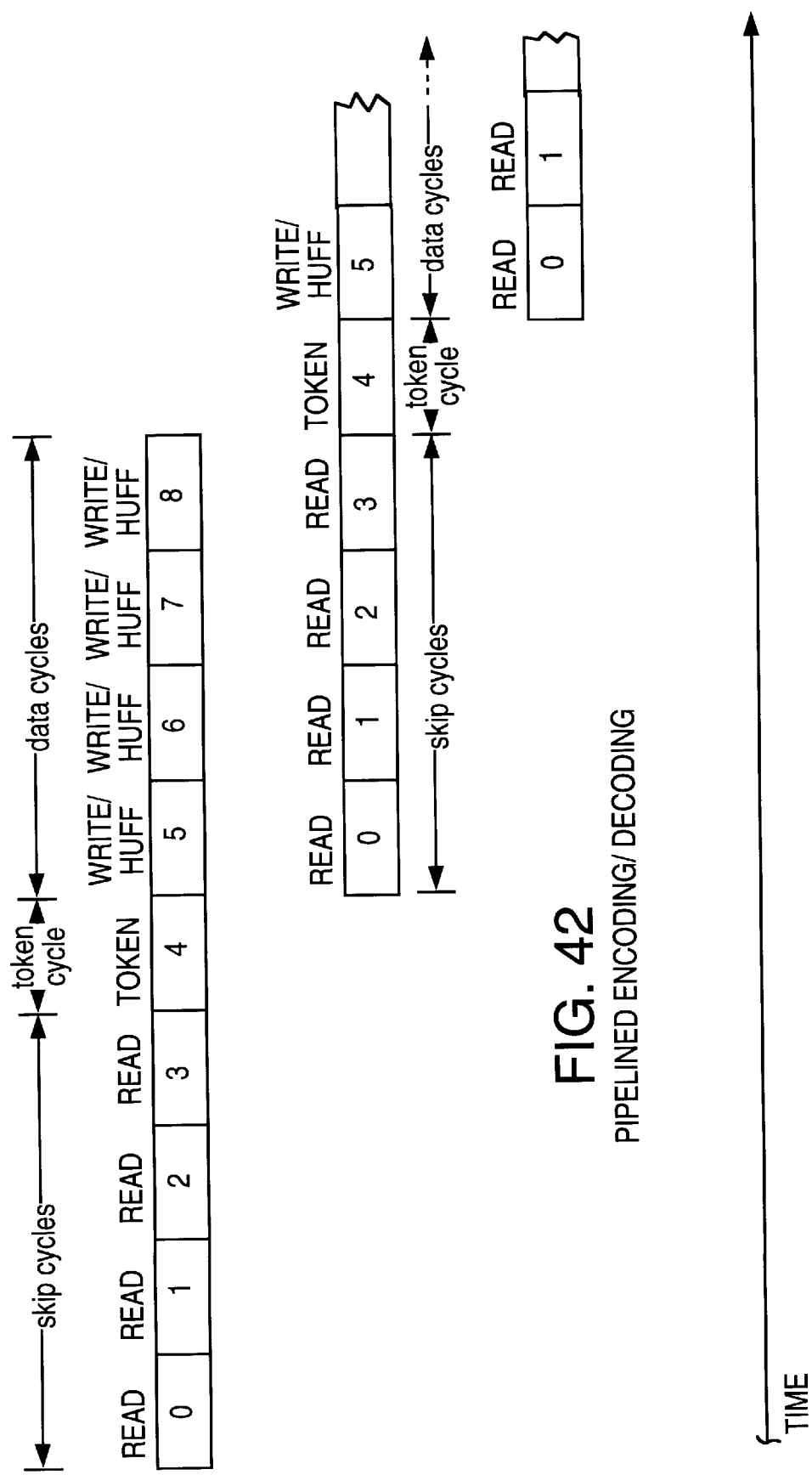
FIG. 42 illustrates a pipelined encoding-decoding scheme used by the tree processor/encoder-decoder 124 of FIGS. 31 and 32.

FIG. 42 illustrates a pipelined encoding/decoding process controlled by CONTROL_COUNTER block 3124. Cycles are divided into three types: data cycles—when Huffman encoded/decoded data is being output/input into the encoded bit stream and when old frame values are being written back to memory; token cycles—when a token is being output/input; and skip cycles—the remaining case when no encoded/decoded data is output to or received from the encoded bit stream. A counter in CONTROL_COUNTER block 3124 counts up to 8 then resets to 0. At each sequence of the count, this counter decodes various control signals depending on the current MODE. The pipeline cycles are:

0) read old[0][0] and in encode new[0][0]; skip cycle.
1) read old[1][0] and in encode new[1][0]; skip cycle.
2) read old[0][1] and in encode new[0][1]; skip cycle.
3) read old[1][1] and in encode new[1][1]; skip cycle.
4) DECIDE blocks outputs flags
   MODE_CONTROL write/read token into/from coded data stream:
   generates new_mode, outputs tokens in encode;
   generates new_mode, inputs tokens in decode;
   token cycle.
5) Huffman encode/decode qindex[0][0], and write old[0][0]; data cycle.
6) Huffman encode/decode qindex[1][0], and write old[1][0]; data cycle.
7) Huffman encode/decode qindex[0][1], and write old[0][1]; data cycle.
8) Huffman encode/decode qindex[1][1], and write old[1][1]; data cycle.

FIG. 42 illustrates that once the new_mode is calculated, another block of data values in the tree can be processed. The tree processor/encoder/decoder is thus fully pipelined, and can process four new transformed data values every five clock cycles. To change the pipeline sequence, it is only required that the control signals in the block CONTROL_COUNTER block 3124 be reprogrammed.

ADDITIONAL EMBODIMENTS

Figure 43:
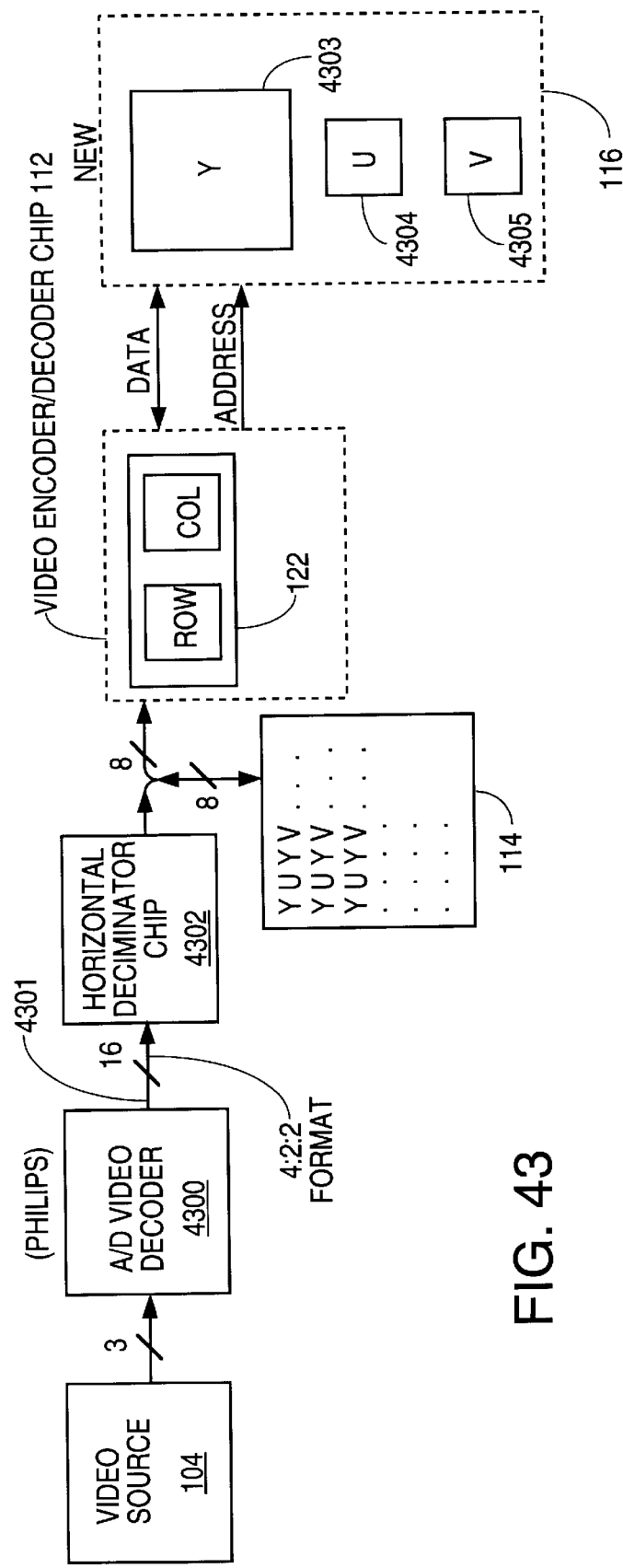
FIG. 43 is a block diagram of another embodiment in accordance with the present invention in which the Y:U:V input is in a 4:2:2 format.

In accordance with the above-described embodiments, digital video in 4:1:1 format is output from A/D video decoder 110 on lines 202 to the discrete wavelet transform circuit 122 of video encoder/decoder circuit 112 row by row in raster-scan form. FIG. 43 illustrates another embodiment in accordance with the present invention. Analog video is supplied from video source 104 to an A/D video decoder circuit 4300. The A/D video decoder circuit 4300, which may, for example, be manufactured by Philips, outputs digital video in 4:2:2 format on lines 4301 to a horizontal decimeter circuit 4302. For each two data values input to the horizontal decimeter circuit 4302, the horizontal decimeter circuit 4302 performs low pass filtering and outputs one data value. The decimated and low pass filtered output of horizontal decimeter circuit 4302 is supplied to a memory unit 114 such that data values are written into and stored in memory unit 114 as illustrated in FIG. 43. The digital video in 4:2:2 format on lines 4301 occurs at a frame rate of 30 frames per second, each frame consisting of two fields. By discarding the odd field, the full 33*3 ms frame period is available for transforming and compressing/decompressing the remaining even field. The even fields are low-pass filtered by the horizontal decimeter circuit 4302 such that the output of horizontal decimeter circuit 4302 occurs at a rate of 30 frames per second, each frame consisting of only one field. Memory unit 114 contains 640×240 total image data values. There are 320×240 Y data values, as well as 160×240 U data values, as well as 160×240 V data values.

In order to perform a forward transform, the Y values from memory unit 114 are read by video encoder/decoder chip 112 as described above and are processed by the row convolver and column convolver of the discrete wavelet transform circuit 122 such that a three octave sub-band decomposition of Y values is written into memory unit 116. The three octave sub-band decomposition for the Y values is illustrated in FIG. 43 as being written into a Y portion 4303 of the new portion of memory unit 116.

After the three octave sub-band decomposition for the Y values has been written into memory unit 116, the video encoder/decoder chip 112 reads the U image data values from memory unit 114 but bypasses the row convolver. Accordingly, individual columns of U values in memory unit 114 are digitally filtered into low and high pass components by the column convolver. The high pass component G is discarded and the low pass component H is written into U portion 4304 of the new portion of memory unit 116 illustrated in FIG. 43. After the U portion 4304 of memory unit 116 has been written with the low pass H component of the U values, video encoder/decoder chip 112 reads these U values from U portion 4304 and processes these U data values using both the row convolver and column convolver of the discrete wavelet transform circuit 122 to perform an additional two octaves of transform to generate a U value sub-band decomposition. The U value sub-band decomposition is stored in U portion 4304 of memory unit 116. Similarly, the V image data values in memory unit 114 are read by video encoder/decoder chip 112 into the column convolver of the discrete wavelet transform circuit 122, the high pass component G being discarded and the low pass component H being written into V portion 4305 of the new portion of memory unit 116. The V data values of V portion 4305 are then read by the video encoder/decoder chip 112 and processed by both the row convolver and the column convolver of discrete wavelet transform circuit 122 to generate a V sub-band decomposition corresponding to the U sub-band decomposition stored in U portion 4304. This process completes a forward three octave discrete wavelet transform comparable to the 4:1:1 three octave discrete wavelet transform described above in connection with FIGS. 3A–3C. Y portion 4303 of memory unit 116 comprises 320×240 data value memory locations; U portion 4304 comprises 160×120 data value memory locations; and V portion 4305 comprises 160×120 data value memory locations.

The DWT address generator 508 illustrated in FIG. 5 generates a sequence of 19-bit addresses on output lines OUT2. In accordance with the presently described embodiment, however, memory unit 114 is a dynamic random access memory (DRAM). This memory unit 114 is loaded from horizontal decimeter circuit 4302 and is either read from and written to by the video encoder/decoder chip 112. For example, in order for the video encoder/decoder chip 112 to access the Y data values in memory unit 114 the inc_R value supplied to DWT address generator 508 by control block 506 is set to 2. This causes the DWT address generator 508 of the video encoder/decoder chip 112 to increment through even addresses as illustrated in FIG. 43 such that only the Y values in memory unit 114 are read. After all the Y values are read from memory unit 114 and are transformed into a Y sub-band decomposition, then base_U_R is changed to 1 and the Channel_start_r is set so that BASE_MUX 3002 of FIG. 30 selects the base_u_R to address the first U data value in memory unit 114. Subsequent U data values are accessed because the inc_R value is set to 4 such that only U data values in memory unit 114 are accessed. Similarly, the V data values are accessed by setting the base_v_R value to 3 and setting the Channel_start_r value such that BASE_MUX 3002 selects the base_v_R input leads. Successive V data values are read from memory unit 114 because the inc_R remains at 3.

Because in accordance with this embodiment the video encoder/decoder chip 112 reads memory unit 114, the DWT address generator 508 supplies both read addresses and write addresses to memory unit 114. The read address bus 3018 and the write address bus 3020 of FIG. 30 are therefore multiplexed together (not shown) to supply the addresses on the OUT2 output lines of the DWT address generator.

To perform the inverse transform on a three octave sub-band decomposition stored in memory unit 116 of FIG. 43, the row and column convolvers of the video encoder/decoder chip 112 require both low and high pass components to perform the inverse transform. When performing the octave 0 inverse transform on the U and V data values of the sub-band decomposition, zeros are inserted when the video encoder/decoder chip 112 is to read high pass transformed data values. In the octave 0 inverse transform, the row convolver is bypassed such that the output of the column convolver is written directly to the appropriate locations in the memory unit 114 for the U and V inverse transform data values. When the Y transform data values in memory unit 116 are to be inverse transformed, on the other hand, both the column convolver and the row convolver of the video encoder/decoder chip 112 are used on each of the three octaves of the inverse transform. The resulting inverse transformed Y data values are written into memory unit 114 in the appropriate locations as indicated in FIG. 43.

Figure 44:
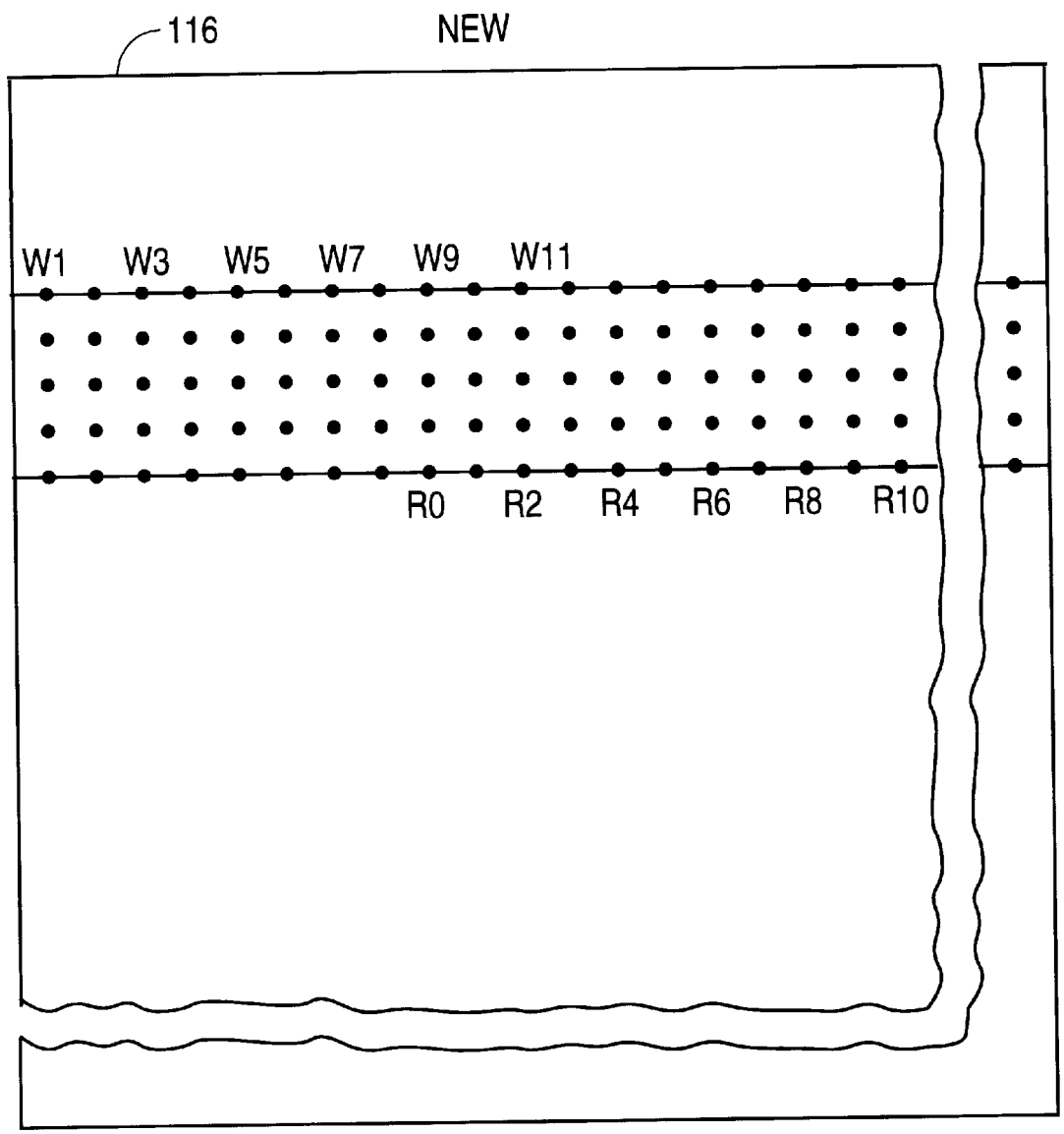
FIG. 44 illustrates a sequence in which luminance data values are read from and written to the new portion of memory unit 116 of the PC board 100 in a first embodiment in accordance with the invention in which memory unit 116 is realized as a static random access memory (SRAM).

FIG. 44 illustrates a sequence of reading and writing Y data values from the Y portion of the new portion of memory unit 116 in accordance with the embodiment of the present invention illustrated in FIG. 1 where memory unit 116 is a static random access memory (SRAM). The dots in FIG. 44 represent individual memory locations in a two-dimensional matrix of memory locations adequately wide and deep to store an entire sub-band decomposition of the Y values in a single two-dimensional matrix. The discrete wavelet transform chip 122 reads the memory location indicated R0 during a first time period, outputs a transformed data value during a second time period to the memory location indicated W1, reads another data value from the memory location denoted R2, writes a transformed data value to the memory location denoted W3 and so forth. If memory unit 116 is realized as a dynamic random access memory (DRAM), addressing memory unit 116 in this manner results in a different row of the memory unit being accessed each successive time period. When successive accesses are made to different rows of standard dynamic random access memory, a row address select (RAS) cycle must be performed each time the row address changes. On the other hand, if successive accesses are performed on memory locations that fall in the same row, then only column address select (CAS) cycles need to be performed. Performing a CAS cycle is significantly faster in a standard dynamic random access memory than a RAS cycle. Accordingly, when memory unit 114 is realized as a dynamic random access memory and when memory unit 116 is read and written in the fashion illustrated in FIG. 44, memory accesses are slow.

Figure 45:
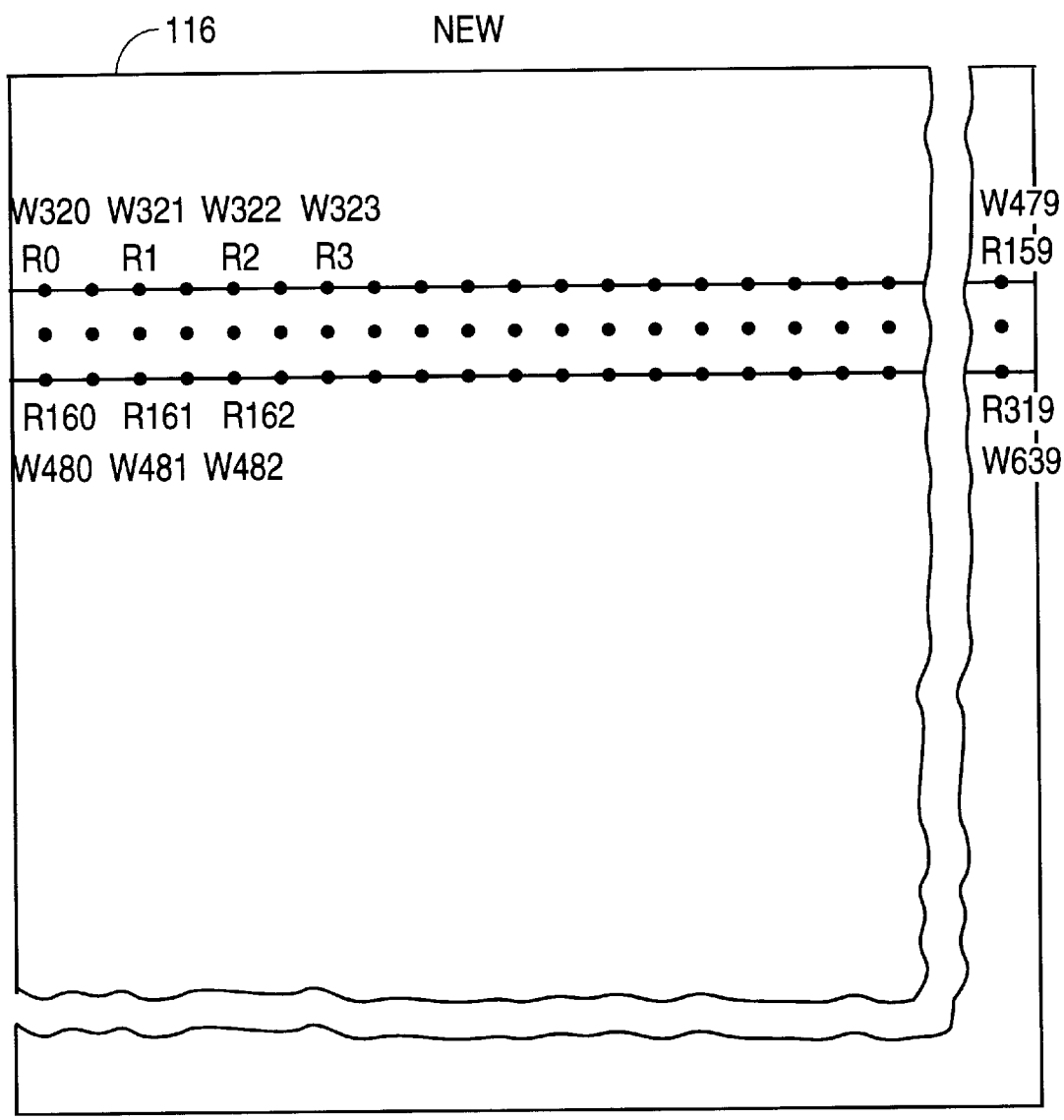
FIG. 45 illustrates a sequence in which luminance data values are read from and written to the new portion of memory unit 116 of the PC board 100 in a second embodiment in accordance with the present invention in which memory unit 116 is realized as a dynamic random access memory (DRAM).

FIG. 45 illustrates a sequence of reading and writing memory unit 116 in accordance with another embodiment of the present invention wherein memory unit 116 is realized as a dynamic random access memory. Again, the dots denote individual memory locations and the matrix of memory locations is assumed to be wide enough and deep enough to accommodate the Y portion of the sub-band decomposition in a single two-dimensional matrix. In the first time period, the memory location designated R0 is read. In the next time period, the memory location R1 is read, then R2 is read in a subsequent time period, then R3 is read in a subsequent period, and so forth. In this way one row of low pass component HH values is read into the video encoder/decoder chip 112 using only one RAS cycle and multiple CAS cycles. Then, a second row of low pass component HH data values is read as designated in FIG. 45 by numerals R160, R161, R162 and so forth. The last low pass component data value to be read in the second row is designated R319. This row is also read into the video encoder/decoder chip 112 using only one RAS cycle and multiple CAS cycles. FIG. 15 illustrates that after reading the data values that the resulting octave 1 transformed data values determined by the discrete wavelet transform chip 122 are now present in the line delays designated 1334 and 1340 illustrated in FIG. 13. At this point in this embodiment of the present invention, the row convolver and the column convolver of the discrete wavelet transform chip 122 are stopped by freezing all the control signals except that line delays 1334 and 1340 are read in sequential fashion and written to the Y portion of the new portion of memory unit 116 as illustrated in FIG. 45. In this fashion, two rows of memory locations which were previously read in time periods 0 through 319 are now overwritten with the resulting octave 1 transformed values in periods 320 through 639. Only one RAS cycle is required to write the transformed data values in time periods 320 through 479. Similarly, only one RAS cycle is required to write transformed data values during time periods 480 through 639. This results in significantly faster accessing of memory unit 116. Because dynamic random access memory can be used to realize memory unit 116 rather than static random access memory, system cost is reduced considerably.

In accordance with this embodiment of the present invention, the output of the output OUT2 of the column convolver of the video encoder/decoder circuit 112 is coupled to the output leads of block 1332 as illustrated in FIG. 13. However, in the forward or inverse transform of any other octave, the output leads OUT2 are coupled to the line delay 1340. Accordingly, in an embodiment in accordance with the memory accessing scheme illustrated in FIG. 45, a multiplexer (not shown) is provided to couple either the output of line delay 1340 or the output of adder block 1332 to the output leads OUT2 of the column wavelet transform circuit 704 of FIG. 13.

Figure 46:
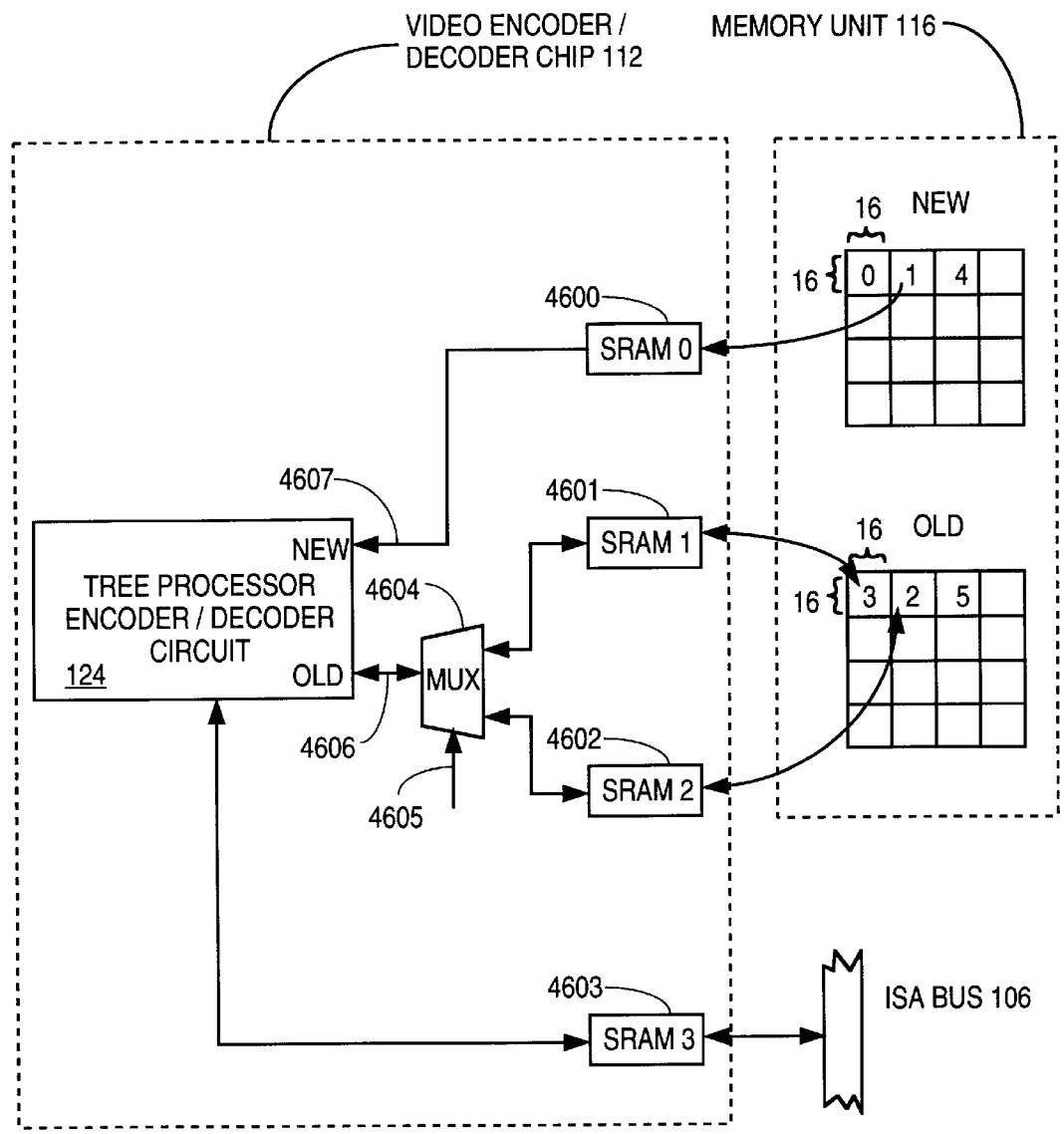
FIG. 46 illustrates a third embodiment in accordance with the present invention in which memory unit 116 of the PC board 100 is realized as a dynamic random access memory and in which a series of static random access memories are used as cache buffers between tree processor/encoder-decoder 124 and memory unit 116.

FIG. 46 illustrates another embodiment in accordance with the present invention. Memory unit 116 contains a new portion and an old portion. Each of the new and old portions contains a sub-band decomposition. Due to the spatial locality of the wavelet sub-band decomposition, each two-by-two block of low pass component data values has a high pass component consisting of three trees of high frequency two-by-two blocks of data values. For example, in a three octave sub-band decomposition, each two-by-two block of low pass component data values and its associated three trees of high pass component data values forms a 16-by-16 area of memory which is illustrated in FIG. 46.

In order for memory unit 116 to be realized in dynamic random access memory (DRAM), the static random access memories (SRAMs) 4600, 4601, 4602 and 4603 which are used as line delays in the discrete wavelet transform circuit 122 are used as cache memory to hold one 16-by-16 block in the new portion of memory unit 116 as well as one 16-by-16 block in the old portion of memory unit 116. This allows each 16-by-16 block of dynamic random access memory realizing the new and old portions of memory unit 116 to be accessed using at most sixteen RAS cycles. This allows the video encoder/decoder chip 112 to use dynamic random access memory for memory unit 116 rather than static random access memory, thereby reducing system cost.

Figure 47:
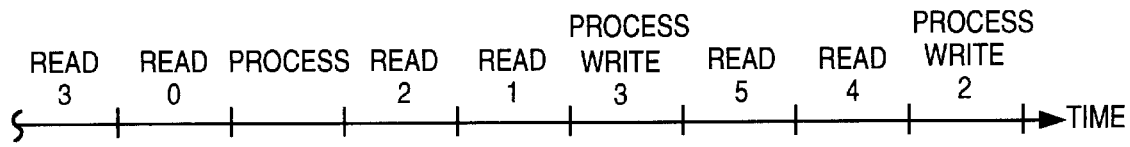
FIG. 47 illustrates a time line of the sequence of operations of the circuit illustrated in FIG. 46.

FIG. 47 illustrates a time line of a sequence of operations performed by the circuit illustrated in FIG. 46. In a first time period, old 16-by-16 block 3 is read into SRAM 1 4601. Because there is only one set of data pins on video encoder/decoder chip 112 for accessing memory unit 116, the 16-by-16 block 0 of the new portion of memory unit 116 is read into SRAM 0 4600 in the second time period. Bidirectional multiplexer 4604 is controlled by select inputs 4605 to couple the 16-by-16 block of old data values now present in SRAM 1 4601 to the bidirectional input port old 4606 of the tree processor/encoder/decoder circuit 124. Similarly, the 16-by-16 new data values present in SRAM 0 4600 are coupled to the input port new 4607 of the tree processor/encoder/decoder circuit 124. Accordingly, the tree processor/encoder/decoder circuit 124 performs tree processing and encoding in a third time period. During the same third time period, the inverse quantized old 16-by-16 block is rewritten into SRAM 1 4601 through multiplexer 4604. In a fourth time period, old 16-by-16 block 2 is read into SRAM 2 4602. Subsequently, in the fifth time period a 16-by-16 block of new data values is read from memory unit 116 into SRAM 0 4600. The new and old 16-by-16 blocks are again provided to the tree processor/encoder/decoder for processing, the inverse quantized 16-by-16 old block being written into SRAM 2 4602. During the period of time when the tree processor/encoder/decoder circuit 124 is performing tree processing and encoding, the inverse quantized 16-by-16 block in SRAM 1 4601 is written back to 16-by-16 block 3 of the old portion of memory unit 116. Subsequently, in the seventh time period, 16-by-16 block 5 of the old portion of memory unit 116 is read into SRAM 1 4601 and in the eighth time period the 16-by-16 block of new data values 4 in memory unit 116 is read into SRAM 0 4600. In the ninth time period, tree processor/encoder/decoder circuit 124 processes the 16-by-16 new and old blocks 4 and 5 while the 16-by-16 block of inverse quantized data values in SRAM 2 4602 is written to 16-by-16 block 2 in the old portion of memory unit 116. This pipelining technique allows the dynamic random access memory (DRAM) to be accessed during each time period by taking advantage of the time period when the tree processor/encoder/decoder circuit 124 is processing and not reading from memory unit 116. Because all accesses of memory unit 116 are directed to 16-by-16 blocks of memory locations, the number of CAS cycles is maximized. Arrows are provided in FIG. 46 between memory unit 116 and video encoder/decoder circuit 112 to illustrate the accessing of various 16-by-16 blocks of the new and old sub-band decompositions during different time periods. However, because video encoder/decoder chip 112 only has one set of data leads through which data values can be read from and written to memory unit 116, the input/output ports on the right sides of dual port static random access memories 4600–4602 are bussed together and coupled to the input/output data pins of the video encoder/decoder chip 112.

In order to avoid the necessity of providing an additional memory to realize first-in-first-out (FIFO) memory 120, SRAM 3 4603, which is used as a line delay in the column convolver of the video encoder/decoder chip 112, is coupled to the tree processor/encoder/decoder circuit 124 to buffer the compressed data stream for encoding and decoding operations between the ISA bus 106 and the video encoder/decoder chip 112. This sharing of SRAM 3 is possible because the discrete wavelet transform circuit 122 operates in a first time period and the tree processor/encoder-decoder circuit 124 operates in a second time period.

When the tree processor/encoder/decoder circuit 124 is performing the decoding function, the new portion of memory unit 116 is not required and SRAM 0 is unused. The read 0, read 1, and read 4 time periods of the time line illustrated in FIG. 47 are therefore omitted during decoding.

Although the present invention has been described by way of the above described specific embodiments, the invention is not limited thereto. Adaptations, modifications, rearrangements and combinations of various features of the specific embodiments may be practiced without departing from the scope of the invention. For example, an integrated circuit chip may be realized which performs compression but not decompression and another integrated circuit chip may be realized which performs decompression but not compression. Any level of integration may be practiced including placing memory units on the same chip with a discrete wavelet transform circuit and a tree processor/encoder-decoder circuit. The invention may be incorporated into consumer items including personal computers, video cassette recorders (VCRs), video cameras, televisions, compact disc (CD) players and/or recorders, and digital tape equipment. The invention may process still image data, video data and/or audio data. Filters other than four coefficient quasi-Daubechies forward transform filters and corresponding four coefficient reconstruction (inverse transform) filters may be used including filters disclosed in U.S. patent application Ser. Nos. 08/040,301 and 08/100,747. Various start and end forward transform filters and various corresponding start and end reconstruction (inverse transform) filters may also be used including filters disclosed in U.S. patent application Ser. Nos. 08/040,301 and 08/100,747. Tokens may be encoded or unencoded. Other types of tokens for encoding other information including motion in consecutive video frames may be used. Other types of encoding other than Huffman encoding may be used and different quantization schemes may be employed. The above description of the preferred embodiments is therefore presented merely for illustrative instructional purposes and is not intended to limit the scope of the invention as set forth in the appended claims.

```
APPENDIX A: VHDL Language Implementation of CONTROL_ENABLE Block 3420
---------------------------------------------------------------------
--The state machine to control the address counters#
--works for 3 octave decomposition in y & 2 in u|v# use work.DWT_TYPES.all;
use work.dff_package.all;

entity U_CONTROL_ENABLE is port(
ck : in bit ;
reset : in t_reset ;
new_channel,channel : in t_channel ;
c_blk : in BIT_VECTOR(1 to 3) ;
subband : in BIT_VECTOR(1 to 2) ;
load_channel : in      t_load ;
new_mode : in t_mode ;

out_1 : out BIT_VECTOR(1 to 3);
out_2 : out t_octave;
out_3 : out bit;
out_4 : out bit;
out_5 : out t_state) ;

end U_CONTROL_ENABLE;

architecture behave OF U_CONTROL_ENABLE IS
signal              state:t_state;
signal              new_state_sig:t_state;
BEGIN state_machine:PROCESS(reset,new_channel,channel,c_blk,subband,load_channel,new_mode,state,new_state_sig)

VARIABLE en_blk:BIT_VECTOR(1 to 3) := B"000";
--enable blk_count#
variable        lpf_block_done:bit := '0';
--enable x_count for LPF#
```

--1--

```
variable          tree_done:bit := '0';
--enable x_count for other subbands#
variable          reset_state:t_state;
variable          new_state:t_state ;
--current octave# octave:t_octave := 0;
variable          start_state:t_state;
-- dummy signals for DF1

BEGIN
-- default initial conditions
    en_blk:=b"000";
    lpf_block_done:= '0';
    tree_done:= '0';
    octave:= 0;
    reset_state:=up0;
    new_state:=state;
    start_state:=up0;
--set up initial state thro mux on reset, on HH stay in zz0 state#
CASE channel IS
    WHEN  u|v  =>  start_state:= down1;
    WHEN   y   =>  start_state:= up0;
END CASE;
CASE reset IS
    WHEN rst    => reset_state:= start_state;
    WHEN OTHERS => reset_state := state;
END CASE;

CASE reset_state IS
    WHEN  up0  =>  octave :=2;
                   en_blk(3):= '1';
                   CASE c_blk(3) IS
                       WHEN '1' =>
                                    CASE subband IS
                                        WHEN B"00" => lpf_block_done := '1';
                                        WHEN OTHERS => new_state := up1;
                                    END CASE;
--clock x_count for LPF y channel#         WHEN
                   END CASE;
--change state when count done#
```

—2—

```
--in luminance & done with that tree#
                        CASE new_mode                    IS
                            WHEN    stop        =>  tree_done := '1';
                            WHEN    OTHERS      =>  null;
                        END CASE;
        WHEN    upl     =>
                        WHEN    OTHERS      =>  null;
                    END CASE;
                    octave :=1;
                    en_blk(2):= '1';
                    CASE c_blk(2)   IS
                        WHEN    '1'         =>  new_state := zz0;

--in luminance, terminate branch & move to next branch#
                        CASE new_mode                    IS
                            WHEN    stop        =>  new_state := down1;
                            en_blk(3):= '1';
                            WHEN    OTHERS      =>  null;
                        END CASE;
        WHEN    zz0     =>
                    WHEN    OTHERS      =>  null;
                    END CASE;
                    octave :=0;
                    en_blk(1):= '1';
                    CASE c_blk(1)   IS
                        WHEN    '1'         =>  new_state := zz1;
                            en_blk(2):= '1';
                            WHEN    OTHERS      =>  null;
                    END CASE;
        WHEN    zz1     =>
                    octave :=0;
                    en_blk(1):= '1';
                    CASE c_blk(1)   IS
                        WHEN    '1'         =>  new_state := zz2;
                            en_blk(2):= '1';
                            WHEN    OTHERS      =>  null;
                    END CASE;
        WHEN    zz2     =>
                    octave :=0;
                    en_blk(1):= '1';
                    CASE c_blk(1)   IS
                        WHEN    '1'         =>  new_state := zz3;
                            en_blk(2):= '1';
```

```
                    WHEN        OTHERS    => null;
                    END CASE;
WHEN    zz3     =>  octave :=0;
                    en_blk(1):= '1';
--now decide the next state, on block{1} carry check the other block carries#
    --nowdecide the next state, on block{1} carry check the other block carries
                    CASE c_blk(1)    IS
                        WHEN    '1'      =>  new_state := down1;
                                             en_blk(2):= '1';
--roll over to 0#                            en_blk(3):= '1';
--because state zz3 clock 1 pulse#
                    WHEN        OTHERS    => null;
                    END CASE;

WHEN    down1   =>  octave :=1;
                    en_blk(2):= '1';
                    CASE c_blk(2)    IS
                        WHEN    '1'      =>  CASE subband    IS
--clock x_count for LPF u|v channel#        B"00"           =>  lpf_block_done := '1' ;
                                             WHEN OTHERS => new_state := zz0 ;
--change state when count done#              END CASE;
                                         CASE new_mode IS
                                             WHEN stop => CASE channel IS
--stop so finish thisbranch & move on#                       WHEN u|v      => tree_done := '1';
                                                             WHEN y        => en_blk(3) := '1';
                                                                              CASE c_blk(3)   IS
--move to next tree#                                                              WHEN '1'     => tree_done := '1';
                                                                                  WHEN OTHERS  => new_state := down1;
                                                                              END CASE;
                                                             WHEN OTHERS   => null;
```

—4—

```
                              END CASE;
                    WHEN      OTHERS  =>  null;
                    END CASE;
          WHEN      OTHERS  =>  null;
          END CASE;

END CASE;

CASE channel IS
WHEN u|v    =>     IF c_blk(1)='1' AND c_blk(2)= '1'  THEN tree_done := '1';
                   ELSE null;
                   END IF;

WHEN y      =>     IF c_blk(1)='1' AND c_blk(2)='1' AND c_blk(3) = '1' THEN
                         tree_done := '1';
                   ELSE null;
                   END IF;
END CASE;

--now change to start state if the sequence has finished#
CASE  tree_done   IS
--in LPF state doesnt change when block done#
WHEN  '1'         =>  new_state := start_state;
WHEN  OTHERS      =>  null;
END CASE;
--on channel change, use starting state for new channel#
CASE   load_channel      IS
--in LPF state doesnt change when block done#
WHEN write  =>    CASE new_channel IS
                  WHEN y  => new_state:= up0;
                  WHEN u|v => new_state:=down1;
                  END CASE;
WHEN       OTHERS   =>  null;
END CASE;

new_state_sig<=new_state;

out_1 <= en_blk;
out_2 <= octave;
```

```
out_3 <= tree_done;
out_4 <= lpf_block_done;
out_5 <=reset_state;

END PROCESS;

DF1(ck,new_state_sig,state);
END behave;

CONFIGURATION CONTROL_ENABLE_CON OF U_CONTROL_ENABLE is
FOR behave
END FOR;
END CONTROL_ENABLE_CON;
```

APPENDIX B: VHDL Language Implementation of MODE_CONTROL Block 3118

--generates the new mode from the old, and outputs control signals to the tokeniser-- use work.DWT_TYPES.all;
use work.dff_package.all;

entity U_MODE_CONTROL IS
PORT(
    ck : in bit ;
    reset : in t_reset ;
    intra_inter : in t_intra ;
    lpf_done : in bit ;
    flags : in BIT_VECTOR(1 to 7);
    token_in : in BIT_VECTOR(1 to 2) ;
    octave : in t_octave ;
    state : in t_state ;
    direction : in t_direction ;
    load_mode_in : in t_load ;
    cycle: in t_cycle ;

out_1:out t_mode;
    out_2:out t_mode;
    out_3:out BIT_VECTOR(1 to 2) ;
    out_4:out t_diff;
    out_5:out BIT_VECTOR(1 to 2) ;
    out_6:out t_mode);

end U_MODE_CONTROL;

architecture behave OF U_MODE_CONTROL IS

--new_mode,proposed_mode,current_token,difference,token_length, --

```
signal nzflag:bit;
signal origin:bit;
signal noflag:bit;
signal ozflag:bit;
signal motion:bit;
signal pro_new_z:bit;
signal pro_no_z:bit;
signal lpf_done_del:bit;
signal load_mode:t_load_vec(1 to 4);
signal load_next:t_load;
signal pre_mode_sig:t_mode;
signal pro_mode_sig:t_mode;
signal new_mode_sig:t_mode;
signal mode:t_mode;
signal diff_sig:t_diff;
signal diff_out:t_diff;
signal mode_regs:t_mode_vec(1 to 4);
BEGIN nzflag  <= flags(1);
    origin  <= flags(2);
    noflag  <= flags(3);
    ozflag  <= flags(4);
    motion  <= flags(5);
    pro_new_z <= flags(6);
    pro_no_z  <= flags(7);

DF1(ck,lpf_done,lpf_done_del);             --synchronise mode change at end of LPF--

--the proposed value for the mode at that octave, flags etc will change this value as necessary--
--proposed, or inherited mode from previous tree--

MODE_CONTROL:PROCESS( nzflag,origin,noflag,ozflag,motion,pro_new_z,pro_no_z,lpf_done_del,token_in,direction,
                      mode_regs ,state,reset,intra_inter,octave)

variable        pro_mode  :t_mode;
    variable        new_mode  :t_mode;
    variable        token_out :bit_vector(1 to 2);
    variable        difference :t_diff;
```

```
variable         token_length :bit_vector(1 to 2);
variable         pro_flag :bit;

BEGIN
--initialise variables

CASE reset  IS
    WHEN  rst   =>     CASE intra_inter  IS
    --reset on frame start, so do lpf--
                      WHEN intra => pro_mode:= lpf_still;
                      WHEN OTHERS  =>    pro_mode:=lpf_send;
                      END CASE;
    WHEN   OTHERS  =>     CASE lpf_done_del  IS
                      WHEN '1'   =>   CASE intra_inter   IS
--store default mode in mode(4)--
                                          WHEN  intra =>  pro_mode:=still;
                                          WHEN  OTHERS  =>  pro_mode:= send;
                                          END CASE;
                      WHEN  OTHERS  =>     CASE state  IS
--jump sideways in oct 1--
                                          WHEN down1 => pro_mode:= mode_regs(3);
                                          WHEN up0  =>  pro_mode:= mode_regs(4);
                                          WHEN OTHERS  =>   CASE octave  IS
                                                            WHEN 0 =>pro_mode:= mode_regs(1);
                                                            WHEN 1 =>pro_mode:= mode_regs(2);
                                                            WHEN 2 =>pro_mode:= mode_regs(3);
                                                            WHEN 3 =>pro_mode:= mode_regs(4);
                                                            END CASE;
                                          END CASE;
                      END CASE;

END CASE;

new_mode := pro_mode;                --inherit the previous mode--
    token_out := B"00";
    difference := nodiff;
    token_length := B"00";
    pro_flag := '0';
```

```
CASE direction IS
WHEN forward =>

CASE pro_mode IS

WHEN lpf_stop|stop => null;
            WHEN void    =>    CASE ozflag IS
                                WHEN   '1' =>   new_mode := stop;
                                WHEN   OTHERS => null;
                               END CASE;

WHEN void_still => null;
--intra so must zero out all of tree--

WHEN still_send    =>   token_length := B"01";
                                    IF nzflag='1' OR pro_new_z ='1' THEN token_out := B"00";
                                        CASE ozflag IS
                                         WHEN  '1' =>    new_mode := stop;
                                         WHEN  OTHERS => new_mode := void;
                                        END CASE;
                                    ELSE token_out := B"10";
                                         new_mode:= still_send;
                                    END IF;

WHEN send   =>    CASE ozflag IS
                               WHEN   '1'   =>   token_length := B"01";

IF nzflag = '1' OR pro_new_z='1' THEN token_out := B"00";
                                                                                       new_mode:= stop;
                                                 ELSE            token_out := B"10";
                                                                 new_mode:= still_send;
                                                 END IF;

WHEN   OTHERS =>   token_length := B"10";

IF(NOT(noflag) ='1' OR motion = '1') AND NOT(nzflag) ='1'
                                                 THEN
                                                      CASE origin IS
                                                       WHEN    '1'=>   pro_flag := pro_new_z;
```

```
                              WHEN OTHERS => pro_flag := pro_no_z;
                                             difference:= diff;
                              END CASE;

CASE pro_flag IS
                              WHEN '1' =>  token_out := B"10";
                                           new_mode:= void;
                              WHEN OTHERS => CASE origin IS
                                             WHEN '1' =>  token_out := B"01";
                                                          new_mode:= still_send;
                                             WHEN OTHERS => token_out := B"11";
                                                            new_mode:= send;
                                             END CASE;

END CASE;

IF (motion ='1' OR origin ='1')AND nzflag ='1'
                              THEN
                                       token_out := B"10";
                                       new_mode:= void;
                              ELSE     token_out := B"00";
                                       new_mode:= stop;
                              END IF;

END IF;

END CASE;

ELSE
              token_length := B"01";
              IF nzflag ='1' OR pro_new_z = '1'
              THEN token_out := B"00";
                   new_mode:= void_still;
              ELSE token_out := B"10";
                   new_mode:= still;
              END IF;

WHEN still    =>

WHEN lpf_still  =>   token_out := B"00";
```

--zero out tree--

```
                    WHEN  lpf_send  =>  difference := diff;
                                        token_length:= B"01";

IF noflag ='1' OR pro_no_z = '1'
                                      THEN  token_out := B"00";
                                            new_mode:= lpf_stop;
                                      ELSE  token_out := B"10";
                                            new_mode:= lpf_send;
                                      END IF;
--as mode stop but for this block only--
                    END CASE;

WHEN inverse =>

CASE  pro_mode IS
            WHEN lpf_stop|stop => null;

WHEN  void  =>   CASE ozflag IS
                                  WHEN  '1'    =>  new_mode := stop;
                                  WHEN  OTHERS =>  null;
                                  END CASE;

WHEN void_still  => null;

WHEN  send  =>   CASE ozflag IS
                                  WHEN  '1'  =>  token_length := B"01";
--repeat of still-send code--
                                              CASE token_in(1) IS
                                              WHEN  '1' => new_mode := still_send;
                                              WHEN  '0' => new_mode := stop;
                                              END CASE;

WHEN  OTHERS =>  token_length := B"10";
                                              CASE token_in IS
                                              WHEN  B"11"  =>  difference := diff;
                                                               new_mode:= send;
                                              WHEN  B"01"  =>  new_mode := still_send;
                                              WHEN  B"10"  =>  new_mode := void;
```

```
          WHEN      still_send    =>     token_length := B"01";
                                         CASE token_in(1)    IS
                                            WHEN  '1'        =>
                                            WHEN  '0'        =>     new_mode := still_send;
                                                                    CASE ozflag   IS
                                                                       WHEN  '1'  =>  new_mode := stop;
                                                                       WHEN  OTHERS  =>  new_mode := void;
                                                                    END CASE;
                                         END CASE;

WHEN      still         =>     token_length := B"01";
                                         CASE token_in(1)    IS
                                            WHEN  '1'        =>     new_mode := still;
                                            WHEN  '0'        =>     new_mode := void_still;
                                         END CASE;

WHEN      lpf_send      =>     difference := diff;
                                         token_length:= B"01";
                                         CASE token_in(1)    IS
                                            WHEN  '0'        =>     new_mode := lpf_stop;
                                            WHEN  '1'        =>     new_mode := lpf_send;
                                         END CASE;

WHEN lpf_still    =>  null;
          END CASE;

END CASE;

--relate variable to corresponding signals out_2 <= pro_mode;
pro_mode_sig <= pro_mode;
out_3 <= token_out;
out_5 <= token_length;
out_6 <= new_mode;
```

```
new_mode_sig <= new_mode;
diff_sig <= difference;

END PROCESS MODE_CONTROL;

out_1 <= mode;
out_4 <= diff_out;

pre_mode_sig <= pro_mode_sig WHEN reset = rst OR lpf_done_del= '1' ELSE
                mode;

--save the new mode& difference during a token cycle, when the flags and tokens are valid--
-- on lpf_still & inverse no token cycles so load on skip cycle, just so next_mode is defined load_next <= write WHEN cycle = token_cycle ELSE
             write WHEN cycle = skip_cycle AND pro_mode_sig=lpf_still AND direction = inverse ELSE
             read;

DFF_INIT(ck,no_rst,load_next,new_mode_sig,mode);
DFF_INIT(ck,no_rst,load_next,diff_sig,diff_out);

--now write the new mode value into the mode stack at end of cycle, for later use --
--dont update modes at tree base from lpf data, on reset next[1] is undefined--
--store base mode in mode(3)& mode(4), base changes after lpf-- load_mode <=  (read,read,write,write)    WHEN   reset=rst OR lpf_done_del= '1' ELSE
              (write,write,read,read)    WHEN   octave= 1 AND load_mode in= write ELSE
              (read,write,write,read)    WHEN   octave = 2 AND load_mode_in=write ELSE
              (read,read,read,read)
                                         ;

DFF_INIT(ck,no_rst,load_mode(1),pre_mode_sig,mode_regs(1));
DFF_INIT(ck,no_rst,load_mode(2),pre_mode_sig,mode_regs(2));
DFF_INIT(ck,no_rst,load_mode(3),pre_mode_sig,mode_regs(3));
DFF_INIT(ck,no_rst,load_mode(4),pre_mode_sig,mode_regs(4));

END behave;
```

```
CONFIGURATION MODE_CONTROL_CON OF U_MODE_CONTROL is
FOR behave
END FOR;
END MODE_CONTROL_CON;
```

APPENDIX C: VHDL Language Implementation of CONTROL_COUNTER 3124

```
--a counter to control the sequencing ofw, token, huffman cycles--
--decide reset is enabled 1 cycle early, and latched to avoid glitches--
--lpf_stop is a is a dummy mode to disable the block writes&huffman data--
--cycles for that block--
use work.DWT_TYPES.all;
use work.dff_package.all;

entity U_CONTROL_COUNTER IS
PORT(
    ck : in bit ;
    reset : in t_reset ;
    mode,new_mode : in t_mode ;
    direction : in t_direction ;

out_0 : out t_load;
    out_1 : out t_cycle;
    out_2 : out t_reset;
    out_3 : out bit;
    out_4 : out bit;
    out_5 : out t_load;
    out_6 : out t_cs;
    out_7 : out t_load;
    out_8 : out t_cs) ;

--mode load,cycle,decide reset,read_addr enable,write_addr enable,load flags--
--decode write_addr enable early and latch to avoid feedback loop with pro_mode--
--in MODE_CONTROL--
end U_CONTROL_COUNTER;

architecture behave OF U_CONTROL_COUNTER IS
COMPONENT COUNT_SYNC
GENERIC (n:integer);
PORT(
    ck:in bit ;
    reset:in t_reset;
```

--1--

```
en:in bit;
q:out bit_vector(1 to n);
carry:out bit);
end COMPONENT;

signal write_del:bit;
signal write_sig:bit;
signal decide_del:t_reset;
signal decide_sig:t_reset;
signal count_reset:t_reset;
signal count_len:t_length;
signal count_1:BIT_VECTOR(1 to 4);
signal count_2:bit;
signal always_one:bit:='1';
BEGIN count_len    <=    U_TO_I( count_1);

control:PROCESS(ck,count_reset,direction,mode,new_mode,count_len)

VARIABLE             cycle : t_cycle;
VARIABLE             decide_reset : t_reset;
VARIABLE             load_mode : t_load;
VARIABLE             load_flags : t_load;
VARIABLE             cs_new : t_cs;
VARIABLE             cs_old : t_cs;
VARIABLE             rw_old : t_load;
VARIABLE             read_addr_enable : bit;
VARIABLE             write_addr_enable : bit;

BEGIN
           cycle := skip_cycle;
           decide_reset := no_rst;
           load_mode := read;
           load_flags := read;
           cs_new := no_sel;
           cs_old := sel;
           rw_old := read;
           read_addr_enable := '0';
```

```
            write_addr_enable := '0';
CASE direction IS
    WHEN forward =>  CASE mode IS
                         WHEN send|still_send|lpf_send =>
                             CASE count_len IS
                                 WHEN 0 to 3 => read_addr_enable := '1';
                                               cs_new:= sel;
                                 WHEN 4 => cycle := token_cycle;
                                           load_flags:= write;
                                           write_addr_enable:= '1';
                                 WHEN 5 to 7 =>
                                     write_addr_enable:= '1';
                                     CASE new_mode IS
                                         WHEN stop|lpf_stop => cycle := skip_cycle;
                                                               rw_old:= read;
                                                               cs_old:= no_sel;
                                         WHEN void => cycle := skip_cycle;
                                                      rw_old:= write;
                                         WHEN OTHERS => cycle := data_cycle;
                                                        rw_old:= write;
                                     END CASE;
                                 WHEN 8 => decide_reset := rst;
                                     CASE new_mode IS
                                         WHEN stop|lpf_stop => cycle := skip_cycle;
                                                               rw_old:= read;
                                                               cs_old:= no_sel;
                                         WHEN void => cycle := skip_cycle;
                                                      load_mode:= write;
                                                      rw_old:= write;
                                         WHEN OTHERS => cycle := data_cycle;
                                                        load_mode:= write;
                                                        rw_old:= write;
                                     END CASE;
                                 WHEN OTHERS => null;
                             END CASE;
                         WHEN still =>
                             CASE count_len IS
                                 WHEN 0 to 3 => read_addr_enable := '1';
```

```
                                          cs_new:= sel;
                WHEN   4 =>   cycle := token_cycle;
                                          write_addr_enable := '1';
                                          load_flags:= write;
                WHEN   5 to 7 => rw_old := write;
                                          write_addr_enable := '1';
                                          CASE new_mode IS
                                              WHEN void_still => cycle := skip_cycle;
                                              WHEN OTHERS     => cycle := data_cycle;
                                          END CASE;
                WHEN   8 =>   decide_reset := rst;
                                          rw_old:= write;
                                          load_mode:= write;
                                          CASE new_mode IS
                                              WHEN void_still => cycle := skip_cycle;
                                              WHEN OTHERS     => cycle := data_cycle;
                                          END CASE;
                WHEN OTHERS  => null;
                END CASE;
WHEN lpf_still =>   CASE count_len IS
                WHEN 0 to 3 => read_addr_enable := '1';
                                          cs_new:= sel;
                WHEN   4 =>   cycle := token_cycle;
                                          write_addr_enable := '1';
                                          load_flags:= write;
                WHEN   5 to 7 => cycle := data_cycle;
                                          rw_old:= write;
                                          write_addr_enable := '1';
                WHEN   8 =>   cycle := data_cycle;
                                          rw_old:= write;
                                          decide_reset:= rst;
                                          load_mode:= write;
                WHEN OTHERS  => null;
                END CASE;

WHEN void =>       CASE count_len IS
```

```
--dummy token cycle for mode update--
                    WHEN 0 to 3 => read_addr_enable := '1';
                                   cs_new:= sel;
                    WHEN   4  =>   load_flags := write;
                                   cycle:= token_cycle;
--keep counters going--
                                   write_addr_enable := '1';
                    WHEN  5 to 7 => write_addr_enable := '1';

CASE new_mode IS
                                      WHEN stop => rw_old := read;
                                                   cs_old:= no_sel;
                                      WHEN OTHERS => rw_old := write;
                                   END CASE;
                    WHEN   8  =>   decide_reset := rst;
                                   CASE new_mode IS
                                      WHEN stop => rw_old := read;
                                                   cs_old:= no_sel;
                                      WHEN OTHERS => load_mode := write;
                                                     rw_old:= write;
                                   END CASE;

WHEN OTHERS  => null;
                    END CASE;

CASE count_len IS
                                   WHEN 0 => write_addr_enable := '1';
--allow for delay--
                    WHEN void_still =>
                                   WHEN  1 to 3 => write_addr_enable := '1';
                                                   rw_old:= write;
                                   WHEN   4  =>   rw_old := write;
                                                  load_mode:= write;
                                                  decide_reset:= rst;
                                   WHEN OTHERS  => null;
                       WHEN OTHERS  => null;
                       END CASE;
WHEN inverse =>         CASE mode IS
                        WHEN send|still_send|lpf_send =>   CASE count_len IS
```

```
              WHEN 0 to 3 => read_addr_enable := '1';
              WHEN    4 => cycle := token_cycle;
                           write_addr_enable := '1';
                           load_flags:= write;
              WHEN 5 to 7 => write_addr_enable := '1';
                           CASE new_mode IS
                              WHEN stop|lpf_stop =>  cycle := skip_cycle;
                                                     rw_old:= read;
                                                     cs_old:= no_sel;
                              WHEN void =>  cycle := skip_cycle;
                                            rw_old:= write;
                              WHEN OTHERS => cycle := data_cycle;
                                             rw_old:= write;
                           END CASE;
              WHEN    8 => decide_reset:= rst;
                           CASE new_mode IS
                              WHEN stop|lpf_stop =>  cycle := skip_cycle;
                                                     rw_old:= read;
                                                     cs_old:= no_sel;
                              WHEN void =>  cycle := skip_cycle;
                                            load_mode:= write;
                                            rw_old:= write;
                              WHEN OTHERS => cycle := data_cycle;
                                             load_mode:= write;
                                             rw_old:= write;
                           END CASE;

WHEN OTHERS => null;
           END CASE;
     CASE count_len IS
           WHEN      0 => null ;

WHEN      1 => cycle := token_cycle;
                          write_addr_enable := '1';
           WHEN 2 to 4 => rw_old := write;
                          write_addr_enable := '1';
                          CASE new_mode IS
                              WHEN void_still =>  cycle := skip_cycle;

WHEN still =>
--skip to allow reset in huffman--
```

```
                              WHEN OTHERS   => cycle := data_cycle;
                              END CASE;

WHEN 5         => rw_old:=write;
                              decide_reset:= rst;
                              load_mode:= write;
                              CASE new_mode IS
                              WHEN void_still =>  cycle := skip_cycle;
                              WHEN OTHERS     =>  cycle := data_cycle;
                              END CASE;

WHEN OTHERS    => null;
            END CASE;
WHEN lpf_still =>  CASE count_len IS
            WHEN      0 =>null ;
--match with previous--
            WHEN      1 => write_addr_enable := '1';
--skip for write enb delay--
            WHEN 2 to 4 => cycle := data_cycle;
                           rw_old:= write;
                           write_addr_enable := '1';
            WHEN      5 => cycle := data_cycle;
                           rw_old:= write;
                           decide_reset:= rst;
                           load_mode:= write;
            WHEN OTHERS => null;
            END CASE;
WHEN void =>  CASE count_len IS
            WHEN 0 to 3 => read_addr_enable := '1';
            WHEN      4 => load_flags := write;
                           cycle:= token_cycle;
--dummy token cycle for mode update--
                           write_addr_enable := '1';
            WHEN 5 to 7 => write_addr_enable := '1';
                           CASE new_mode IS
                           WHEN stop =>  rw_old := read;
                                         cs_old:= no_sel;
                           WHEN OTHERS => rw_old := write;
                           END CASE;
            WHEN      8 => decide_reset := rst;
```

```
                                                   CASE new_mode IS
                                                       WHEN stop =>   rw_old := read;
                                                                      cs_old:= no_sel;
                                                       WHEN OTHERS => load_mode := write;
                                                                      rw_old:= write;
                                                   END CASE;

WHEN OTHERS => null;
                                        END CASE;
                                    CASE count_len IS
                                        WHEN    0      =>null ;

WHEN    1  =>  write_addr_enable := '1';

WHEN    2 to 4 => write_addr_enable := '1';
                                                         rw_old:= write;
                                        WHEN    5  =>  rw_old := write;
                                                       load_mode:= write;
                                                       decide_reset:= rst;

WHEN OTHERS => null;
                                    END CASE;
            WHEN void_still =>
--match with rest--
--dummy as write delayed--

WHEN OTHERS => null;
                    END CASE;

END CASE;

write_sig <=write_addr_enable;
decide_sig <= decide_reset;

DFF(ck,reset,write_sig,write_del);
out_0 <= load_mode ;
out_1 <= cycle;
out_2 <= decide_sig;
out_3 <= read_addr_enable;
out_4 <= write_del;
0out_5 <= load_flags;
out_6 <= cs_new;
out_7 <= rw_old;
out_8 <= cs_old;

END PROCESS;
```

```
WITH reset SELECT
    count_reset <= rst WHEN rst,
                   decide_sig WHEN OTHERS;

control_cnt: count_sync GENERIC MAP(4) PORT MAP(ck,count_reset,always_one,count_1,count_2);

END behave;

CONFIGURATION CONTROL_COUNTER_CON OF U_CONTROL_COUNTER is
FOR behave
    FOR ALL:count_sync  USE ENTITY WORK.count_sync(behave);
    END FOR;
END FOR;
END CONTROL_COUNTER_CON;
```

I claim:

1. In a system for compressing an input digital signal representing audio or visual information into an encoded data sequence for transmission or storage, and for alternatively decompressing an input encoded data sequence to produce an output digital signal, the system including signal transformation means for converting input signals from one domain to another, encoding/decoding means and control means for controlling the operation of said signal transformation means and said encoding/ decoding means, an improved signal transformation means comprising:

a first multiplexer having at least a first input terminal, and a second input terminal, and an output terminal to output a first selected digital signal, wherein said first input terminal receives said input digital signal, and said second input terminal receives an decoded filtered digital signal;

a convolver for receiving said first selected digital signal and for operating in a selected mode on said first selected digital signal to produce a convolved digital signal, wherein in a first selected mode said convolver forward transforms said first selected digital signal to produce said convolved digital signal, and in a second selected mode said convolver inverse-transforms said first selected digital signal to produce said convolved digital signal;

a second multiplexer having an input terminal communicatively connected to receive said convolved digital signal, and a output terminal communicatively connected to said second input terminal of said first multiplexer and provides a second selected digital signal; and a controller responsive to control signals indicating the selected mode for operating said first multiplexer, said second multiplexer, and said convolver, wherein in said first mode, said input digital signal is selected, convolved to produce a filtered digital signal, and outputted as said second selected digital signal, and wherein in said second mode, said decoded filtered digital signal is selected by said first multiplexer, and convolved to produce an output digital signal, and outputted as said second selected digital signal.

2. In a system as recited in claim 1, said first multiplexer further includes a third input terminal for receiving said convolved digital signal from said convolver, wherein said controller responding to the control signals operates said first multiplexer to select said convolved digital signal from said convolver to convolve said convolved digital signal one or more times.

3. In a system as recited in claim 2, said convolver includes:

a multiplier means for generating a plurality of multiples of said input digital signal by shifting said input digital data and/or adding multiples of said input digital signal; and a transform means for summing selected ones of said multiples to produce said filtered digital signal in said first -mode and said decoded filtered digital signal in said second mode.

4. In a system as recited in claim 3, said transform means includes:

a plurality of multiplexers for selecting particular ones of said multiples of said input digital signal; and a plurality of crisscross connected accumulators for summing said particular ones of said multiples and sum of said particular ones of said multiples to generate said filtered digital signal in said first mode and said decoded digital signal in said second mode, wherein each of said crisscross connected accumulators receive input signals from one of said plurality of multiplexers and from the output signal of one other accumulator of said plurality of accumulators.

5. In a system as recited in claim 3, said transform means includes:

a plurality of multiplexers for selecting particular ones of said multiples of said input digital data points;

a first accumulator including a first and_select means for controlling the passing of a second output signal, a first mux_and_select means for controlling the passing of a first multiple from said multiplexers, a first add_select means for summing an output of said first and_select means and an output of said first mux_and_select means to produce a first output signal, and a first delay means for holding said first output signal;

a second accumulator having a first multiplexer for selecting from said first output signal and a third output signal to produce a first mux_out signal, a second and_select means for controlling the passing of said first mux_out signal, a second add_select means for summing said passed first mux_out signal and a second multiple from said multiplexers to produce said second output signal, and a second delay means for holding said second output signal;

a third accumulator having a first multiplexer for selecting from said second output signal and a fourth output signal to produce a second mux_out signal, a third and_select means for controlling the passing of said second mux_out signal, a second mux_and_select means for controlling the passing of a third multiple from said multiplexers, a third add_select means for summing said passed second mux_out signal and said passed multiple to produce said third output signal, and a third delay means for holding said third output signal;

a fourth accumulator having a fourth and_select means for controlling the passing of said third output signal, a third mux_and_select means for controlling the passing of a fourth multiple from said multiplexers, a fourth add_select means for summing said passed fourth multiple and passed third output signal to produce said fourth output signal, and a fourth delay means for holding said fourth output signal;

an end multiplexer for selecting a final output digital signal from said first output signal and said fourth output signal, said final output signal being said filtered digital signal in said first mode and said output digital signal in said second mode; and wherein said control means operating the and_select means, the add_select means, the mux_and_select means, and the multiplexers to control flow direction of the signals.

6. In a system as recited in claim 1, said filtered digital signal and said decoded filtered digital signal are stored in a frame buffer in a predetermined format, said frame buffer being addressed by a read address generator and a write address generator.

7. In a system as recited in claim 6, said read address generator includes:

an increment multiplexer for selecting an address increment from a predetermined increment or a predetermined octave increment;

an adder means for summing said address increment and an output address to produce a summed address;

a base multiplexer for selecting a next address from at least one base address, a zero value, or said summed address; and a delay means for storing said next address, said next address being used for addressing the next address location to be read.

8. In a system as recited in claim 6, said write address generator includes:

an increment multiplexer for selecting an address increment from a predetermined increment or a predetermined octave increment;

an adder means for summing said address increment and an output address to produce a summed address;

a base multiplexer for selecting a next address from at least one base address, a zero value, or said summed address; and a delay means for storing said next address, said next address being used to address the next address location to be written.

9. In a system as recited in claim 1, a second memory for receiving and storing said filtered digital signal from said second multiplexer and for providing said decoded filtered digital signal to said first multiplexer.

10. In a system as recited in claim 9, in the first selected mode, said second memory receives said filtered digital signal and stores said filtered digital signal at address locations in said second memory as specified by said controller.

11. In a system as recited in claim 10, in said second selected mode, said second memory provides decoded filtered digital signal from address locations as specified by said controller.

12. In a system as recited in claim 1, a first memory for providing stored input digital signal to said first multiplexer and for receiving and storing said output digital signal.

13. In a system as recited in claim 12, in the first selected mode, said first memory provides said input digital signal to said first input terminal of said first multiplexer from address locations in said first memory as specified by said controller.

14. In a system as recited in claim 13, in the second selected mode, said first memory receives and stores said output digital signal at address locations in said first memory as specified by said controller.

15. In a system for compressing an input digital signal representing audio or visual information into an encoded data sequence for transmission or storage, and for alternatively decompressing an input encoded data sequence to produce an output digital signal, the system including signal transformation means for converting input signals from one domain to another, encoding/decoding means and control means for controlling the operation of said signal transformation means and said encoding/decoding means, an improved signal transformation means comprising:

a first multiplexer having at least a first input terminal, a second input terminal, and a third input terminal, and an output terminal to output a first selected digital signal, wherein said first input terminal receives said input digital signal, and said second input terminal receives a decoded filtered digital signal;

a first convolver for receiving said first selected digital signal and for operating in a selected mode on said first selected digital signal to produce a first convolved digital signal, wherein in a first selected mode said first convolver forward transforms said first selected digital signal to produce said convolved digital signal, and in a second selected mode said first convolver inverse-transforms said first selected digital signal to produce said first convolved digital signal, said first convolver having an output terminal communicatively connected to said third input terminal of said first multiplexer;

a second multiplexer having a fourth input terminal and a fifth input terminal, and a second output terminal to output a second selected digital signal, wherein said fourth input terminal communicatively connected to receive said first convolved digital signal; and a second convolver for receiving said second selected digital signal and for operating in the selected mode on said second selected digital signal to produce a second convolved digital signal, wherein in the first selected mode said second convolver forward transforms said second selected digital signal to produce said second convolved digital signal, and in the second selected mode said second convolver inverse-transforms said second selected digital signal to produce said second convolved digital signal, said second convolver having an output terminal communicatively connected to said third input terminal of said first multiplexer;

a third multiplexer having a sixth input terminal and a seventh input terminal, and a third output terminal, wherein said sixth input terminal communicatively connected to receive said second convolved digital signal and said seventh input terminal communicatively connected to receive said first convolved digital signal and communicatively connected to said first terminal of said first multiplexer, and said third output terminal outputs a third selected digital signal and communicatively connected to said second input terminal of said first multiplexer and said fifth output terminal of said second multiplexer; and a controller responsive to control signals indicating the selected mode for operating said first multiplexer, said first convolver, said second multiplexer, said second convolver, and said third multiplexer, wherein in said first mode, said input digital signal is transformed to produce filtered digital signal and is provided at said third output terminal of said third multiplexer, and wherein in said second mode said decoded filtered digital signal is inverse-transformed to produce said output digital signal and is provided at first input terminal of said first multiplexer.

16. In a system as recited in claim 15, a second memory for receiving and storing said filtered digital signal from said third multiplexer and for providing said decoded filtered digital signal to said first multiplexer.

17. In a system as recited in claim 16, in the first selected mode, said second memory receives said filtered digital signal and stores said filtered digital signal at address locations in said second memory as specified by said controller.

18. In a system as recited in claim 17, in said second selected mode, said second memory provides decoded filtered digital signal from address locations as specified by said controller.

19. In a system as recited in claim 15, a first memory for providing stored input digital signal to said first multiplexer and for receiving and storing said output digital signal.

20. In a system as recited in claim 19, in the first selected mode, said first memory provides said input digital signal to said first input terminal of said first multiplexer from address locations in said first memory as specified by said controller.

21. In a system as recited in claim 20, in the second selected mode, said first memory receives and stores said output digital signal at address locations in said first memory as specified by said controller.

22. In a system as recited in claim 15, each of the convolvers includes:
- a multiplier means for generating a plurality of multiples of said input digital signal by shifting said input digital data and/or adding multiples of said input digital signal; and
- a transform means for summing selected ones of said multiples to produce said filtered digital signal in said first mode and said decoded filtered digital signal in said second mode.

23. In a system as recited in claim 22, said transform means includes:
- a plurality of multiplexers for selecting particular ones of said multiples of said input digital signal; and
- a plurality of crisscross connected accumulators for summing said particular ones of said multiples and sum of said particular ones of said multiples to generate said filtered digital signal in said first mode and said decoded digital signal in said second mode, wherein each of said crisscross connected accumulators receive input signals from one of said plurality of multiplexers and from the output signal of one other accumulator of said plurality of accumulators.

24. In a system as recited in claim 22, said transform means includes:
- a plurality of multiplexers for selecting particular ones of said multiples of said input digital data points;
- a first accumulator including a first and_select means for controlling the passing of a second output signal, a first mux_and_select means for controlling the passing of a first multiple from said multiplexers, a first add_select means for summing an output of said first and_select means and an output of said first mux_and_select means to produce a first output signal, and a first delay means for holding said first output signal;
- a second accumulator having a first multiplexer for selecting from said first output signal and a third output signal to produce a first mux_out signal, a second and_select means for controlling the passing of said first mux_out signal, a second add_select means for summing said passed first mux_out signal and a second multiple from said multiplexers to produce said second output signal, and a second delay means for holding said second output signal;
- a third accumulator having a first multiplexer for selecting from said second output signal and a fourth output signal to produce a second mux_out signal, a third and_select means for controlling the passing of said second mux_out signal, a second mux_and_select means for controlling the passing of a third multiple from said multiplexers, a third add_select means for summing said passed second mux_out signal and said passed multiple to produce said third output signal, and a third delay means for holding said third output signal;
- a fourth accumulator having a fourth and_select means for controlling the passing of said third output signal, a third mux_and select means for controlling the passing of a fourth multiple from said multiplexers, a fourth add_select means for summing said passed fourth multiple and passed third output signal to produce said fourth output signal, and a fourth delay means for holding said fourth output signal;
- an end multiplexer for selecting a final output digital signal from said first output signal and said fourth output signal, said final output signal being said filtered digital signal in said first mode and said output digital signal in said second mode; and
- wherein said control means operating the and_select means, the add_select means, the mux and select means, and the multiplexers to control flow direction of the signals.

25. In a system as recited in claim 15, said filtered digital signal and said decoded filtered digital signal are stored in a frame buffer in a predetermined format, said frame buffer being addressed by a read address generator and a write address generator.

26. In a system as recited in claim 25, said read address generator includes:
- an increment multiplexer for selecting an address increment from a predetermined increment or a predetermined octave increment;
- an adder means for summing said address increment and an output address to produce a summed address;
- a base multiplexer for selecting a next address from at least one base address, a zero value, or said summed address; and
- a delay means for storing said next address, said next address being used for addressing the next address location to be read.

27. In a system as recited in claim 26, said write address generator includes:
- an increment multiplexer for selecting an address increment from a predetermined increment or a predetermined octave increment;
- an adder means for summing said address increment and an output address to produce a summed address;
- a base multiplexer for selecting a next address from at least one base address, a zero value, or said summed address; and
- a delay means for storing said next address, said next address being used to address the next address location to be written.

* * * * *